US007256818B2

(12) United States Patent
Sadok et al.

(10) Patent No.: US 7,256,818 B2
(45) Date of Patent: Aug. 14, 2007

(54) DETECTING FIRE USING CAMERAS

(75) Inventors: Mokhtar Sadok, Williston, VT (US); Radoslaw Romuald Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 519 days.

(21) Appl. No.: 10/152,323

(22) Filed: May 20, 2002

(65) Prior Publication Data

US 2004/0061777 A1 Apr. 1, 2004

(51) Int. Cl.
*H04N 7/18* (2006.01)
*G08B 17/12* (2006.01)

(52) U.S. Cl. ...................................... 348/143; 340/578

(58) Field of Classification Search ................ 348/143, 348/154; 382/100; 375/240.01; 379/45; 356/2; 340/628, 525, 578; 169/84; 709/253; 706/44

See application file for complete search history.

(56) References Cited

U.S. PATENT DOCUMENTS

| | | | |
|---|---|---|---|
| 3,754,222 | A | 8/1973 | Eisenberg |
| 4,316,230 | A | 2/1982 | Hansen et al. |
| 4,503,336 | A | 3/1985 | Hutchin et al. |
| 4,532,918 | A | 8/1985 | Wheeler |
| 4,647,785 | A | 3/1987 | Morita |
| 4,737,847 | A | 4/1988 | Araki et al. |
| 4,749,862 | A | 6/1988 | Yoshida et al. |
| 4,821,805 | A | 4/1989 | Saito et al. |
| 4,851,914 | A | 7/1989 | Pfanhouser et al. |
| 5,149,972 | A | 9/1992 | Fay et al. |
| 5,287,421 | A | 2/1994 | Forrest et al. |

(Continued)

FOREIGN PATENT DOCUMENTS

| | | | |
|---|---|---|---|
| DE | 3812560 | C2 | 4/1988 |
| DE | 3812560 | A1 | 10/1989 |
| EP | 0 231 390 | B1 | 10/1992 |
| EP | 0 618 555 | B1 | 7/1999 |
| EP | 0 658 865 | B1 | 1/2003 |

(Continued)

OTHER PUBLICATIONS

Abstract of JP2003099876, published on Apr. 4, 2003, by Yoshiaki Okayama, Inoue Masao and Yamagishi Takatoshi.

(Continued)

*Primary Examiner*—Gims Philippe
(74) *Attorney, Agent, or Firm*—Muirhead & Saturnelli, LLC

(57) ABSTRACT

Detecting a fire, such as a fire in an aircraft cargo bay, includes receiving a plurality of frames of video information, determining an energy indicator for each of a subset of the plurality of frames, and detecting the presence of fire in response to the energy indicator for each of the subset of the plurality of frames corresponding to a predetermined pattern as a function of time. Detecting a fire may also include comparing energy indicators for each of the subset of the plurality of frames to a reference frame. The reference frame may correspond to a video frame taken when no fire is present or a video frame immediately preceding each of the subset of the plurality of frames. At least some of the subset of the plurality of frames may be provided by a camera having a sensitivity of between 400 nm and 1000 nm that may generates 640×480 pixels per frame. At least some of the subset of the plurality of frames may be provided by a CCD camera or a CMOS camera. At least some of the subset of the plurality of frames may be provided by a camera having a sensitivity of between 7 and 14 micrometers, which may be an IR camera.

146 Claims, 35 Drawing Sheets

U.S. PATENT DOCUMENTS

| | | | | |
|---|---|---|---|---|
| 5,337,217 | A | 8/1994 | Tarn | |
| 5,353,011 | A | 10/1994 | Wheeler et al. | |
| 5,383,013 | A * | 1/1995 | Cox | 356/2 |
| 5,383,026 | A | 1/1995 | Mouri et al. | |
| 5,396,288 | A | 3/1995 | Tsugita et al. | |
| 5,413,010 | A | 5/1995 | Nakanishi et al. | |
| 5,456,157 | A | 10/1995 | Lougheed et al. | |
| 5,476,018 | A | 12/1995 | Nakanishi et al. | |
| 5,477,459 | A | 12/1995 | Clegg et al. | |
| 5,495,337 | A | 2/1996 | Goshorn et al. | |
| 5,506,617 | A | 4/1996 | Parulski et al. | |
| 5,530,433 | A | 6/1996 | Morita | |
| 5,542,762 | A | 8/1996 | Nakanishi et al. | |
| 5,550,373 | A | 8/1996 | Cole et al. | |
| 5,566,022 | A | 10/1996 | Segev | |
| 5,673,027 | A | 9/1997 | Morita | |
| 5,677,532 | A | 10/1997 | Duncan et al. | |
| 5,686,690 | A | 11/1997 | Lougheed et al. | |
| 5,730,049 | A | 3/1998 | Broschart | |
| 5,749,002 | A | 5/1998 | Iwasaki | |
| 5,815,411 | A | 9/1998 | Ellenby et al. | |
| 5,823,784 | A | 10/1998 | Lane | |
| 5,835,806 | A | 11/1998 | Kautz | |
| 5,914,489 | A | 6/1999 | Baliga et al. | |
| 5,937,077 | A * | 8/1999 | Chan et al. | 382/100 |
| 5,996,023 | A * | 11/1999 | Winter et al. | 709/253 |
| 6,049,281 | A | 4/2000 | Osterweil | |
| 6,058,201 | A | 5/2000 | Sikes et al. | |
| 6,064,430 | A | 5/2000 | Lefkowitz | |
| 6,097,429 | A * | 8/2000 | Seeley et al. | 348/154 |
| 6,127,926 | A | 10/2000 | Dando | |
| 6,138,955 | A | 10/2000 | Gutmark et al. | |
| 6,184,792 | B1 | 2/2001 | Privalov et al. | |
| 6,249,310 | B1 | 6/2001 | Lefkowitz | |
| 6,253,697 | B1 | 7/2001 | Brouwer | |
| 6,281,970 | B1 | 8/2001 | Williams et al. | |
| 6,556,981 | B2 * | 4/2003 | Pedersen et al. | 706/44 |
| 6,690,411 | B2 * | 2/2004 | Naidoo et al. | 348/143 |
| 6,696,958 | B2 * | 2/2004 | Anderson | 340/578 |
| 6,813,312 | B2 * | 11/2004 | Tullberg et al. | 375/240.01 |
| 6,844,818 | B2 * | 1/2005 | Grech-Cini | 340/628 |
| 6,850,601 | B2 * | 2/2005 | Jones et al. | 379/45 |
| 6,851,483 | B2 * | 2/2005 | Olander et al. | 169/84 |
| 6,958,689 | B2 * | 10/2005 | Anderson et al. | 340/525 |
| 2002/0030608 | A1 | 3/2002 | Boucourt | |
| 2002/0135490 | A1 | 9/2002 | Opitz et al. | |
| 2003/0038877 | A1 | 2/2003 | Pfefferseder et al. | |

FOREIGN PATENT DOCUMENTS

| | | |
|---|---|---|
| EP | 0 822 526 | 4/2003 |
| JP | 2003099876 | 4/2003 |
| WO | WO 00/23959 | 4/2000 |
| WO | WO 01/57819 A2 | 8/2001 |
| WO | WO 01/67415 A1 | 9/2001 |
| WO | WO 02/054364 A2 | 7/2002 |
| WO | WO 03/105480 A1 | 12/2003 |

* cited by examiner

390

1280

2100

DETECTING FIRE USING CAMERAS

BACKGROUND OF THE INVENTION

1. Technical Field

This application relates to the field of automatic detection, isolation, verification and alarming, and more particularly to the field of detection, isolation, verification and alarming using video information.

2. Description of Related Art

Conventional (mostly ionization-based) fire- and smoke-detection systems currently installed in aboard aircraft often suffer from high rates of false alarms. Under current rules, once an alarm has been initiated (by the smoke detection system), the pilot is obligated to suppress the fire and divert the aircraft to the nearest emergency airfield. In case of extended range operations of large jetliners over polar regions, a diversion after a false alarm may itself be dangerous, as the nearest airfield may be in a remote, sparsely populated location, may lack amenities necessary to accommodate 500+ passengers, and may render the prospect of safe take-off questionable. Thus, it is desirable that the incidence of false alarms is minimized and that the crew is given a method to visually inspect the state of the compartment prior and after the suppression. This may allow avoiding unnecessary suppression in case of a false alarm. There has been expressed a need for such a method of additional verification.

SUMMARY OF THE INVENTION

According to the present invention, detecting a fire, includes receiving a plurality of frames of video information, determining an energy indicator for each of a subset of the plurality of frames, and detecting the presence of fire in response to the energy indicator for each of the subset of the plurality of frames corresponding to a predetermined pattern as a function of time. Detecting a fire may also include comparing energy indicators for each of the subset of the plurality of frames to a reference frame. The reference frame may correspond to a video frame taken when no fire is present or a video frame immediately preceding each of the subset of the plurality of frames. At least some of the subset of the plurality of frames may be provided by a camera having a sensitivity of between 400 nm and 1000 nm that may generates 640×480 pixels per frame. At least some of the subset of the plurality of frames may be provided by a CCD camera or a CMOS camera. At least some of the subset of the plurality of frames may be provided by a camera having a sensitivity of between 7 and 14 micrometers, which may be an IR camera.

According further to the present invention, detecting fire and non-fire conditions, includes receiving a plurality of frames of video information, determining an energy indicator for each of a subset of the plurality of frames, detecting a fire condition in response to the energy indicator for each of the subset of the plurality of frames forming a pattern as a function of time corresponding to a fire condition, and detecting a non-fire condition in response to the energy indicator for each of the subset of the plurality of frames forming a pattern as a function of time corresponding to a non-fire condition. Detecting fire and non-fire conditions may also include comparing energy indicators for each of the subset of the plurality of frames to a reference frame. The reference frame may correspond to a video frame taken when no fire is present, a video frame immediately preceding each of the subset of the plurality of frames, or a video frame immediately preceding a frame that is immediately preceding each of the subset of the plurality of frames. At least some of the subset of the plurality of frames may be provided by a camera having a sensitivity of between 400 nm and 1000 nm that may generate 640×480 pixels per frame. The camera may be provided by a CCD camera or a CMOS camera. At least some of the subset of the plurality of frames may be provided by a camera having a sensitivity of between 7 and 14 micrometers, which may be an IR camera.

According further to the present invention, detecting fire and non-fire conditions, includes receiving a plurality of frames of video information, determining edge energy for each of a subset of the plurality of frames, detecting a fire condition by comparing the edge energy to reference edge energy corresponding to a non-fire condition, and detecting a non-fire condition by comparing the edge energy to the reference edge energy corresponding to a non-fire condition. The reference edge energy may correspond to a video frame taken in the presence of fog. At least some of the subset of the plurality of frames may be provided by a camera having a sensitivity of between 400 nm and 1000 nm which may generate 640×480 pixels per frame. At least some of the subset of the plurality of frames may be provided by a CCD camera or a CMOS camera. At least some of the subset of the plurality of frames may be provided by a camera having a sensitivity of between 7 and 14 micrometers which may be an IR camera.

According further to the present invention, detecting video phenomena, includes receiving a plurality of video images from a plurality of sources, compensating the images to provide enhanced images, extracting features from the enhanced images, and combining the features from the plurality of sources to detect the video phenomena. The plurality of sources may include cameras having a sensitivity of between 400 nm and 1000 nm and/or may include cameras having a sensitivity of between 7 and 14 micrometers. Extracting features may include determining an energy indicator for each of a subset of the plurality of frames. Detecting video phenomena may also include comparing energy indicators for each of the subset of the plurality of frames to a reference frame. The reference frame corresponds to a video frame taken when no fire is present, video frame immediately preceding each of the subset of the plurality of frames, or a video frame immediately preceding a frame that is immediately preceding each of the subset of the plurality of frames. Extracting features may include performing a principal component analysis on a subset of a plurality of the frames. Performing a principal component analysis may include computing eigenvalues and a correlation matrix for the subset of the plurality of frames. Extracting features may include determining wavelet coefficients in connection with multiscale modeling. Combining features may include using a neural network, using fuzzy logic, using a hidden Markov model, and/or using a multiple model estimator. The video phenomena may be a fire.

According further to the present invention, detecting fire in an aircraft cargo bay, includes providing a plurality of cameras in the cargo bay, obtaining image signals from the cameras, enhancing the image signals to provide enhanced image signals, extracting features from the enhanced image signals, and combining the features to detect the presence of fire.

According further to the present invention, viewing a compartment includes providing a plurality of cameras in the compartment, receiving image signals from the cameras, enhancing the image signals to provide enhanced image signals, providing a selector switch that receives the image signals and receives the enhanced image signal, and providing a screen that receives a video signal from the selector switch, wherein the video signal is one of the image signals or one of the enhanced image signals depending upon actuation of the selector switch. Enhancing the image signals may include at least one of: compensating for vibration, compensating for camera calibration, and compensating for lenses provided with the cameras. At least a subset of the plurality of cameras may have a sensitivity of between 400 nm and 1000 nm. At least a subset of the plurality of cameras may have a sensitivity of between 7 and 14 micrometers. The compartment may be a cargo bay of an aircraft.

DETAILED DESCRIPTION OF VARIOUS EMBODIMENTS

Figure 1:
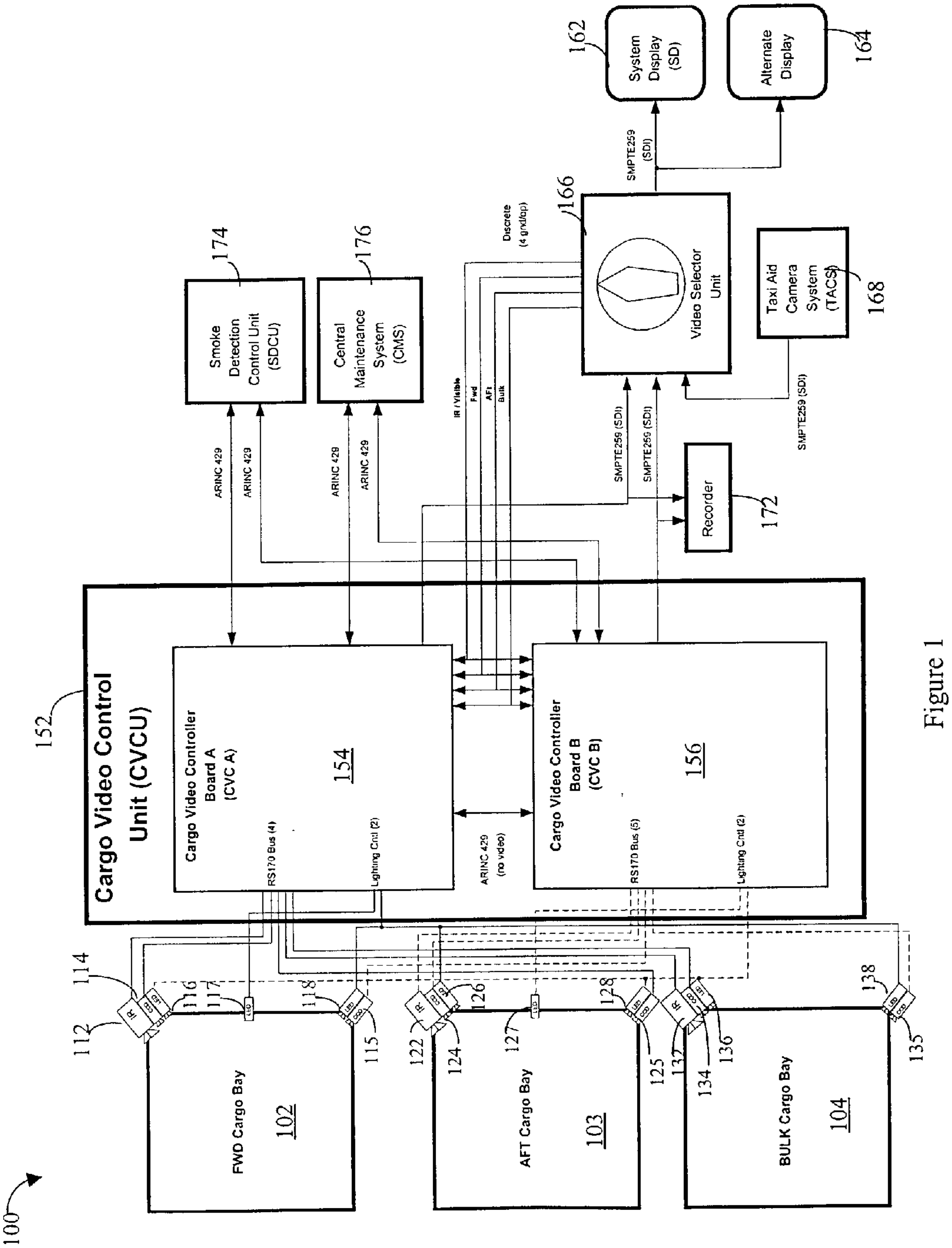
FIG. 1 shows hardware for implementing the system described herein.

Referring to FIG. 1, a diagram 100 shows a system for monitoring and automatic detection and verification of fire within aircraft. The system described herein may be seen as a particular application of a more general Autonomous Vision System (AVS) which is a concept for a family of products. The AVS provides a user with a tireless automated surveillance capability to monitor various elements of the aircraft integrity. The system may be used in applications where surveillance is needed and simple decisions for immediate corrective actions are well defined. Most of the hardware and software described herein is expandable to various applications of the AVS where analysis of "visual" phenomena is expected.

The system monitors a plurality of aircraft cargo bays 102-104 to detect/verify the presence of fire. The cargo bay 102 includes an IR (infrared) camera 112, two CCD (charge coupled device) cameras 114, 115, and a plurality of LED (light emitting diodes) sources 116-118 that are used to detect and verify the presence of fire within the cargo bay 102. Similarly, the cargo bay 103 includes an IR camera 122, two CCD cameras 124, 125, and a plurality of LED sources 126-128. The cargo bay 104 includes an IR camera 132, two CCD cameras 134, 135, and two LED sources 136, 138. In an embodiment disclosed herein, the components 112, 114, 115-118, 122, 124, 125-128, 132, 134, 135, 136, 138 provide redundant coverage so that failure of one component does not result in failure of the entire system. Accordingly, in some embodiments, fire detection may be adequately performed even after failure of one of the IR cameras 112, 122, 132. Note also that the system could use chemical sensors (not shown) to detect, for example, an increase in $CO_2$ in one of the cargo bays 102-104. The additional information could be used by follow on processing to help determine the presence of a fire condition.

The IR cameras 112, 122, 132 measure IR energy (i.e., heat) provided in each of the respective ones of the cargo bays 102-104. The CCD cameras 114, 115, 124, 125, 134, 135 measure and provide signals of visible light in each of the cargo bays 102-104. In some instances, there may be no ambient light in the cargo bays 102-104. The LEDs 116-118, 126-128, 136, 138 provide light in each of the cargo bays 102-104. The LEDs 116-118, 126-128, 136, 138 may be actuated by an external source or may simply provide illumination in a way that may be synchronized with the CCD cameras 114, 115, 124, 125, 134, 135.

Note that, as used herein, the term "video" includes the output of the IR cameras, whether visible or not and whether the output is provided in any conventional format or not. Similarly, the term "video" also includes output of the CCD/CMOS cameras, whether visible or not and whether the output is provided in any conventional format or not.

The cameras 112, 114, 115, 123, 124, 125, 132 134, 135 and the LEDs 116-118, 126-128, 136, 138 may be mounted in any location within the cargo bays 102-104. However, for an embodiment disclosed herein, the cameras 112, 114, 115, 123, 124, 125, 132 134, 135 are mounted in an upper corner of each of the cargo bays 102-104. In addition, the LEDs may be mounted anywhere within the cargo bays 102-104. However, for an embodiment disclosed herein, each of the cameras has an LED unit mounted therewith. However, as shown in the diagram 100, there may also be LED's 117, 127 that are not directly mounted in relatively close proximity with any of the cameras 112, 114, 115, 123, 124, 125, 132 134, 135. Note also that, for an embodiment disclosed herein, each of the IR cameras 112, 122, 132 is mounted proximate to a corresponding on of the CCD cameras 114, 124, 134. However, for other embodiments, it may be possible to have one or more IR cameras not mounted in relatively close proximity to a corresponding CCD camera. Note also that it is possible to provide any number of cameras to each of the cargo bays 102-104. Providing additional cameras for each of the cargo bays 102-104 would tend to improve the accuracy of the result but would also tend to increase the amount of processing needed. The cameras and LED's that are mounted proximate to one another may be provided in a protective enclosure (not shown).

Each of the CCD cameras 114, 115, 124, 125, 134, 135 may be any conventional CCD camera having at least 320 by 240 pixel resolution. A wide-angle lense (e.g., 90 degrees) may provided with one or more of the CCD cameras 114, 115, 124, 125, 134, 135. In some embodiments, the CCD cameras 114, 115, 124, 125, 134, 135 may have at least a 640 by 480 pixel resolution. Different ones of the cameras 114, 115, 124, 125, 134, 135 may have different resolution than other ones of the cameras 114, 115, 124, 125, 134, 135. The CCD cameras 114, 115, 124, 125, 134, 135 maybe sensitive to light wave lengths between 400 and 1000 nanometers at better than 1 lux. Such a camera may be provided by, for example, using a Pulnix model TM-7EG CCD camera with filters. Note also that the CCD cameras 114, 115, 124, 125, 134, 135 may have on-board DSP processing (and corresponding hardware) and/or may be used with other DSP processing provided therewith.

The IR cameras 112, 122, 132 may have a resolution of at least 320 by 240 pixels and be sensitive to wave lengths between 8 and 13 microns. An appropriate IR camera may be provided, for example, by the Raytheon OEM Series 300 model. Different ones of the cameras 112, 122, 132 may have different resolution than other ones of the cameras 112, 122, 132. Note also that the IR cameras 112, 122, 132 may have on-board DSP processing (and corresponding hardware) and/or may be used with other DSP processing provided therewith. In addition, in some embodiments, no IR cameras may be used, in which case the processing described herein will be performed for CCD cameras.

The LEDs may be any conventional homogenious LED providing an appropriate amount and wave length of light for the CCDs to operate. For example, the LEDs may provide light at 800 nanometers.

Note that, as will become apparent from the discussion herein, the performance and resolution of the cameras and the LEDs may be a function of the processing power used to process the information from the cameras. Thus, for example, the cameras may be provided with additional resolution provided that the follow on processing system that processes the data from the cameras can handle the improved resolution. In some embodiments, the CCD cameras 114, 115, 124, 125, 134, 135 provide 30 frames per second, although other frame rates may be possible provided that the other rates are consistent with the processing for detecting fires. The follow on processing may process, for example, one out of ten video frames although, for some embodiments, this may be accomplished by having the follow on processing process five successive frames out of every fifty. Other rates and techniques for processing a subset of the frames may also be used. The CCD cameras 114, 115, 124, 125, 134, 135 may also provide a black and white (i.e., gray scale) output rather than a color output. In instances where the CCD cameras provides a color output, the color information may be converted to a gray scale and/or may be used to provide additional detection using the additional information provided by the color.

Note that the CCD cameras may also be replaced by another type of camera (such as CMOS cameras) that handle light in and around the visible spectrum. Thus, for the discussion herein, references to the CCD cameras will be understood to include other types of cameras capable of detecting light as described herein. In an embodiment herein, the CCD camera has a size of no greater than 4.7" by 0.8" by 0.8", a weight of no greater than 0.075 lbs. A power consumption of no greater than 2.5 watts, an operating temperature between −10 to 60 degrees centigrade, a storage temperature of between −40 to 80 degrees centigrade, a resolution of 640×480 pixels, and an optical wavelength response of between 400 and 1000 nanometers. The CCD camera may detect temperatures above 700K due, at least in part, to the wavelength response thereof. In some embodiments, the CCD camera may work with an automatic gain control to adjust for the amount of light provided in the cargo bay. Note that, in some embodiments, the CCD cameras may only have a response in the range of 400 to 700 nm, in which case additional cameras having a response in the range of 700-1000 nm may or may not also be used. The CCD cameras may use special lenses having, for example, a seventy five degree or ninety degree field of view. Other wide angle lenses, such as two-hundred and seventy degrees or even three-hundred and sixty degrees may be used.

The IR cameras may be uncooled (also known as a Focal Plane Array (FPA)) and may have a size of no greater than 6.5" by 2.2" by 2.2", a weight of no greater than 0.5 lbs., a power consumption of less than 1.2 watts, an operating temperature of between −10 and 60 degrees centigrade, a storage temperature of between −40 and 80 degrees centigrade, and an optical wavelength response of between 7 and 14 micrometers. The IR cameras may use special lenses having, for example, a seventy five degree or ninety degree field of view. Other wide angle lenses, such as two-hundred and seventy degrees or even three-hundred and sixty degrees may be used. The lens may be made out of Germanium, but Zinc Selenide may also be used. The FPA may be made out of amorphous silicon and have a 160×120 resolution. The IR cameras may detect temperatures of 230K and above and thus may not require additional illumination, Similarly, in an embodiment disclosed herein, the LEDs have a size of no greater than 2"×2"×2", a weight of no more than 0.125 lbs., a power consumption of no more than 1.5 watts, an operating temperature of between −40 to 70 degrees centigrade, and a storage temperature of between −55 and 120 degrees centigrade, and an optical wave length of around 820 nanometers.

The signals from the camera may be provided to a cargo video control unit (CVCU) 152. The CVCU 152 accepts signals from the cameras 112, 114, 115, 122, 124, 125, 132, 134, 135 and provides lighting control signals to the LED's 116-118, 126-128, 136, 138. In some embodiments, the CVCU 152 may receive digital data from the CCD cameras 114, 115, 124, 125, 134, 135. Alternatively, the CVCU 152 may use a frame grabber to convert an analog video signal from one or more of the cameras 114, 115, 124, 125, 134, 135 to one or more appropriate digital signals.

The CVCU 152 contains conventional on board processing to receive and send signals, as described herein, and to provide appropriate processing of the signals input thereto to determine if a fire can be verified. The CVCU 152 may contain a DSP chip or other DSP hardware to facilitate processing.

In an embodiment disclosed herein, the CVCU 152 is redundant and includes a first processing board 154 and a second processing board 156 having identical functionality to the first processing board 154. The design of the CVCU is redundant so that if one of the boards 154, 156 fails, the other one of the boards 154, 156 may perform the functions of the failed board. When the boards 154, 156 have not failed, one of the boards 154, 156 may be used to provide the processing described herein. Alternatively, in an embodiment disclosed herein, one of the boards 154, 156 may be used to process approximately half of the input signals while the other one of the boards 154, 156 may be used to process the remaining signals. The independent results provided by each of the boards may then be used for follow on processing, as described below.

Each of the boards 154, 156 contains appropriate hardware for receiving input signals, such as signals from the cameras 112, 114, 115, 122, 124, 125, 132, 134, 135. Each of the boards 154, 156 may also include appropriate hardware for actuating the LEDs and include appropriate processing for performing the detection/verification discussed herein. Each of the boards 154, 156 may also contain hardware for providing appropriate video output to be viewed by the user of the system, as described below. In an embodiment disclosed herein, each of the boards 154, 156 may operate in parallel to provide separate results that may be used by follow on processing.

The system includes a system video display 162 and an alternate video display 164. The system video display 162 may be a video screen provided in a cockpit for the for other purposes. The alternative video display 164 may be another alternative display provided for use in the cockpit for other purposes or may be provided for the sole purpose of use with the system described herein.

A video selector unit 166 provides a signal to the boards 154, 156 to select a particular video signal to be viewed on the system video display 162 and/or the alternative video display 164. The video selector unit 166 operates in a conventional fashion to provide a conventional signal to the boards 154, 156 indicating a position of a manually moveable actuator of the video selector unit 166. In response, the boards 154, 156 provide the selected video output signal to the video selector unit 166 which is then displayed on one or both of the system video display 162 and the alternate video display 164. The system may overlay a text message on one or both of the video displays 162, 164 to indicate the results of the other processing described herein. The output from an IR camera may be converted to a visual form so that, for example, different colors represent different temperatures. A conventional taxi aid camera system 168 may also provide a video input to the video selector unit 166 so that the video selector unit 166 may also select for display the video output from the taxi aid camera system 168. A recorder 172 may record the video output that is provided by the boards 154, 156.

The video signal provided to the video displays 162, 164 may be either the video signal provided directly by the cameras or may be an enhanced video signal, which represents the video signal from the cameras that has been processed to remove unwanted artifacts, such as the effects of vibration and distortion caused by lenses. Providing the enhanced video signal is described in more detail below.

In addition, in some cases, such as of a cargo compartments being fully filled with containers, the video signal from the cameras or even the enhanced video signal may not provide sufficient information about the state of the compartment (e.g., whether the compartment contains smoke, fog, dust, etc. and/or whether the compartment is in a fire or non-fire state). In those cases, the multiple two-dimensional camera views may be used to synthesize a three-dimensional view. The walls of the compartment and/or the contents may be represented in a wire frame form. Algorithms for doing this are known in the art. Then, the locations of suspected fire regions may be displayed within those frames. In some embodiments, one or more edge detection routines such as those disclosed herein may be used to outline a suspicious feature and a graphical outline of the feature may be superimposed on the video signal (raw, enhanced, and/or synthetic) to provide more information. An option of overriding the synthetic view option and returning to regular or enhanced video mode could be provided to allow verification of the source of the displayed diagnosis.

A conventional smoke detection control unit 174 and a central maintenance system 176 may also interface with the CVCU 152. The smoke detection control unit 174 indicates whether a fire has been detected by the conventional cargo bay fire detection system. In an embodiment disclosed herein, the signal from the smoke detection control unit 174 performs a gating function so that a user only receives an indicator of fire after the smoke detection and control unit 174 has provided a signal indicating the presence of fire. In other embodiments, the signal from the smoke detection control unit 174 is one of the inputs to follow on processing so that it is possible for the user to receive an indication that a fire is present even though the smoke detection control unit 174 has not detected a fire.

The central maintenance system 176 provides signals such as weight on wheels and ambient temperature which are used by the system in a manner discussed in more detail elsewhere herein. Other signals that may be provided by the smoke detection control unit 174 and/or the central maintenance system 176 include an indicator of whether fire suppression steps have already been taken. Note that some fire suppression steps (such as the spraying of Halon) may effect the fire detection/verification system and may be handled by, for example, filtering out any image distortion caused by the fire suppression steps.

The CVCU 152 contains processors that can run software that processes image data from the cameras to verify if a detected fire is a false alarm or not. That is, the software of the CVCU 152 receives as input video image data from the cameras and other external information, described below, and provides, as an output, video data to be displayed on one or both of the system video display 162 and alternate video display 164, and in addition, provides an indicator of whether a detected fire is a false alarm. For an embodiment disclosed herein, the components may communicate by any appropriate means, such as, for example, using an ARINC 429 transmit bus.

Figure 2:
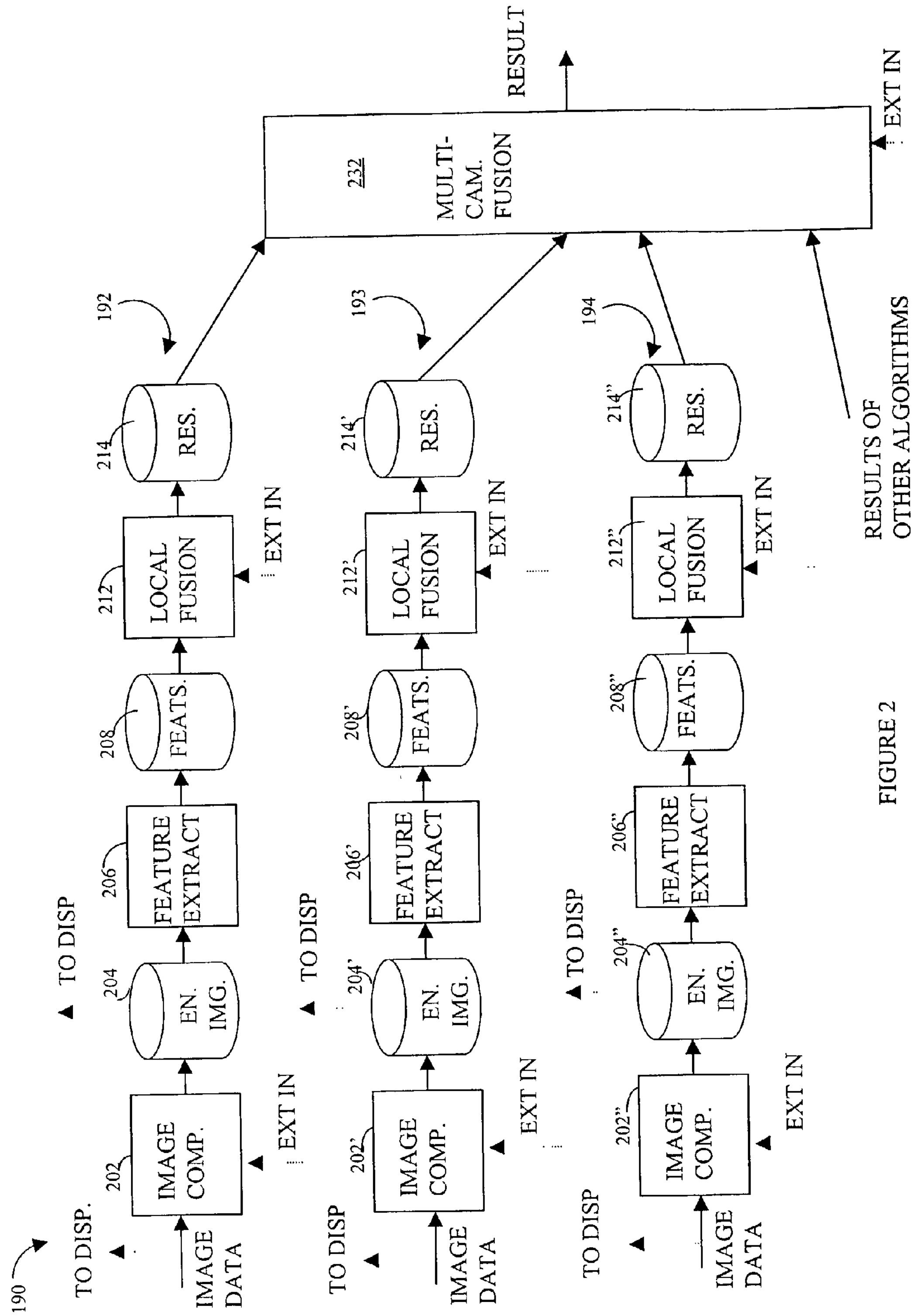
FIG. 2 is a data flow diagram illustrating operation of the system described herein.

Referring to FIG. 2, a data flow diagram 190 illustrates operation of the software that runs on each of the boards 154, 156 of the CVCU 152 of FIG. 1 to detect/verify fire in each of the cargo bays 102-104. In an embodiment disclosed herein, fire verification and detection is performed independently for each of the cargo bays 102-104. However, for other embodiments, the system described herein may be adapted to provide for performing fire verification and detection by processing and combining information from more than one of the cargo bays 102-104.

The diagram 190 shows a plurality of data paths 192-194, where each of the paths 192-194 represents processing performed on image data from one of the cameras. That is, for example, the path 192 represents processing performed on a first camera, the path 193 represents processing performed on a second camera, the path 194 represents processing performed on a third camera, etc. There may be as many data paths as there are cameras.

Turning to the data path 192, image data from the cameras is provided to an image compensation routine 202. The processing performed at the image compensation routine 202 includes, for example, adjusting the image for vibrations (using, for example, a conventional Wiener filter), compensation to account for any special lenses used on the cameras, compensation (image transformation) used in connection with the calibration (or miscalibration) of a camera, compensation for dynamic range unbalance, and temperature compensation for the IR cameras. Note that some calibration may be appropriate to compensate for aging of the cameras. Also, some of the compensation parameters may be preset (e.g., at the factory) and provided by, for example, the cameras themselves, to any compensation processing.

The image compensation routine 202 receives as input external values that are used in connection with the image compensation. The external values may include, for example, results provided by the smoke detection control unit 174 of FIG. 1, the ambient temperature which may used to handle compensation for the IR cameras, a weight-on-wheels signal (indicating that the aircraft is on the ground), an aircraft altitude signal, and a cargo bay door open status signal. Specific image compensation algorithms that may be used are discussed in more detail below. Note that the image data that is input to the image compensation routine 202 is also provided to the video displays 162, 164 of FIG. 1 (i.e., is also provided as a video output). In some embodiments, the user of the system may prefer to view the raw, uncompensated, image provided by the cameras.

The output of the image compensation routine 202 is enhanced image data 204. Note that the enhanced image data 204 is also provided to the video displays 162, 164. Thus, in some embodiments, a user can view both the raw video image data and the enhanced video image data. The benefit of having the option to view both is that, while the enhanced image data has many artifacts removed from it and thus may be an opportunity to see the image clearer, the user may question whether the image compensation routine 202 has added undesirable characteristics that make it difficult to evaluate. Accordingly, in an embodiment disclosed herein, the user would have the option of displaying the raw image or the enhanced image.

In an embodiment of the system herein, no follow on processing is performed beyond the processing performed at the image compensation routine 202. Thus, a user would be able to use the system to switch between raw and enhanced camera images using the video selector unit 166. When the smoke detection control unit 174 indicates the presence of a fire, the user switches between raw and enhanced images to view the source of the alarm. For other embodiments of the system, follow on processing is performed to detect/verify the presence of fire, as described below.

The enhanced image data 204 is provided to a feature extraction routine 206. The feature extraction routine process the enhanced image data 204 to provide feature data 208. Feature data is a description of the enhanced image reduced to various values and numbers that are used by follow on processing to determine if fire is present or not. Thus, the specific features that are provided in the feature data 208 depend upon what algorithms are being used to detect fire. For example, if the total pixel energy of video frames is one of the parameters used in an algorithm to detect fire, then one of the features provided with the feature data 208 and calculated by the feature extraction routing 206 would be the total pixel energy of a video frame.

The feature data 208 is provided as an input to a local fusion routine 212. The local fusion routine 212 may also be provided with external inputs similar to the external inputs provided to the image compensation routine 202. The local fusion routine 212 may process the feature data 208 to determine whether a fire is present and/or to determine the likelihood of a fire being present. The processing performed by the local fusion routine 212 is discussed in more detail below. The output of the local fusion routine 212 is result data 214 which indicates the result of the local fusion processing at the local fusion routine 212.

Similar processing for other cameras may be performed for the data path 193 and the data path 194 (and other data paths not shown). Corresponding routines and data of the data path 193 are marked with a single '. Corresponding routines and data of the data path 194 are marked with a double ".

The results for the fusion calculations for each of the cameras are provided in the result data 214, 214', 214". The result data 212, 214', 214" from the different data paths 192-194 is provided to a multi-camera fusion routine 232. The multi-camera fusion routine 232 combines results for the different cameras to determine an overall result indicating whether a fire is present or not and/or the likelihood of a fire being present. The multi-camera fusion routine 232 may also receive a signal from the smoke detection control unit 174 of FIG. 1 and/or may receive results from other fire detection algorithms not specifically disclosed herein. The multi-camera fusion routine also receives other external inputs like those received by the image compensation routines 202, 202', 202" and the local fusion routines 212, 212', 212". For example, the multi-camera fusion routine 232 may receive an pitch and roll indicator allowing for a sensitivity adjustment because of the fact that cargo moving in the cargo bays 102-104 may result in a false alarm due to the resulting change caused to the images received by the cameras.

Note that in some embodiments, there may be less processing performed at the local fusion routines 212, 212', 212" and more processing performed at the multi-camera fusion routine 232. That is, the processing of the features 208, 208', 208" may be shifted and allocated between and among the local fusion routines 212, 212', 212" and the multi-camera fusion routine 232. In some embodiments, the multi-camera fusion routine 232 is simply a score of the various weighted results of the individual camera fusion routines. In another embodiment, the multi-camera fusion routine 232 could provide an OR of individual boolean results.

The image compensation performed at the steps 202, 202', 202" may include compensation for camera artifacts, compensation for dynamic range unbalance, compensation for aircraft vibration, compensation for aircraft temperature variations, and compensation for fog and smoke effects. State-of-the-art digital cameras may provide for some level of preliminary filtering directly within camera hardware. The resulting image may be acquired by the CVCU 152 through standard means. Image preprocessing may be applied to provide images with acceptable clarity as well as to prepare the image for further processing. Preprocessing steps include image restoration and image enhancement.

Camera artifacts are one of the sources of inaccuracy in vision-based detection systems for which compensation may be provided at the routines 202, 202', 202". As a camera ages, pixels within the focal plane turn "dead" and will appear in the image as permanently bright or dark spots. Similarly, whole lines may drop out as dark or bright, and the camera may produce some vertical streaking. Most of these artifacts may be automatically factored out without expensive preprocessing by considering the presence of change between video frames. Straight and effective techniques that include image subtraction and image averaging may be used in the system described herein. Smoothing filters (e.g. low-pass filters and median filters) as well as sharpening filters (e.g. high-pass filters) that are simple and effective in dealing with background noise and illumination irregularities may be used. Because indicators of a fire may be in a statistical difference of subsequent frames—differences caused by real phenomena other than noise, stochastic techniques may be used with the system described herein. Among such methods, histogram processing may be used given its simplicity and effectiveness in capturing statistical trends. The histogram representation provides information about the image gray level distribution. The shape of a histogram, in particular, may provide useful information to exclude the effect of irregular pixels caused by camera artifacts. A priori knowledge of the statistics of pixel distribution in the difference-images facilitates compensation for the artifacts. This a priori knowledge may be gained, for example, by estimating the camera parameters through some calibrations and/or by obtaining information from the camera manufacturer.

In addition to the dead spots and lines caused by the camera imperfections, it is possible for a camera to display non-uniform brightness across a field of view where the center is brighter than the corners. Image enhancement performed at the routines 202, 202', 202" may include a technique that handles such artifact is to enhance the image in the space domain by applying a contrast stretching technique that increases the dynamic range of the image. A simple comparison of the dynamic range with a predetermined reference image may provide appropriate enhancement and bring the dynamic range within an optimal distribution for both IR and visible images. Bright sources such as fire and heated objects in thermal IR imagery and light sources in visible imagery can quickly saturate the dynamic range of the frames. A linear transformation of the dynamic range of the cameras may first be provided to balance the image grayscale distribution. For a particular camera type, tests may be conducted to calibrate the dynamic range of the cameras and to cause the image to be in the capability of the display screen.

Hotspots detected by IR cameras may be enhanced at the routines 202, 202', 202" by using a gray level slicing technique to highlight a specific range of gray levels where hotspot-related features may be more ostensible. Spatial filters that approximate a given frequency-based filter may be generated from frequency domain specifications to take advantage of both space and frequency domains. This technique may be tested in terms of enhancement performance and execution speed.

In addition, in some cases the compensation routines 202, 202', 202" may be used to filter out know hot areas of the cargo bays 102-104 from the IR data. For example, the cargo bays 102-104 could be relatively warm due to the aircraft having been on the ground in a warm area. Also, mechanical coolers provided in the cargo bays 102-104 could generate local hot spots that are filtered out at the image compensation routines 202, 202', 202". Other non-fire sources heat may also need to be filtered out.

With respect to vibration, the image compensation performed at the routines 202, 202', 202" may include a simple frame-difference that minimizes the vibration effect to a very low level. Then, a Wiener filter may be applied to substantially improve the image quality. The efficiency of the Wiener filtering approach stems from a realistic assumption about the image noise caused by unstable cameras. It may be assumed that image blurring due to camera motion is convolutive (and not additive or multiplicative) in nature. In the case of a uniform linear motion of the sensing camera, an analytical expression of the optimal (in the sense of mean square minimization) restored image may be provided by the Wiener filtering technique. In some instances, an assumption of uniform linear motion may not be fully met. In those cases, it is acceptable to adjust the so-called Wiener parameter until an acceptable quality of restoration is obtained.

In some cases, it may be anticipated that after applying the Wiener filter, there may still be traces of a periodic type on the resulting frame. This effect may be suppressed in the frequency domain via homomorphic filters. Such filters may be designed to perform a simultaneous brightness range compression and contrast enhancement. Homomorphic filters are based on the assumption that a pixel value is a product of the illumination component and the reflection component at the location of such a pixel. The filter starts by applying a logarithmic transformation to the image of interest to split the illumination and the reflection components from each other. Then, the resulting image is processed in the frequency domain where both functions of brightness range compression and contrast enhancement are performed simultaneously. A more simple, yet effective technique of matrix multiplication may be used to suppress the camera vibration effect. The Matrix elements may be determined and verified in relation with the vibration patterns (e.g. frequency, magnitude, orientation . . . etc) observed in an aircraft environment.

Temperature variability due to aircraft location and altitude may be accounted for by the fire detection system in connection with use with the IR cameras. Hot airfields in hot climates cause cargo bay temperatures to be quite different from high altitudes in cold climates. A statistical change detection approach provided at the routines 202, 202', 202" solves this problem by taking its thermal baseline as dictated by ambient conditions. Various thermal baselines may be determined for each flight profile including, loading, landing/taking off, and cruising. The thermal baselines may be defined in a such a way that changes in ambient thermal conditions do not cause false alarms by the system. Aircraft profiles may be analyzed to determine the correct baseline-setting strategy.

During fog or smoke, everything may look gray. Although all the information about a scene may be in the "gray" image, the human eye may not be able to distinguish the gray scale differences on various objects. The routines 202, 202', 202" may handle this by expanding the dynamic range of the image to match the human eye. The lowest luminance levels in the image could be made more 'dark' whereas the highest levels could be made more 'bright'. The matching of the dynamic range can be done through hardware by tuning the gain and offset (contrast and brightness) of the camera or through software by using a nonlinear transformation of the dynamic range. One method of foggy image enhancement is a conventional technique called "histogram stretching".

Figure 3:
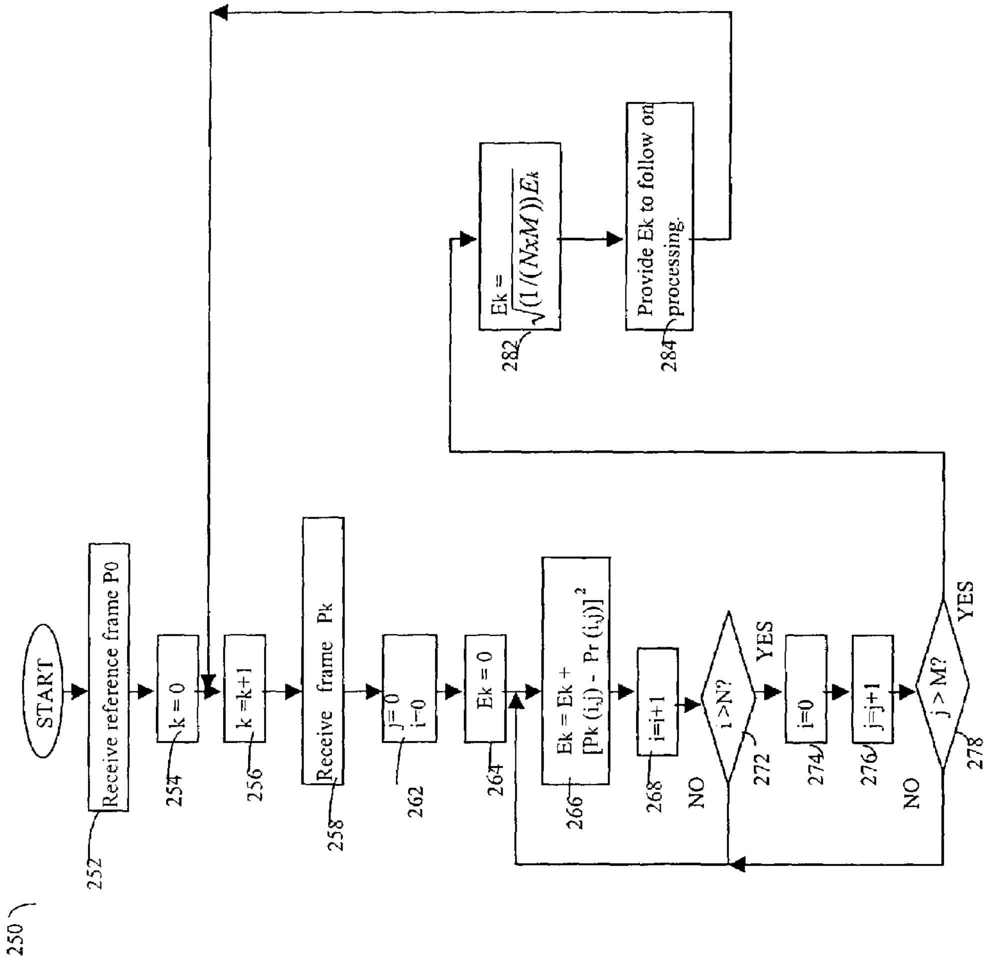
FIG. 3 is a flow chart illustrating determination of video frame energy according to the system described herein.

Referring to FIG. 3, a flow chart 250 illustrates a portion of the processing that may occur at the feature extraction routines 206, 206', 206". The energy of the frames of the video image (i.e., brightness of the pixels) may be useful for follow on processing that detects/verifies the presence of fire in one or more of the cargo bays 102-104. The energy for frames of the video may be determined by comparing the energy of each frame to a reference frame (a video frame that represents a no fire condition) or by comparing the energy of each frame to the energy of an immediately preceding frame (first order effect) or by comparing the energy of each frame to the energy provided two frames prior (second order effect). These techniques will be described with reference to FIG. 3.

Processing begins a step 252 where a first reference frame, $P_0$, is received. The first reference frame may be stored in the memory of the system or may be the first video frame provided when the system is initialized. Note that determination of the first reference frame when the system is initialized may depend upon receipt of a signal indicating that the cargo bay door is closed. Otherwise, the first reference frame may contain undesirable energy from ambient light that occurs when the cargo bay door is open.

Following the step 252 is a step 254 where a variable k is set to zero. The variable k is used to index each of the frames. Following the step 254 is a step 256 where the variable k is incremented. Following the step 256 is a step 258 where the frame $P_k$ is received. The frame $P_k$ represents the kth video frame. Following the step 258 is a step 262 where index variables i and j are set to zero. Following the step 262 is a step 264 where a quantity $E_k$ is set to zero. The quantity $E_k$ represents the energy associated with the kth video frame.

Following the step 264 is a step 266 where the quantity $E_k$ is set equal to the previous value of $E_k$ plus the square of the difference between the energy at pixel i, j of the current frame, $P_k(i,j)$, and the energy at pixel i, j of the reference frame, $P_r(i,j)$, which is either $P_0(i,j)$ (the reference frame), $P_{k-1}(i,j)$ to measure a first order effect of rate of change, or $P_{k-2}(i,j)$ to measure a second order effect of rate of change. Note that for calculating the second order effect, it may be necessary to obtain two reference frames, $P_0$ and $P_1$, at the step 252, in which case k may be initialized to one at the step 254.

Following the step 266 is a step 268 where the index variable i is incremented. Following the step 268 is a test step 272 where it is determined if the index variable i is greater than N. N represents a maximum value for i which corresponds to the number of pixels in the direction indexed by the variable i. If it is determined at the test step 272 that i is not greater than N, then control transfers back to the step 266, discussed above, to continue computation of $E_k$. Otherwise, if it is determined at the test step 272 that i is greater than N, then control transfers from the step 272 to a step 274 where i is set equal to zero, thus resetting i to facilitate processing the next group of pixels. Following step 274 is a step 276 where the index variable j is incremented. Following the step 276 is a test step 278 where it is determined if j is greater than M, where M represents the number of pixels in the jth direction. If not, then control transfers from the step 278 back to the step 266, discussed above, to continue calculation of $E_k$.

If it is determined at the test step 278 that j is greater than M, then all of the pixels of the frame have been processed and control transfers from the step 278 to a step 282 where the value of $E_k$ is further calculated by taking the square root of the current value of $E_k$ divided by the product of N times M. Following the step 282 is a step 284 where the value of $E_k$ as provided to follow on processing (i.e., local data fusion and multi camera data fusion) to perform appropriate detection and verification. The follow on processing is described in more detail below. Following the step 284, control transfers back to the step 256 to process the next frame.

The flow chart 250 of FIG. 3 and the description above represents calculating the energy difference between each video frame and a reference frame. The reference frame could either be a background frame of a no fire condition ($P_0$) or could be the previous video frame ($P_{k-1}$) (first order effect) or could be the frame before the previous frame ($P_{k-2}$) (second order effect). The use of all these types of values is described elsewhere herein. However, note that it may be possible to calculate multiple values for each $E_k$ by using the different alternatives for the reference frame $P_r$, discussed above.

In some instances, it may be desirable to not use all of the pixels produced by the cameras to perform the energy calculations illustrated in FIG. 3. For example, it may be desirable to conserve processing power by using half as many pixels (by, for example, selecting every other pixel for processing). It is also possible to first re-size or down-sample each frame produced by the cameras (using any one of a variety of possible compression techniques) prior to performing the calculations illustrated in FIG. 3. Alternatively still, it is possible to select only a portion of each frame for processing, either before or after any compression. The selection of a portion of each frame may be performed by any one of a variety of techniques such as, for example, selecting a portion of each frame containing the greatest pixel variability or selecting a portion of each frame containing the greatest pixel energy. The selection may also be performed by using any one of a variety of techniques to determine a portion of the frame surrounded by the highest pixel gradient. One of a variety of edge detection techniques and/or multiscale modeling, discussed below, may be used to select portions of the video frames for processing.

It is possible to use the calculated frame energy values to predict the presence of fire. In some instances, fire will cause the frame energy to increase relative to a background image. Thus, detection of a frame energy increase could be used to detect and/or verify the presence of fire. In other instances, it may be possible to use the calculated frame energy values, and the distribution thereof, to differentiate between smoke (i.e., a fire condition) and false conditions that would cause the smoke detection control unit 174 to incorrectly indicate the presence of fire, such as when fog is present in one of the cargo bays 102-104.

Figure 4:
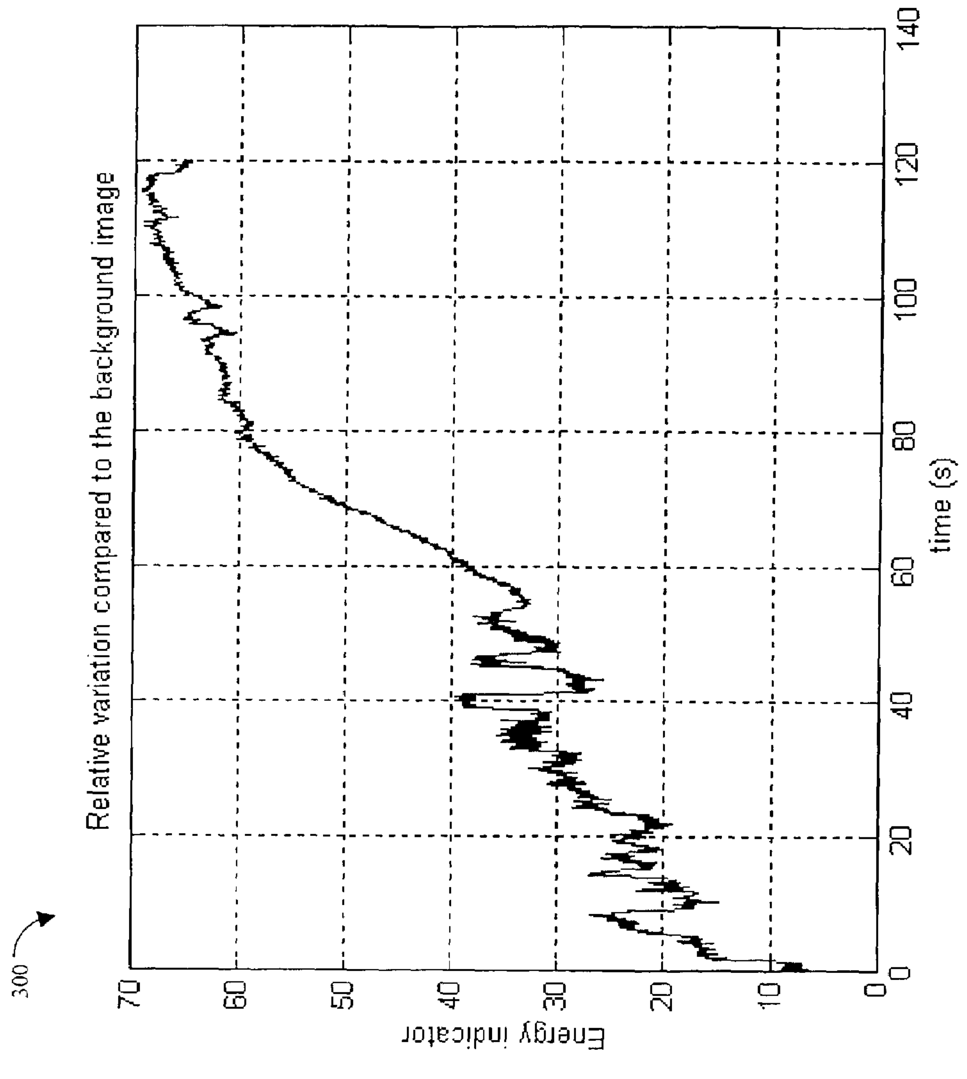
FIG. 4 is a graph illustrating an energy indicator as a function of time for video frames corresponding to a fire condition according to the system described herein.

Referring to FIG. 4, a graph 300 illustrates the value of an energy indicator (i.e., $E_k$) relative to time when a fire occurs. In the case of the graph 300, the energy indicator is calculated by comparing the pixel brightness at each frame with the brightness of a corresponding pixel of a background image. As can be seen from the graph 300, the energy generally increases with time in the case of a fire being present. The energy values calculated at the feature extraction routines 206, 206', 206" may be provided to the corresponding local fusion routine 212, 212', 212" and/or the multi-camera fusion routine 232 to detect a relative increase in the energy indicator using, for example, a neural network. Using a neural network or other techniques to process the energy indicators to detect characteristics indicative of fire is described in more detail below.

Figure 5:
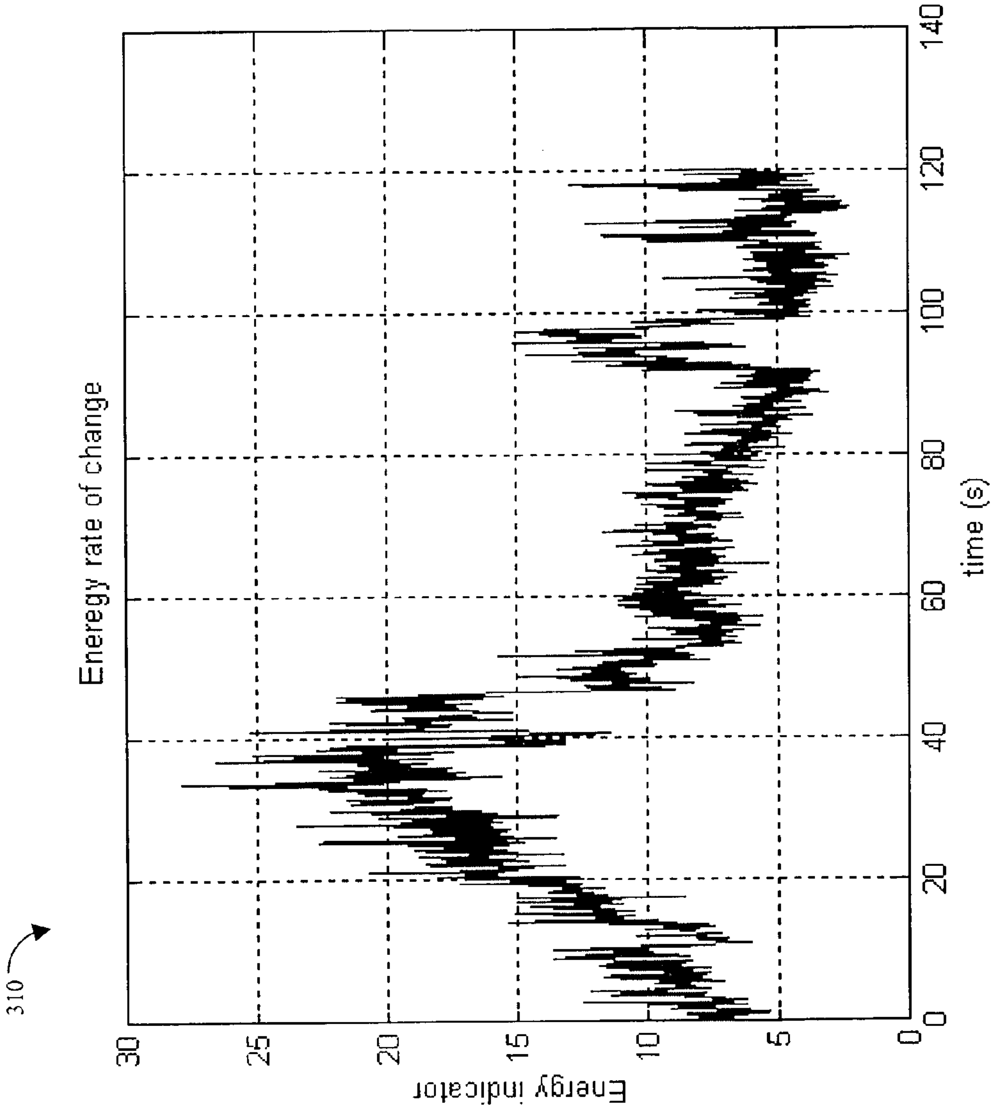
FIG. 5 is a graph illustrating a first order rate of change for an energy indicator as a function of time for video frames corresponding to a fire condition according to the system described herein.

Referring to FIG. 5, a graph 310 illustrates energy rate of change of the energy indicator (first order effect, described above) with respect to time when a fire is present. Although it may not be visually apparent from the graph 310 that the energy rate of change correlates with the presence of fire, it may be possible in some instances to use this data to train a neural network (or other follow on processing, described below) to obtain useful information/correlation between the presence of fire and the first order effect energy rate of change.

Figure 6:
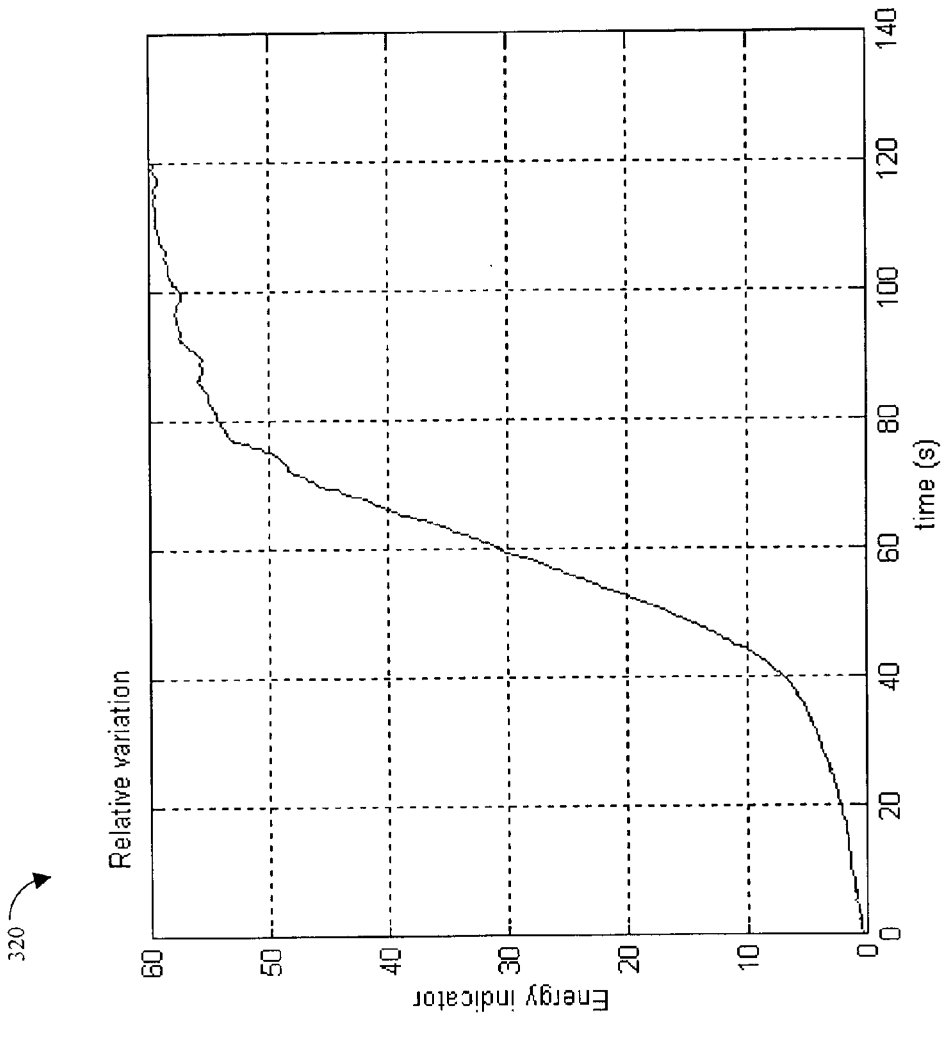
FIG. 6 is a graph illustrating an energy indicator for IR energy as a function of time for video frames corresponding to a fire condition according to the system described herein.

Referring to FIG. 6, a graph 320 indicates the energy indicator for an IR camera with respect to time in connection with the presence of fire. The graph 320 indicates a relatively significant increase in the energy indicator when fire is present. Accordingly, the graph 320 appears to show a relatively good correlation between the presence of fire and the increase in the IR energy indicator.

Figure 7:
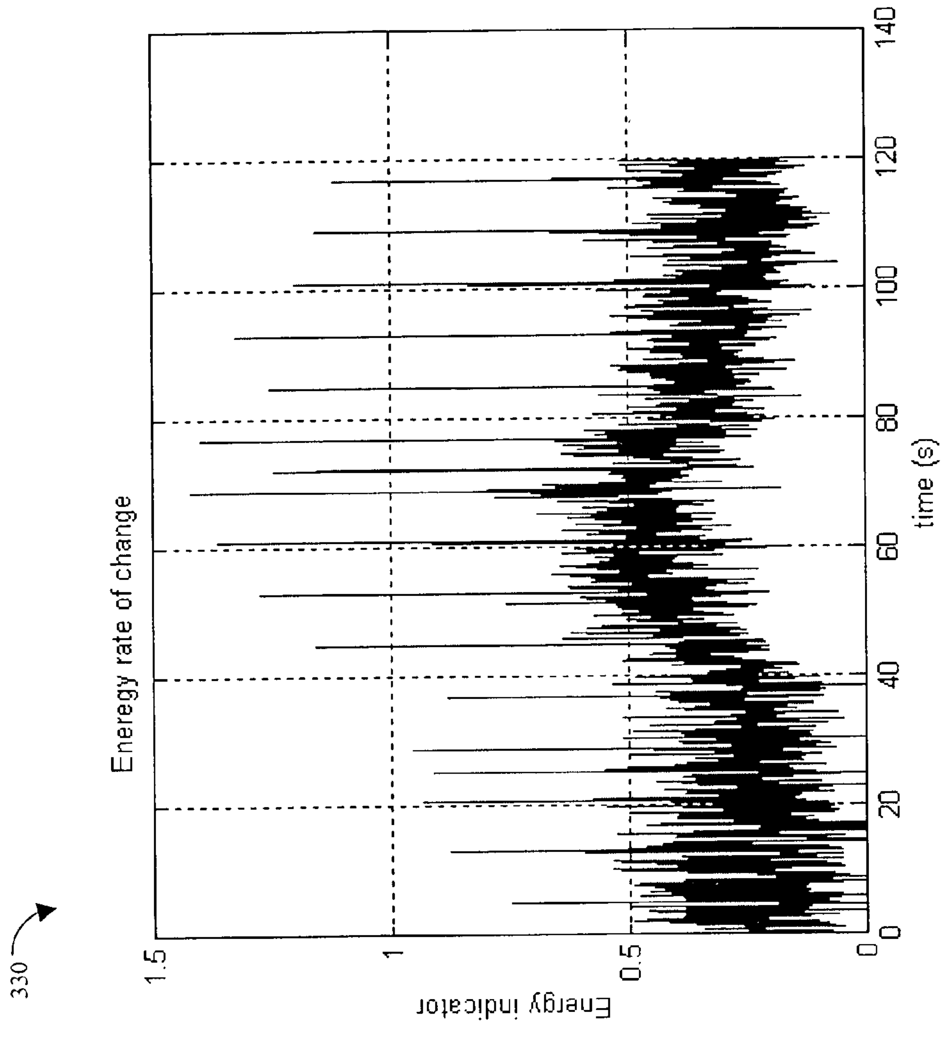
FIG. 7 is a graph illustrating a first order rate of change for an energy indicator for IR energy as a function of time for video frames corresponding to a fire condition according to the system described herein.

Referring to FIG. 7, a graph 330 illustrates an energy rate of change (first order effect) of the energy indicator of an IR camera over time in the presence of fire. In the case of the graph 330, it may not be visually apparent that there is a strong correlation between the first order effect energy rate of change in the energy indicator of an IR camera and the presence of fire. However, it may be possible in some instances to use this data to train a neural network (or other follow on processing, described below) to obtain useful information/correlation between the presence of fire and the first order effect energy rate of change of the energy indicator from an IR camera.

In some instances, a system may have difficulty distinguishing between smoke and the presence something that looks like smoke, such as fog, which may cause the smoke detection control unit 174 to issue a false alarm. Accordingly, it may be useful to be able to distinguish between smoke and (for example) fog in order to reduce the likelihood of false alarms. The following graphs illustrate measured differences between the energy indicators associated with fog and the energy indicators associated with smoke which was generated by burning a box in a test cargo bay.

Figure 8:
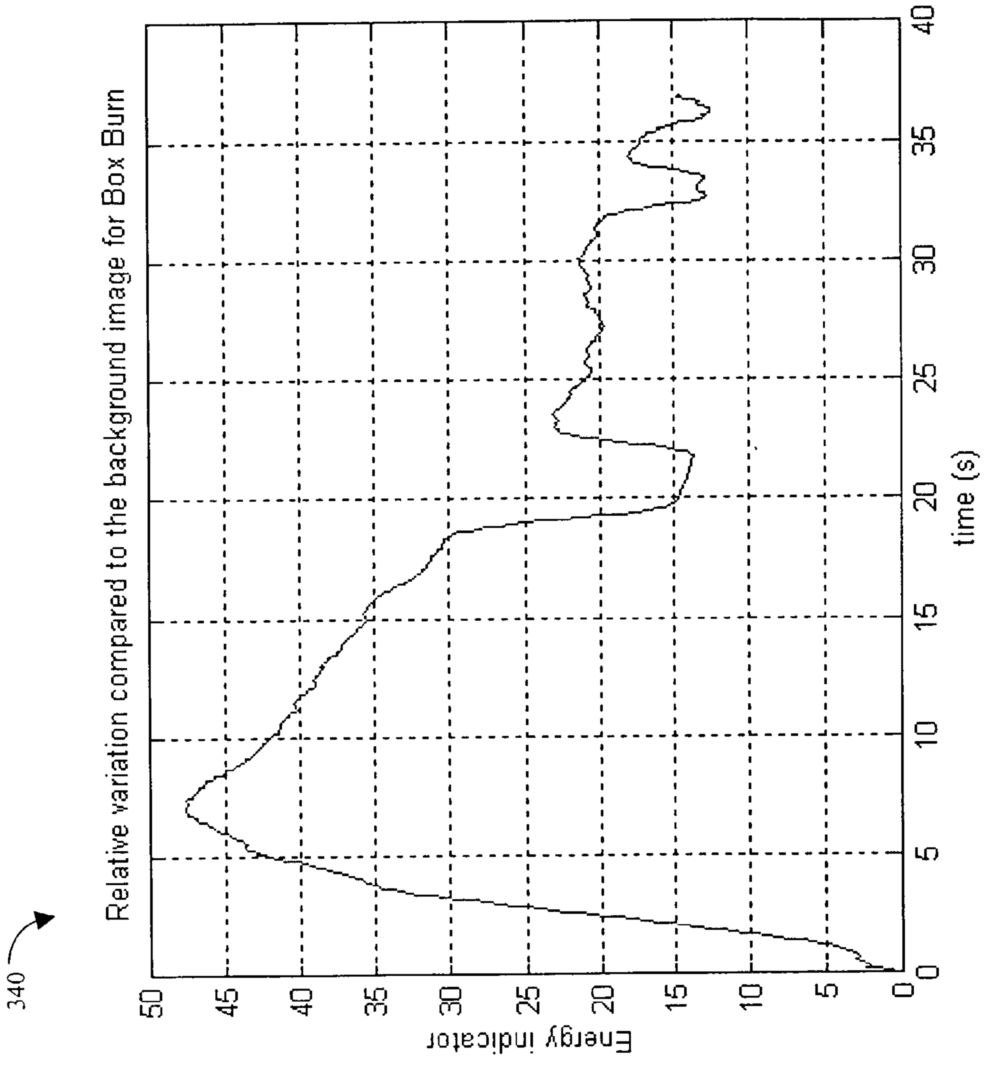
FIG. 8 is a graph illustrating an energy indicator as a function of time for video frames corresponding to a smoke condition according to the system described herein.

Referring to FIG. 8, a graph 340 illustrates a plot of an energy indicator as a function of time for the box burn. The energy indicator was calculated using a background reference frame ($P_0$, described above). Note that the value of the energy indicator generally increases until around seven seconds and then begins to generally decrease, perhaps due to the increase in smoke blocking light to the camera when the decrease begins.

Figure 9:
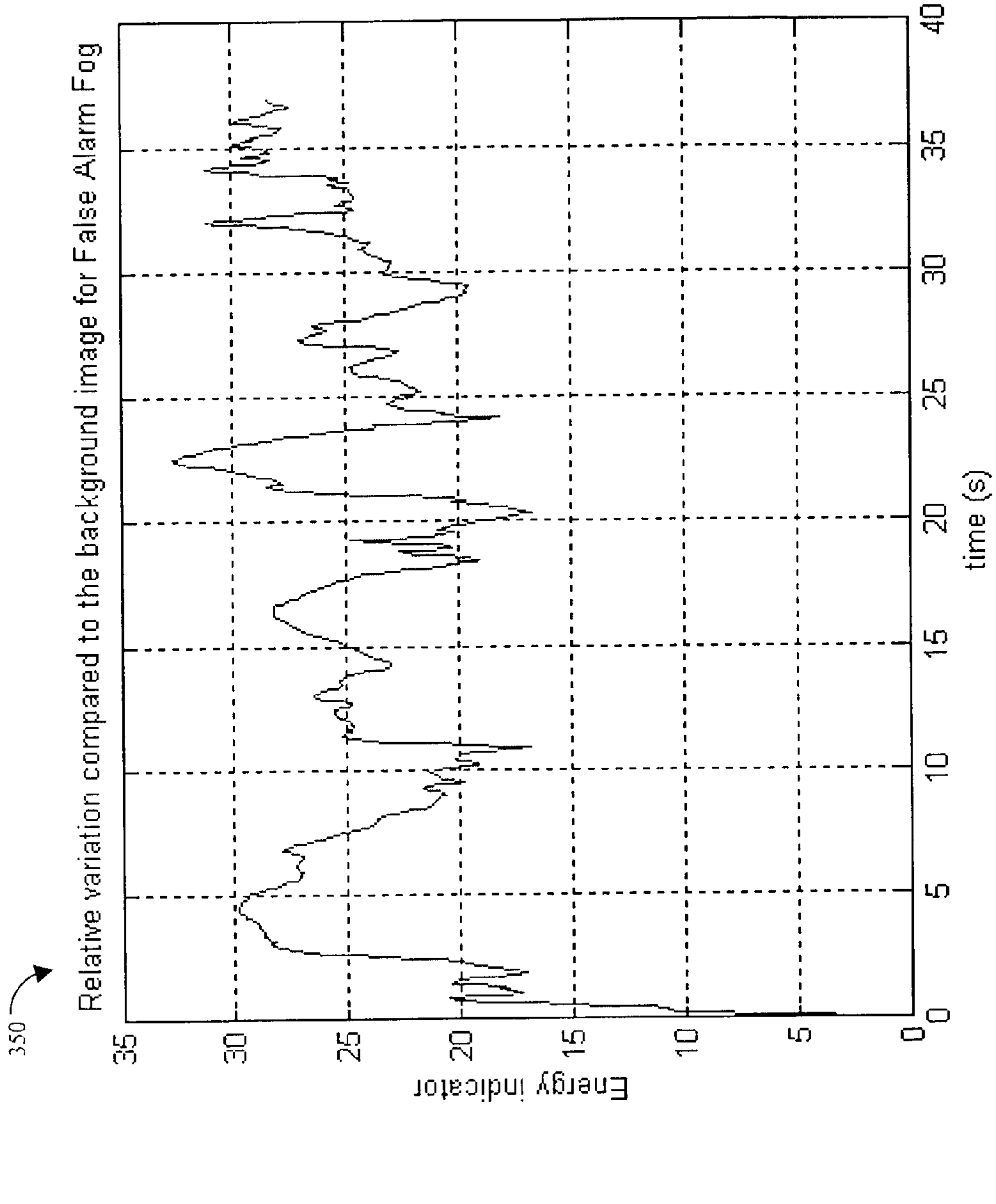
FIG. 9 is a graph illustrating an energy indicator as a function of time for video frames corresponding to a fog condition according to the system described herein.

Referring to FIG. 9, a graph 350 shows the plot of an energy indicator with respect to time for fog. Note the differences between the graph 350 and the graph 340 of FIG. 8. This indicates that the energy indicator comparing the frame energy with the background frame energy as a function of time is potentially a good predictor and a good discriminator between smoke and fog. As described in more detail below, this may be used by follow on processing (such as a neural net) to differentiate between smoke (a true fire condition) and fog (a false alarm).

Figure 10:
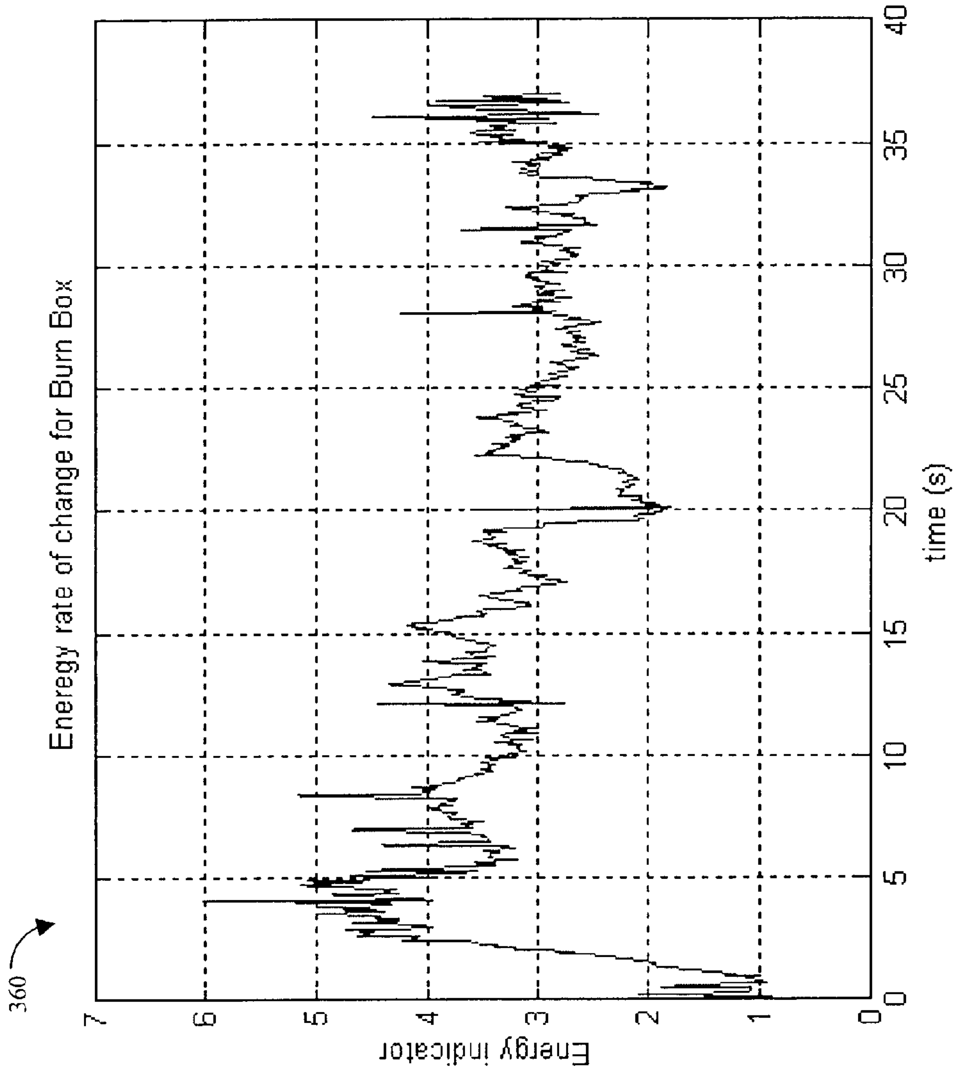
FIG. 10 is a graph illustrating a first order rate of change of an energy indicator as a function of time for video frames corresponding to a smoke condition according to the system described herein.

Referring to FIG. 10, a graph 360 illustrates an energy rate of change (first order effect) for an energy indicator as a function of time for a burn box (smoke). The energy rate of change is determined by comparing the frame energy between successive frames.

Figure 11:
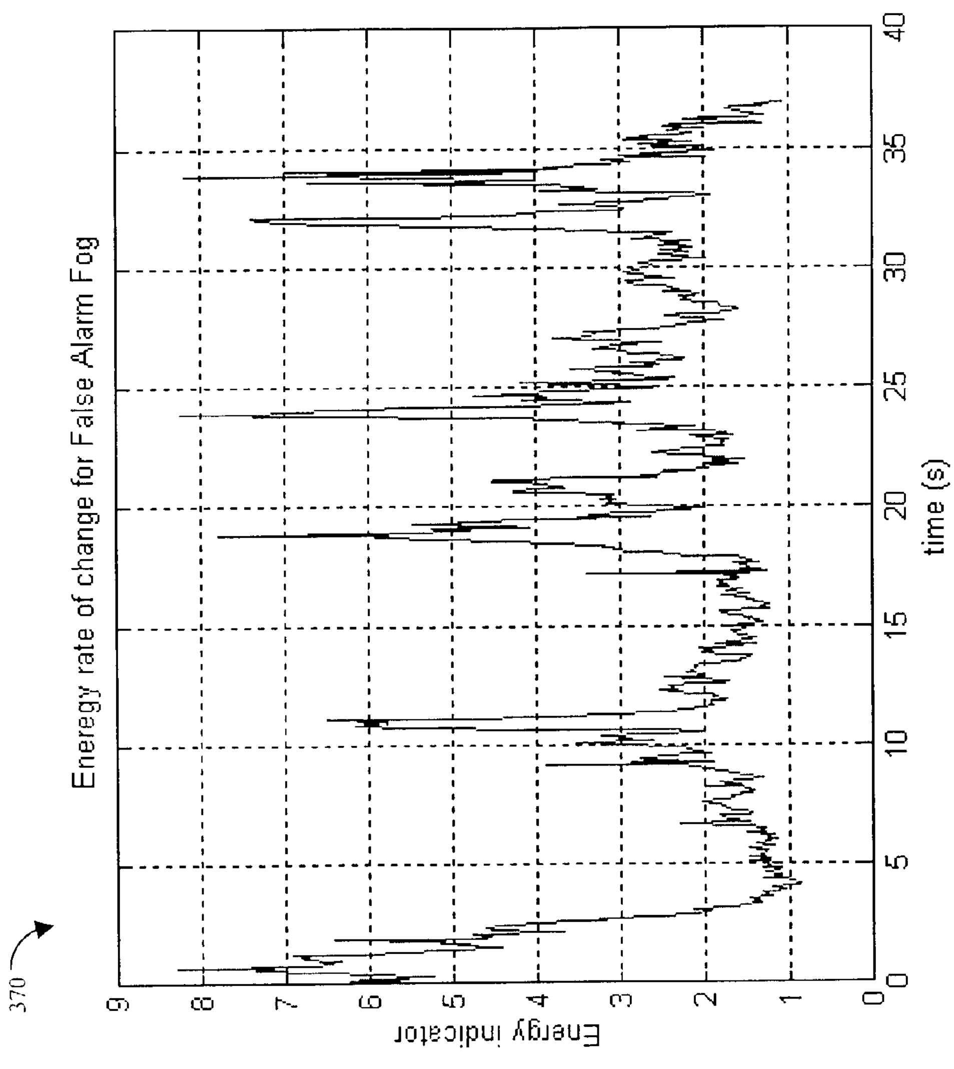
FIG. 11 is a graph illustrating a first order rate of change of an energy indicator as a function of time for video frames corresponding to a fog condition according to the system described herein.

Referring to FIG. 11, a graph 370 illustrates an energy rate of change (first order effect) for an energy indicator as a function of time for fog. Note the differences between the graph 370 and the graph 360. This indicates that the energy rate of change (first order effect) of the energy indicator is potentially a good predictor and discriminator between fog and smoke. This information may be used by follow on processing, described below, to differentiate between smoke and fog.

Figure 12:
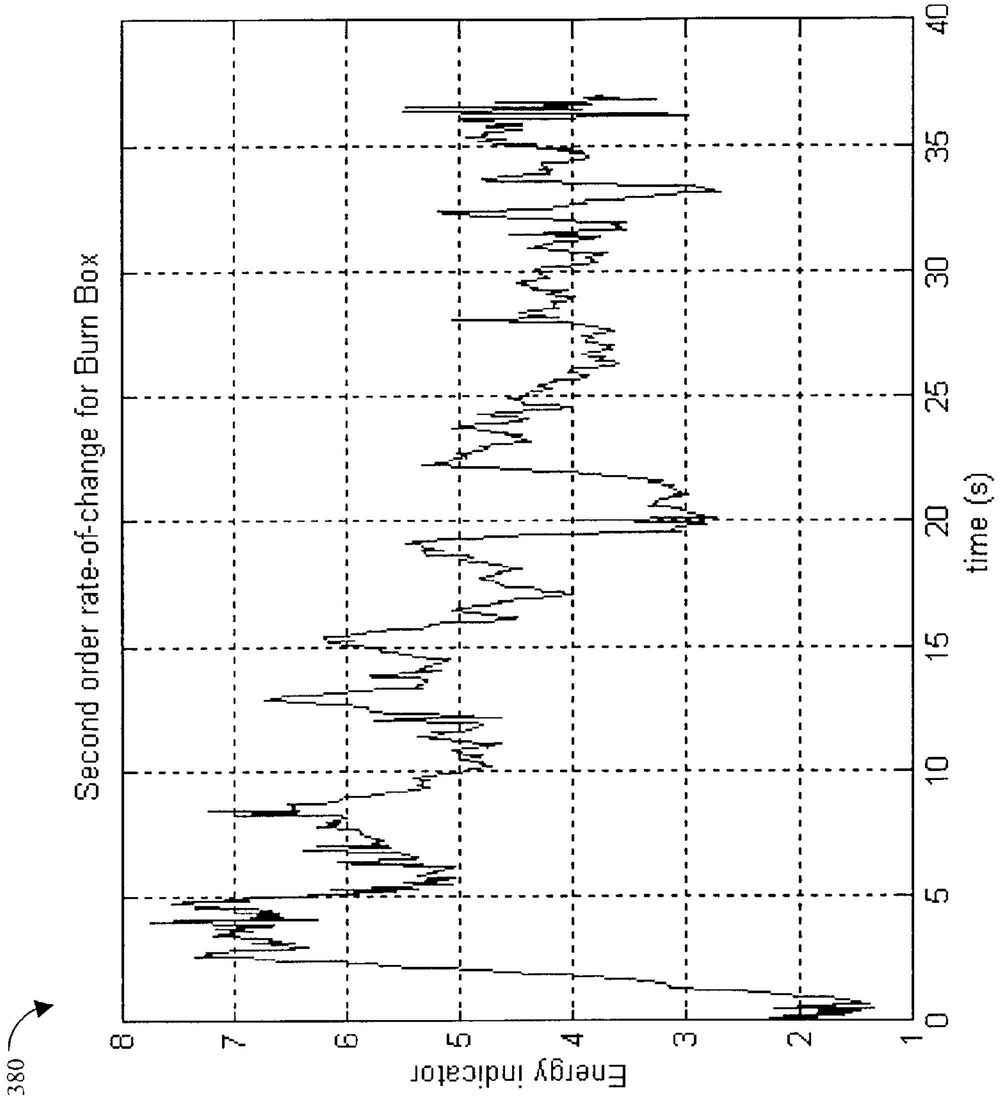
FIG. 12 is a graph illustrating a second order rate of change of an energy indicator as a function of time for video frames corresponding to a smoke condition according to the system described herein.

Referring to FIG. 12, a graph 380 illustrates a second order energy rate of change for an energy indicator as a function of time for a bum box (smoke). The second order energy rate of change is determined by comparing the energy of a frame with the energy of a frame that precedes a previous frame.

Figure 13:
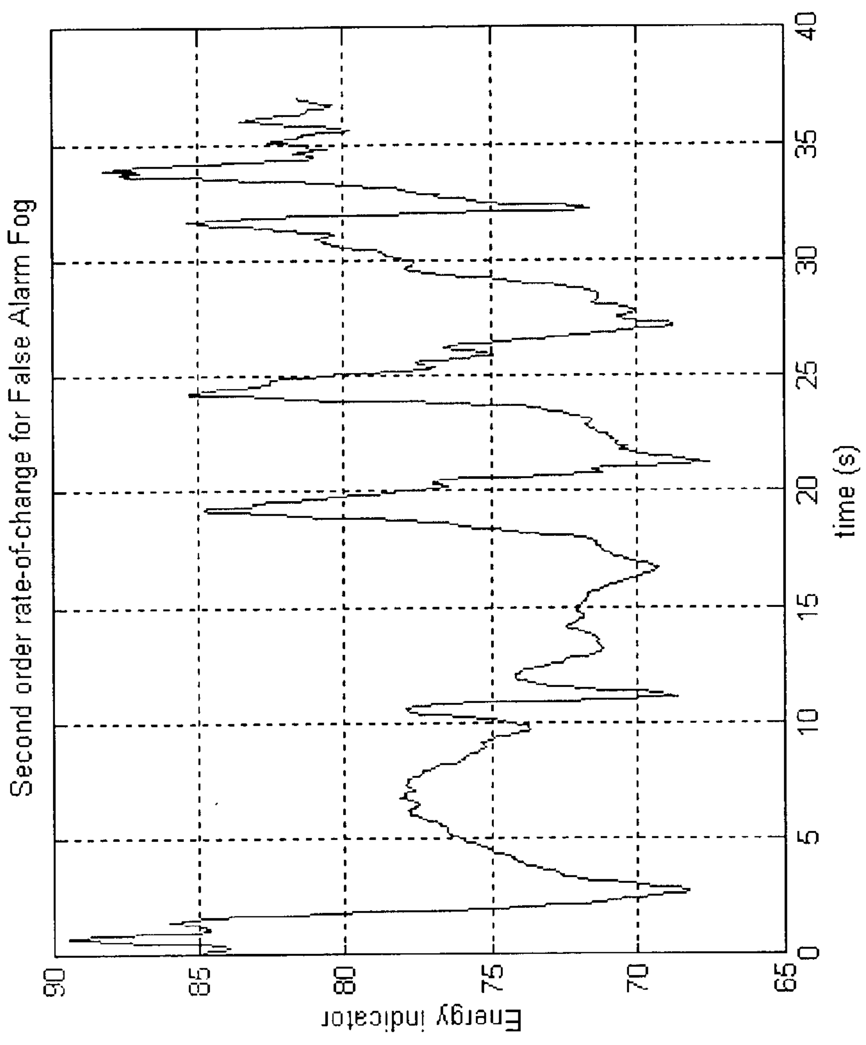
FIG. 13 is a graph illustrating a second order rate of change of an energy indicator as a function of time for video frames corresponding to a fog condition according to the system described herein.

Referring to FIG. 13, a graph 390 illustrates a second order energy rate of change for an energy indicator as a function of time for fog. Note the differences between the graph 390 and the graph 380. This indicates that the second order energy rate of change of the energy indicator is potentially a good predictor and discriminator between fog and smoke. This information may be used by follow on processing, described below, to differentiate between smoke and fog.

Other features that may be useful to extract at the feature extraction routines 206, 206', 206" include space variance of pixel intensity. For example, the presence of a "bright spot" within one of the cargo bays 102-104 may indicate the presence of fire. The space variance of pixel intensity features may be calculated using any one of a variety of conventional techniques, such as measuring the deviation in brightness between regions of the frames. Note also that it may be possible to perform separate feature extraction of regions of the frames so that, for example, one region has a first set of features associated therewith and another region has another set of features associated therewith. Having separate sets of features for different regions could allow for more sophisticated processing by the multi-camera fusion routine 232.

Another feature that may be useful to extract at the feature extraction routines 206, 206', 206" relates to the edges found in an image. Edge extraction routines detect edges by locating portions of the image having a pixel intensity gradient greater than a predetermined value. The output of an edge detection routine, the edge locations in the imagine, may be indicated by a pixel having a first value (i.e., one or zero) where edges are detected and by a pixel having a second, different, value for areas of an image where no edges are detected. There are a variety of conventional edge detection techniques known in the art. Examples include the Sobel technique, the Prewitt technique, the Roberts technique, and the Canny technique. There are also conventional methods that use Laplacian of Gaussian and zero-crossing methods.

Many conventional edge detection techniques find edges using an approximation of the first derivative to detect points of maximum gradient. The Canny technique finds edges by looking for local maxima of the gradient of the original image. The gradient may be calculated using the derivative of a Gaussian filter where two thresholds to detect strong and weak edges are defined. The Canny technique identifies weak edges in the output only if the weak edges are connected to strong edges. The Laplacian of Gaussian method finds edges by looking for zero crossings after filtering the original image with a Laplacian of Gaussian filter. The zero-cross method finds edges by looking for zero crossing after filtering the original image by a user specified filter (e.g., a low pass filter). Various edge detection techniques are disclosed, for example, in the publication "Digital Image Processing" by R. C. Gonzales and R. E. Woods, published by Prentice Hall (www.prenhall.com/gonzalez-woods).

Figure 14:
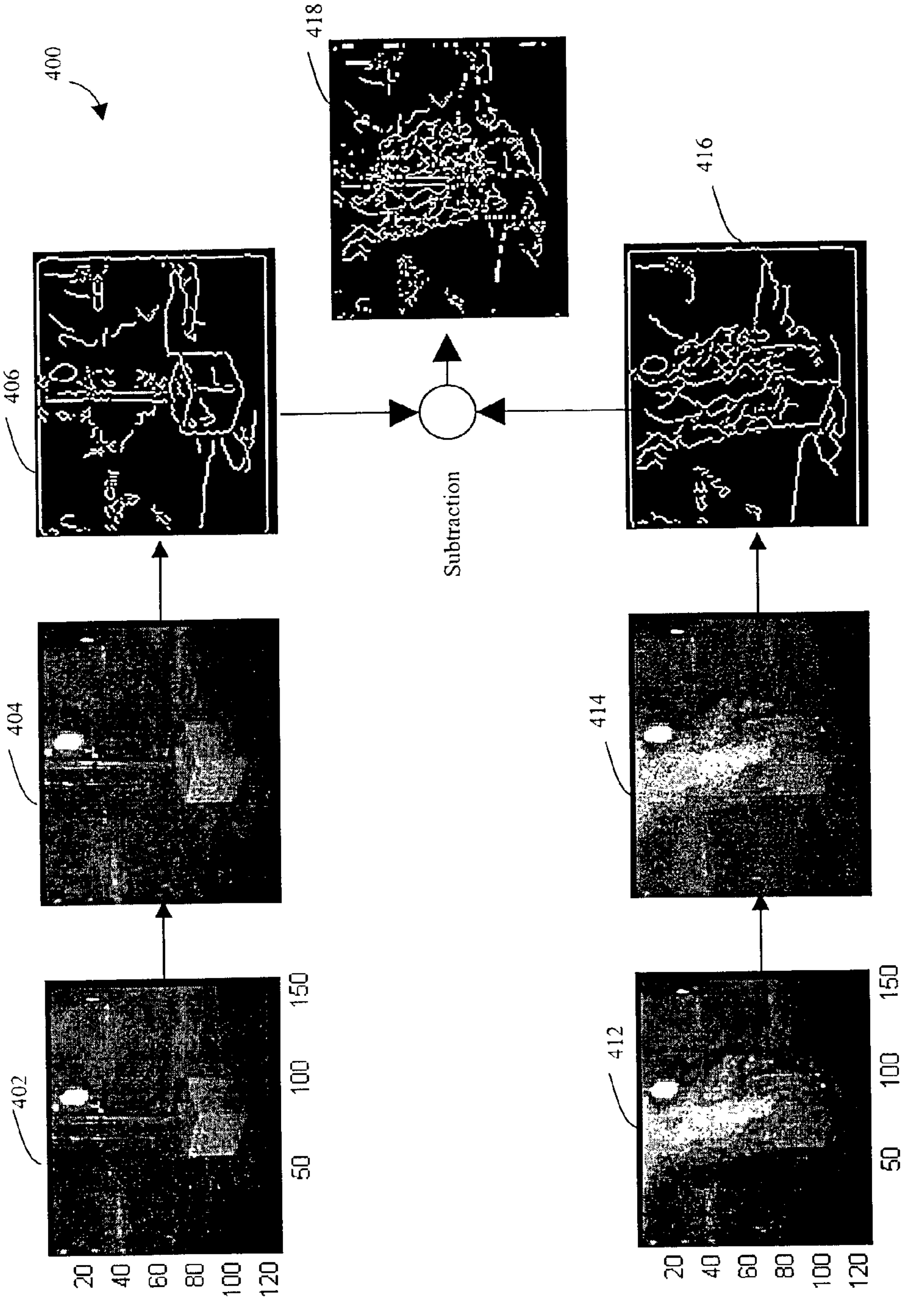
FIG. 14 is a diagram illustrating edge detection and comparison according to the system described herein.

Referring to FIG. 14, a diagram 400 illustrates extraction of edge features used to detect fire. Two frames 402, 404 represent reference frames corresponding to no fire being present. The frame 404 occurs after the frame 402. The result of performing edge detection on one of the frames 402, 404 is shown in the edge result frame 406.

In contrast, two frames 412, 414 show conditions corresponding to a fire. The frame 414 occurs after the frame 412. An edge result frame 416 represents the results of performing edge detection on one of the frames 412, 414. The difference between the edge result frame 406 corresponding to no fire and the edge result frame 416 corresponding to a fire condition is provided in a difference frame 418. The light portions in the frame 418 (representing differences) may be used to determine the presence of fire. The energy of the difference frame 418 may be calculated using any conventional method, such as summing the square of the pixel intensity of the difference frame 418 and taking the square root thereof divided by the number of pixels in the difference frame 418.

Figure 15:
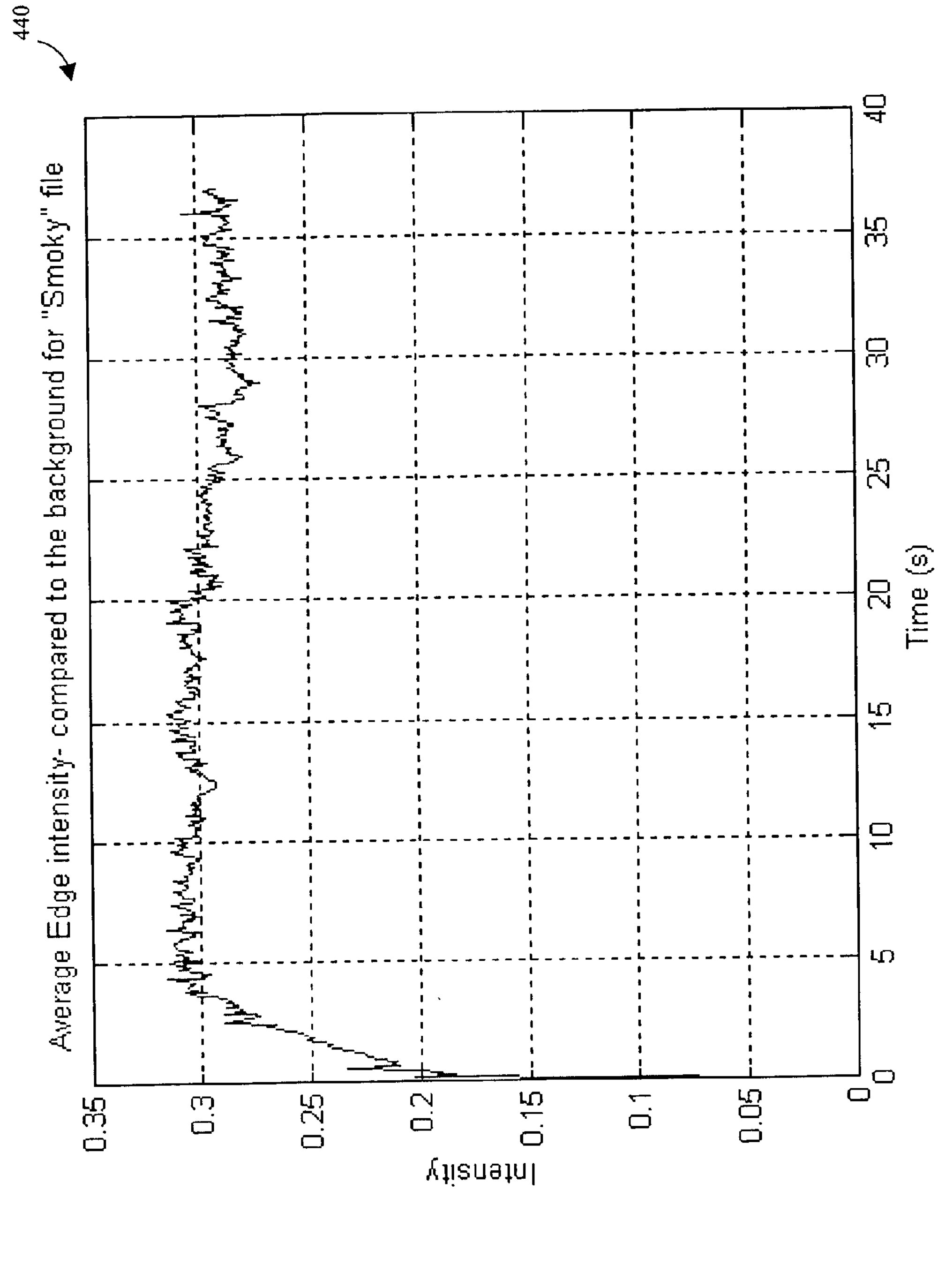
FIG. 15 is a graph illustrating average edge intensity for video frames corresponding to a smoke condition compared to background as a function of time according to the system described herein.

Referring to FIG. 15, a graph 440 illustrates a plot of average edge intensity vs. time of the edge difference frame 418. Note that as time progresses (i.e., as the fire progresses), the average edge intensity of the difference frame 418 increases.

Figure 16:
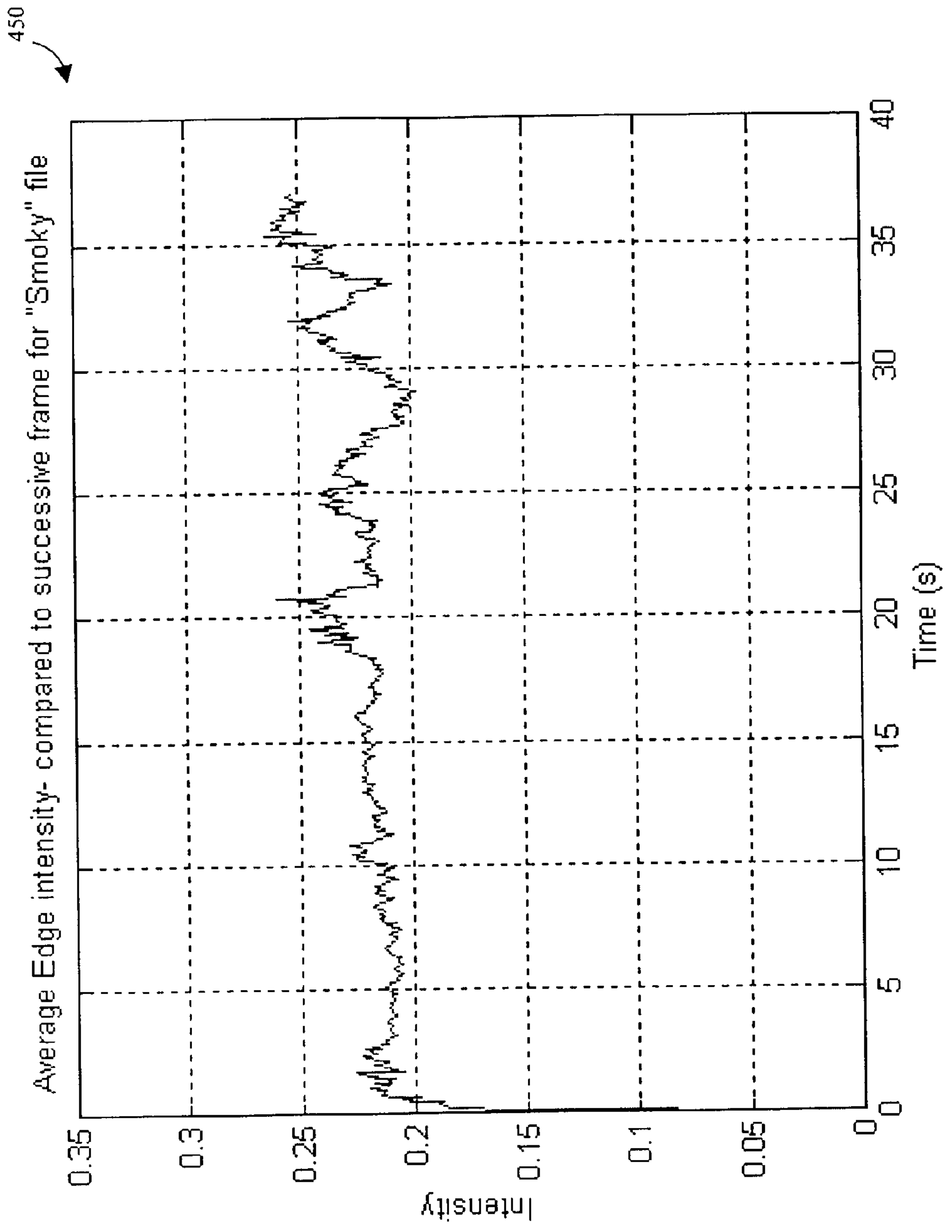
FIG. 16 is a graph illustrating average edge intensity for successive video frames corresponding to a smoke condition as a function of time according to the system described herein.

Referring to FIG. 16 a graph 450 illustrates average edge intensity between successive frames for the frame 416 of FIG. 14. As time progresses, the intensity of the edge frame 416 may be calculated at each time.

Figure 17:
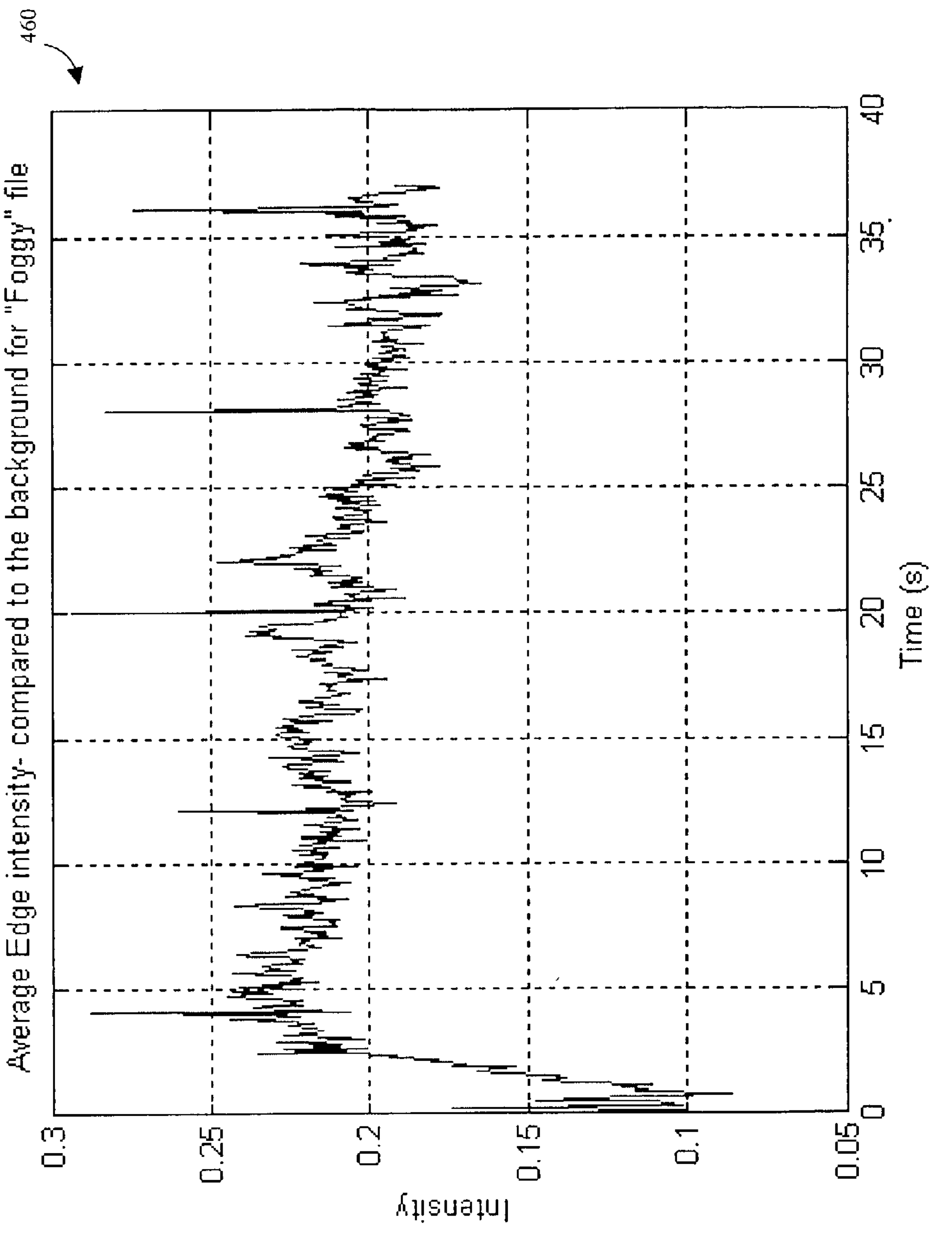
FIG. 17 is a graph illustrating average edge intensity for video frames corresponding to a fog condition compared to background as a function of time according to the system described herein.

Referring to FIG. 17, a graph 460 illustrates average edge intensity over time of a difference frame corresponding to the difference between a background frame and a frame representing simulated fog being provided to a test cargo bay (not shown). Note the difference between the graph 460 and the graph 440 of FIG. 15. This indicates that the average intensity compared to the background frame is potentially a good predictor and discriminator between fog and smoke. This information may be used by follow on processing, described below, to differentiate between fog and smoke.

Figure 18:
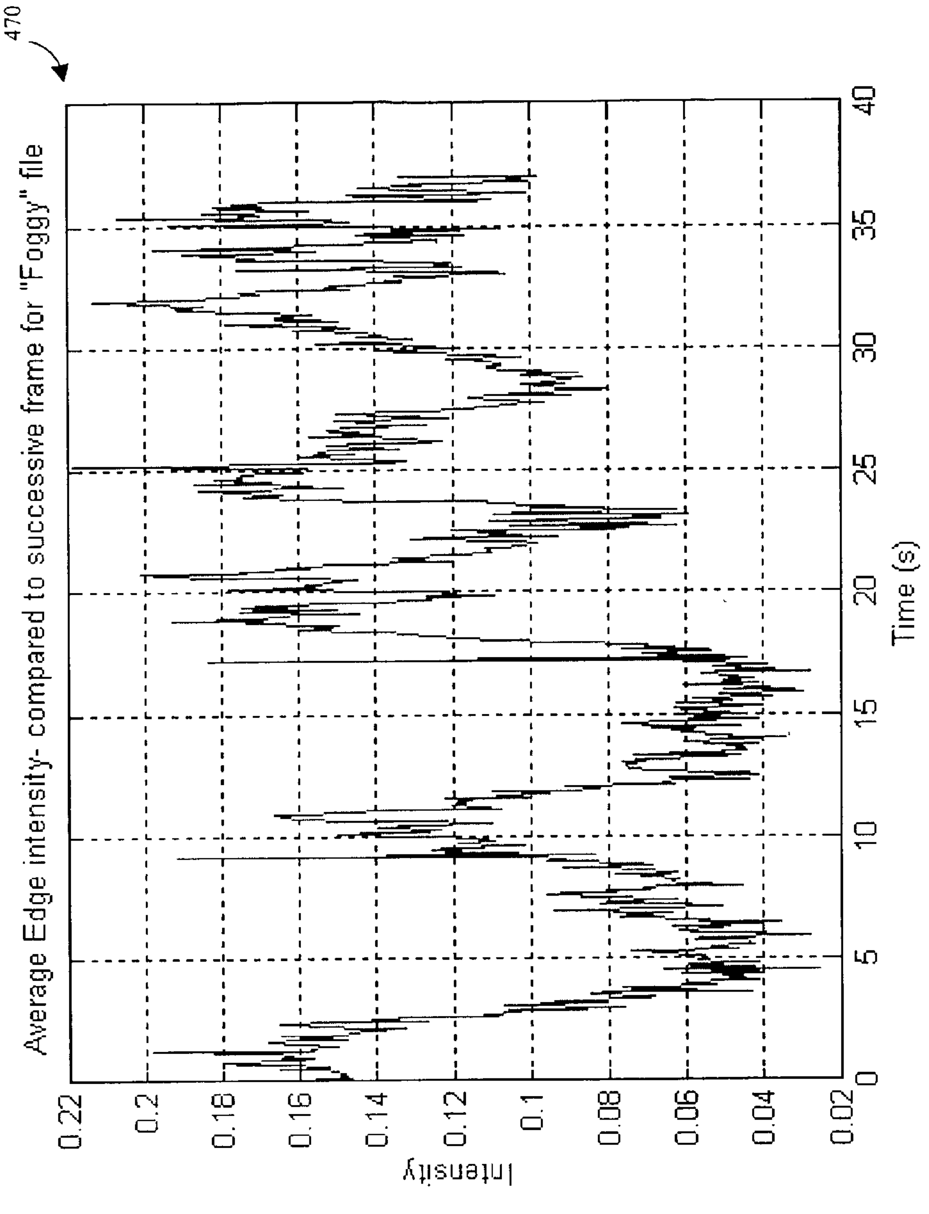
FIG. 18 is a graph illustrating average edge intensity for successive video frames corresponding to a fog condition as a function of time according to the system described herein.

Referring to FIG. 18, a graph 470 illustrates an average edge intensity over time that is determined by comparing successive frames for the simulated fog in the test cargo bay. Note the differences between the graph 470 and the graph 450 of FIG. 16. This indicates that the frame parameters illustrated by FIGS. 16 and 18 are potentially good predictors in discriminator between fog and smoke. This information may be used by follow on processing, described below, to differentiate between fog and smoke.

Other types of features may be extracted at the feature extraction routines 206, 206', 206". The types of features that are extracted depend upon the follow on processing performed by the local data fusion routines 212, 212', 212" and/or the multi-camera fusion routine 232. For example, certain types of visual problems, such as fire detection, may lend themselves to a multiscale approach where, generally, information is obtained by determining the differences between images at different scales, as described below.

The multiscale approach may be used to address two different classes of problems, both of which have potential applicability to the system described herein. The first class may include those cases where the multiscale concepts are actually part of the process being investigated, for example, such as the case where information is gathered by sensors at different resolutions or scales. A second class of multiscale processes includes cases where the multiscale approach may be used to seek computational advantages and the high parallelism of multiscale techniques such as, for example, when multiple versions of an original image are generated at various resolutions in connection with pyramidal transformations such as the Gabor and wavelet transforms, where the coefficients associated with the scalings convey information.

As will be described herein, the multiscale technique has several attractive features and advantages that may be included in an embodiment of the system described herein such as, for example, mathematical efficiency, scale invariant interpretation, richness of describing a variety of different processes including images, and a strong connection to wavelet representation. Mathematical efficiency of the multiscale approach is based upon the use of statistical models that may be applied in a parallel scheme. Parallelism may provide for efficiency, for example, by allowing the processing of signal samples, such as image pixels, in a parallel fashion one at a time rather than being processed in a series pixel by pixel scheme.

The multiscale technique may also provide a scale invariant interpretation for signals that evolve in scales. For example, when representing an image, large features may be represented in one particular scale and finer features may be represented on a smaller scale.

Wavelets, which are provided in connection with using the multiscale approach, may be used to generate features that are useful for detecting visual phenomena in an image. Wavelets may be used as an efficient technique to represent a signal in a scale domain for certain types of processes, for example, such as non-stationary processes. This is in contrast, for example, to stationary processes which may be better represented in the frequency domain for example, by means of a Fast Fourier transform (FFT).

The multiscale approach may be used as a technique for example, in connection with fusing data that is gathered by sensors of different scales or resolutions. In some applications that may be used for image processing, global monitoring may use remote sensing cameras in which there are a plurality of cameras each operating in different spectral bands. Images collected by different frequency band devices may be at several different scales. The multiscale technique may be used to provide a scale invariant interpretation of information. Even if only one type of sensor is used, different ways of measurement may be performed leading to resolution differences. Using information of these different scales may be performed using the multiscale technique. The second class of problems which may be addressed by the multiscale approach as related to the system disclosed herein are discussed below.

Figure 19:
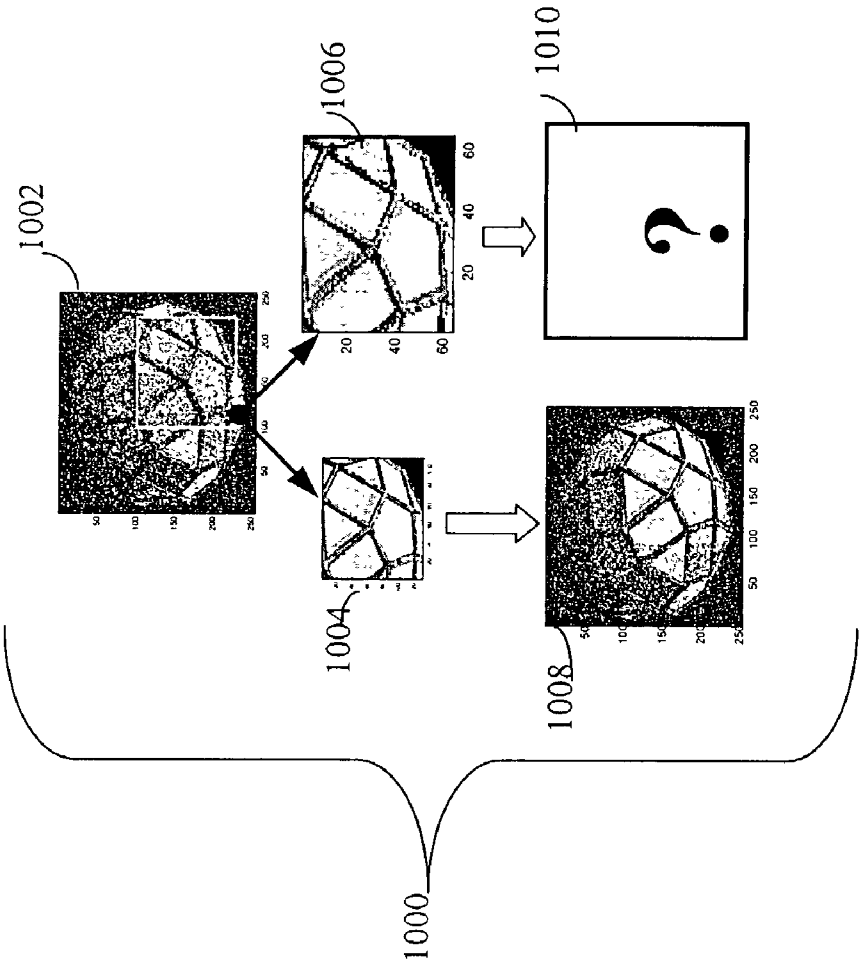
FIG. 19 is a diagram illustrating an aspect of a multiscale approach used in the system described herein.

Referring now to FIG. 19, shown is an example 1000 of different images 1002, 1004, 1006, 1008 containing complementary information about a given scene. In particular, each of the elements included in the example 1000 are images of the same object taken as different perspectives, for example, such a zoom of a particular object. However, the information included in each of the images 1002, 1004, 1006, 1008 may be complementary information about the same scene. The courser images, such as the images 1002, 1008, may each be a 256×256 pixel image containing information about the object on the entire scene. A finer image may be a zoom of a particular portion of the larger image such as, for example, the images 1004, 1006 may zoom in on a particular portion of a larger image, such as the images 1002, 1008.

Since these different images in the illustration 1000 are of different scales, information is generated in connection with obtaining the transforms used to scale the images. Accordingly, it may be possible to extract features of an image using information from transforms applied in connection with a multiscale technique.

Multiple versions of an image may be generated at various resolutions by means of pyramidal transformations, such as the Gabor transform and wavelet transforms, for example. Using such techniques, the original process or image in this instance may be transformed into two sets of coefficients. A first set of coefficients may include low frequency content of the signal and may be referred to as scaling or approximation coefficients. A second set of coefficients may be characterized as containing high frequency content of the signal or image and may be referred to as wavelet or detail coefficients. Because of the pyramidal structure of the wavelet transform, the representation of the approximation and detail coefficients may be represented as a tree structure.

Models indexed on homogeneous trees may be applied in various fields of signal processing and may also be applied in connection with images. In such a technique, a tree may be used to represent the multiscale model where each level of the tree represents a scale. As the model evolves from one level to another down the tree, (from the root to a leaf), the signal evolves from one resolution to the next. An embodiment may utilize the tree structure to describe many classes of multiscale stochastic processes and images such as Markov random fields and fractional Brown motions.

The tree representation may be used in connection with a coarse to fine recursion in the scale domain, for example, using Haar wavelets synthesis equation.

EQUATION 1.1

$$f(m+1,n)=\sum_{k=-\infty}^{k=+\infty}h(2k-n)f(m,k)+$$

-continued $$\sum_{k=-\infty}^{k=+\infty}g(2k-n)d(m,k)$$

In the foregoing, Equation 1.1, f(m,) represents the sequence of scaling or the approximation coefficients of the original signal having a scale of m. It should be noted that the higher the scale m is, the finer the resolution. In the foregoing equation, the term d(m,) may represent the sequence of wavelet or detail coefficients as the scale m.

An embodiment of the system described herein may simplify the description of wavelet coefficients (i.e., d(m,)) as being nearly white. In accordance with this assumption, models may be defined in accordance with the homogenous tree structure on a scale-to-scale scheme as represented in accordance with:

$$X(s)=A(s)X(\bar{\gamma}s)+E(s)W(s) \qquad \text{EQUATION 1.2}$$

In Equation 1.2, "s" may represent an abstract index corresponding to nodes in the tree, $(\bar{\gamma}s)$ denotes the parent of the node s, and $\bar{\gamma}$ may represent an upward shift operator on a set of nodes of a tree. W(s) is a driving white noise under the assumption of white wavelet coefficients. The term A(s) $x(\bar{\gamma}s)$ and E(s)(w) in Equation 1.2 may represent, respectively, the predictable and unpredictable parts of an image as it evolves from one scale to the next.

In accordance with the foregoing tree structure, and the different scalings represented at different levels of a tree of a particular image, different one-dimensional and two-dimensional images or signals may be represented with different tree structures.

Figure 20:
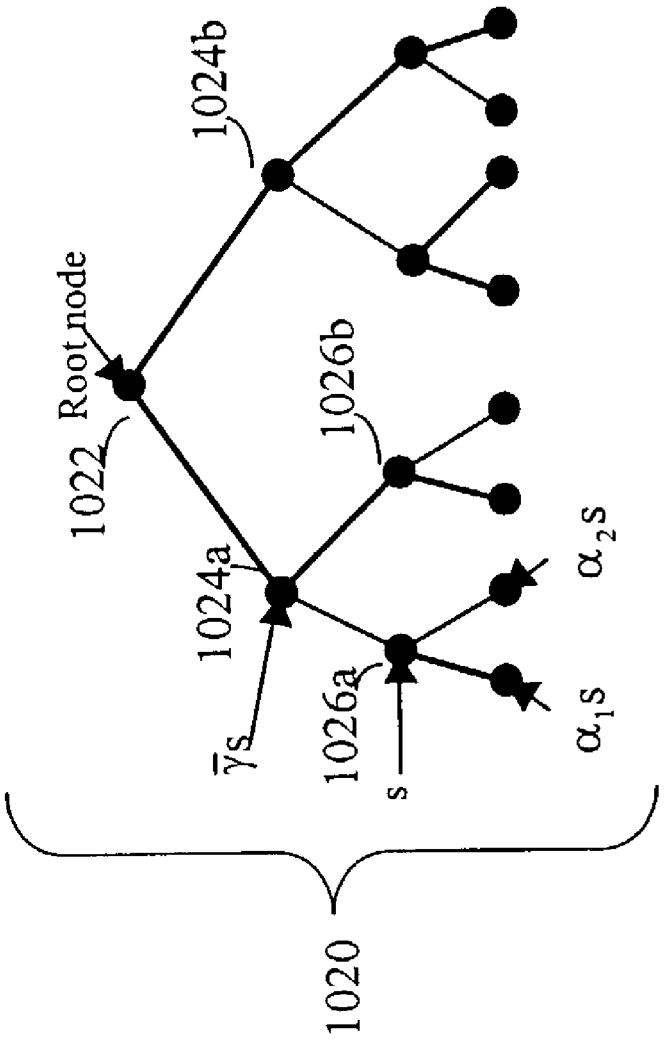
FIG. 20 is a diagram illustrating a tree structure that facilitates the multiscale approach used in the system described herein.

Referring now to FIG. 20, shown is an example of an embodiment of a tree structure 1020 that may be used to represent one dimensional signals or images. The tree structure 1020 of a dyadic tree structure may be used to represent a one-dimensional signal or image representation. In this particular example of a tree for one dimensional signal or images, each parent node has two child nodes. A root node 1022 may correspond to a first image that is decomposed into approximations at lower resolutions, for example, in accordance with different orientations. The detailed root node 1022 may be decomposed into a plurality of images at lower levels for child nodes within the tree of a courser resolution. In this example, the root node 1022 may be a detailed image decomposed into two child node images **1024*a*, 1024*b*. Similarly, each of the images 1024*a*, 1024*b* may be decomposed into coarser images. For example, the image 1024*a* may be decomposed into two images 1026*a*, 1026*b*, as shown in the tree structure 1020**.

Figure 21:
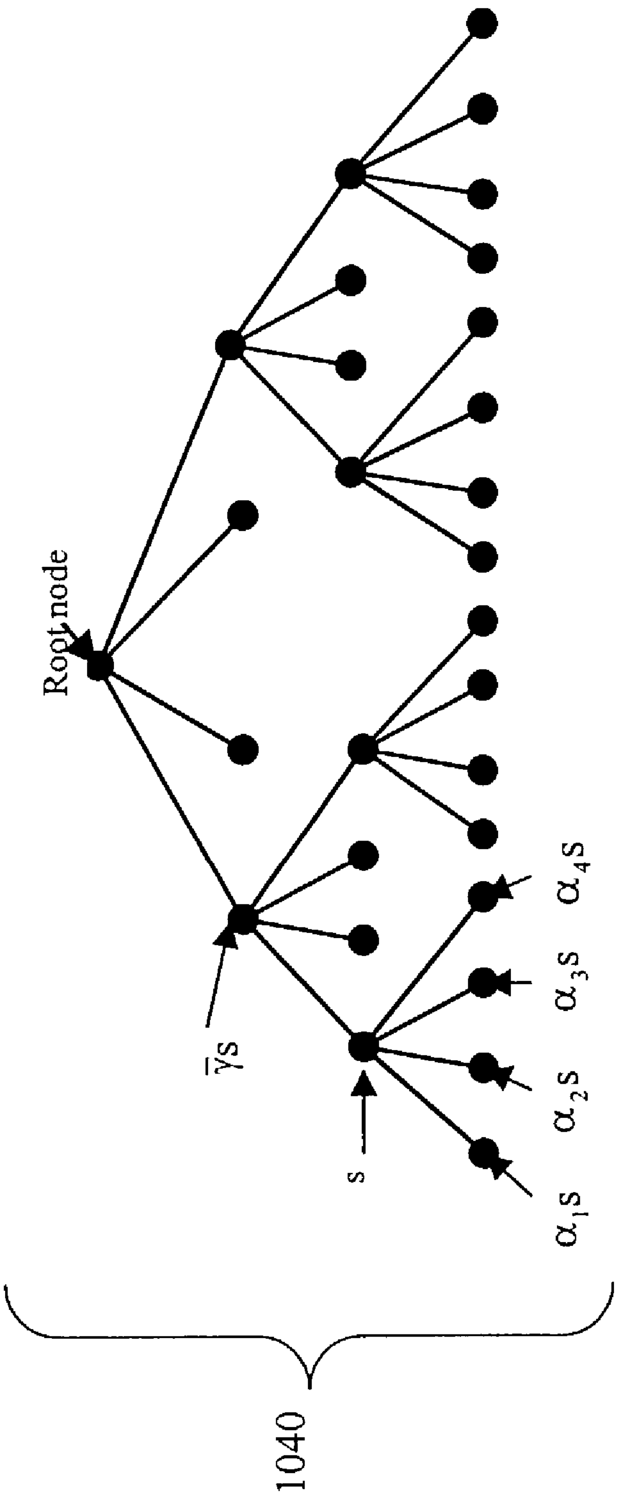
FIG. 21 is a diagram illustrating another tree structure that facilitates the multiscale approach used in the system described herein.

Referring now to FIG. 21, shown is an example of another tree structure 1040 that may be used to represent a two-dimensional signal or image. The tree structure 1040 in this example shows the first four levels of a quadratic tree structure for a two-dimensional image representation. In the representation 1040, each node may have four children or child nodes. The tree structure 1040 may also be characterized and referred to as a quadratic tree. Other types of tree representations, for example, such structures where a node has a different number of child nodes, may vary in accordance with the dimension of the image or signal being decomposed as well as whether a wavelet decomposition is being used as in this instance. The tree representation of images described herein may be used in accordance with the wavelet structure. Wavelet decomposition of an image, such as a two-dimensional image, may yield four images each of a courser resolution than an image of its parent node.

Figure 22:
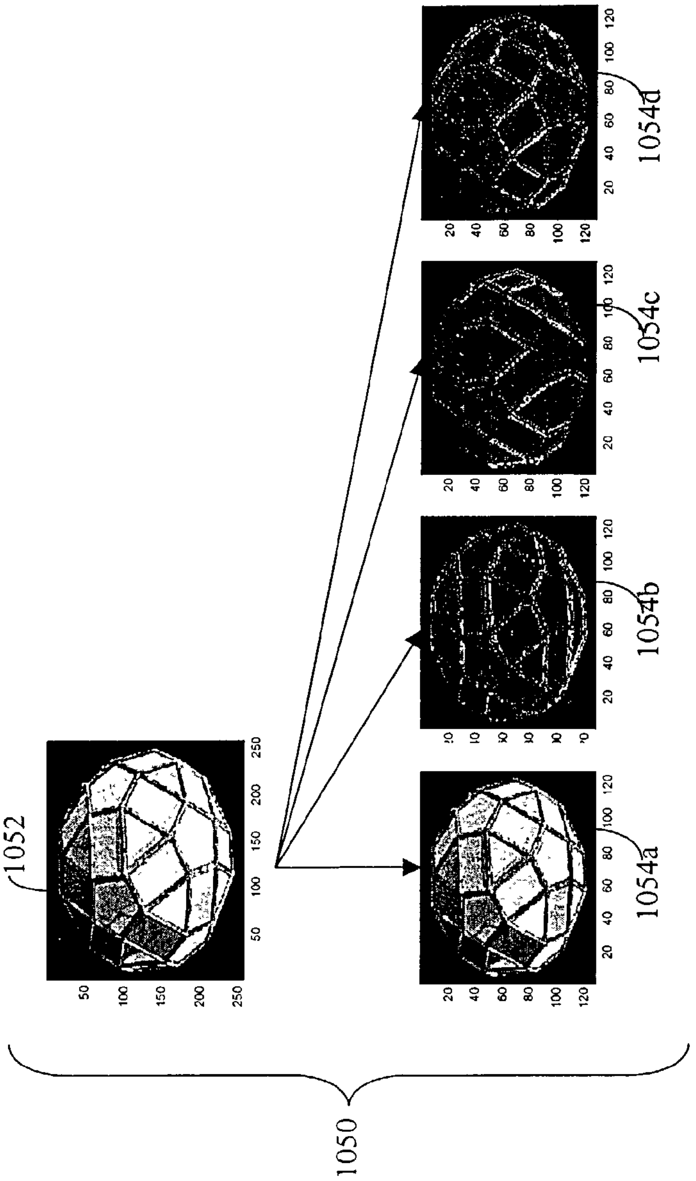
FIG. 22 is a diagram illustrating another aspect of a multiscale approach used in the system described herein.

Referring now to FIG. 22, shown is an example of a tree representation 1050 of an image decomposed by wavelet transformation. In this example, an initial image 1052 may be a 256 by 256 pixel image decomposed by wavelet transformation into its approximation at lower resolution, such as 128 by 128 pixels, and three detailed images showing details at the horizontal, vertical and diagonal orientations. With reference to the tree structure 1050, the image 1052 may be approximated at a lower resolution an image 1054*a*. Three images 1054*b*, 1054*c*, 1054*d*, may represent detailed images, respectively, showing details of the horizontal, vertical, and diagonal orientations.

Each node "s", except at the top and bottom in a q-order tree, has a parent node and q offspring nodes. Different levels of the tree represent distinct scales in this set of multiscale versions of the image. The tree architecture or typology may be used to represent images exhibiting multiscale features across varying scales. In a tree model, it should be noted that nodes may be correlated vertically or across scales between levels rather than horizontally within the same domain or level. The stronger the correlation across scales, such as between different levels, the more efficient the tree model may be. Depending on the way of interpreting nodes in the tree, scales may be organized from finer to coarser, or coarser to finer, as the tree is scanned from top to bottom (root to leaf).

For example, consider the case where a process or image may be represented as a set of images representing the same scene, but at different resolutions or scales. Different image versions at various resolutions may be generated using a wavelet transform. The original image may be at the root of the tree which is the finest scale. The first round of wavelet transformations may yield four images, one approximation and three detailed images for example as described in connection with FIG. 22. The second round of wavelet transformations as applied to each one of these images may yield a total of sixteen images.

Repeating the application of a wavelet transformation, for example N times, yields a multiscale process of order N. A tree having N levels may represent the set of images where nodes of the tree represent the images as described herein. Each level of the tree may represent a subset of images at a certain resolution or scale. According to this arrangement, scales may progress from finer to coarser as the trees scanned from the top to the bottom or from the root node to its leaves.

In another example, if the approximation images are considered, each node of the tree may represent the pixel information and the scale arrangement may be reversed. In this particular example, scales may progress from coarser to finer as one scans the tree 110 from top to bottom. In this example, the bottom of the tree may then represent pixels of the finest image.

The following describes the tree representing an image where the bottom of the tree represents the pixels of the finest image and the coarser image is represented as at the root or top. If an ordinary node "s" is located at a particular scale M, then the parent node is located at the scale M−1, and the offspring nodes of the node "s" are accordingly located at the scale M+1 of the tree.

In the foregoing tree structures, each node "s" in the tree may correspond to a state vector (x) representing scale information at a particular node "s". The state vector (x) may be interpreted in a variety of different ways. For example, (x) may represent the gray level of pixels in a set of intensity images or the RGB (red green blue) content of pixels in a set of colored images. The vector (x) may be a combination of wavelet and scaling coefficients after applying a wavelet transform to the original process.

As described above, the multiscale technique considers an image of the mapping of node coordinates into density values represented in a tree-like structure. The general technique is to have an original image projected at different scales or resolutions where the image dynamics connect pixels with various resolutions in a scale-to-scale restructure as described, for example, in connection with FIG. 21 and FIG. 22.

It should be noted that, for example, in the case of a suspected fire, information provided by the gray level of image pixels may not be sufficient to identify a fire because the image quality may depend heavily on local variations of image intensity. Accordingly, to capture such local information, the size of the neighborhood where the contrast is computed may be adapted to the size of the objects to be analyzed. A specific resolution or scale may be used to characterize the size of the neighborhood in order to analyze the local information. In connection with a suspected fire, for example, objects may have different sizes and it may not be possible to define an optimal common resolution for all local information extracted from a particular image. Thus, taking a set of images at different resolutions may provide additional information for image analysis and use of the multiscale features may be generated by use of the wavelet transformation as described herein. Using such features such as combinations of scaling and wavelet coefficients, linear and non-linear multiscale models may be implemented to characterize specific classes of images such as those corresponding, for example, to normal, smoky, foggy or hazardous environments. In particular, simple and effective classes of linear auto-regressive models may be tested. Additionally, neural network-based multiscale models, described below, may be identified and implemented to ensure early fire detection and increase the system's robustness to variability of relevant factors and the system environment.

Figure 23:
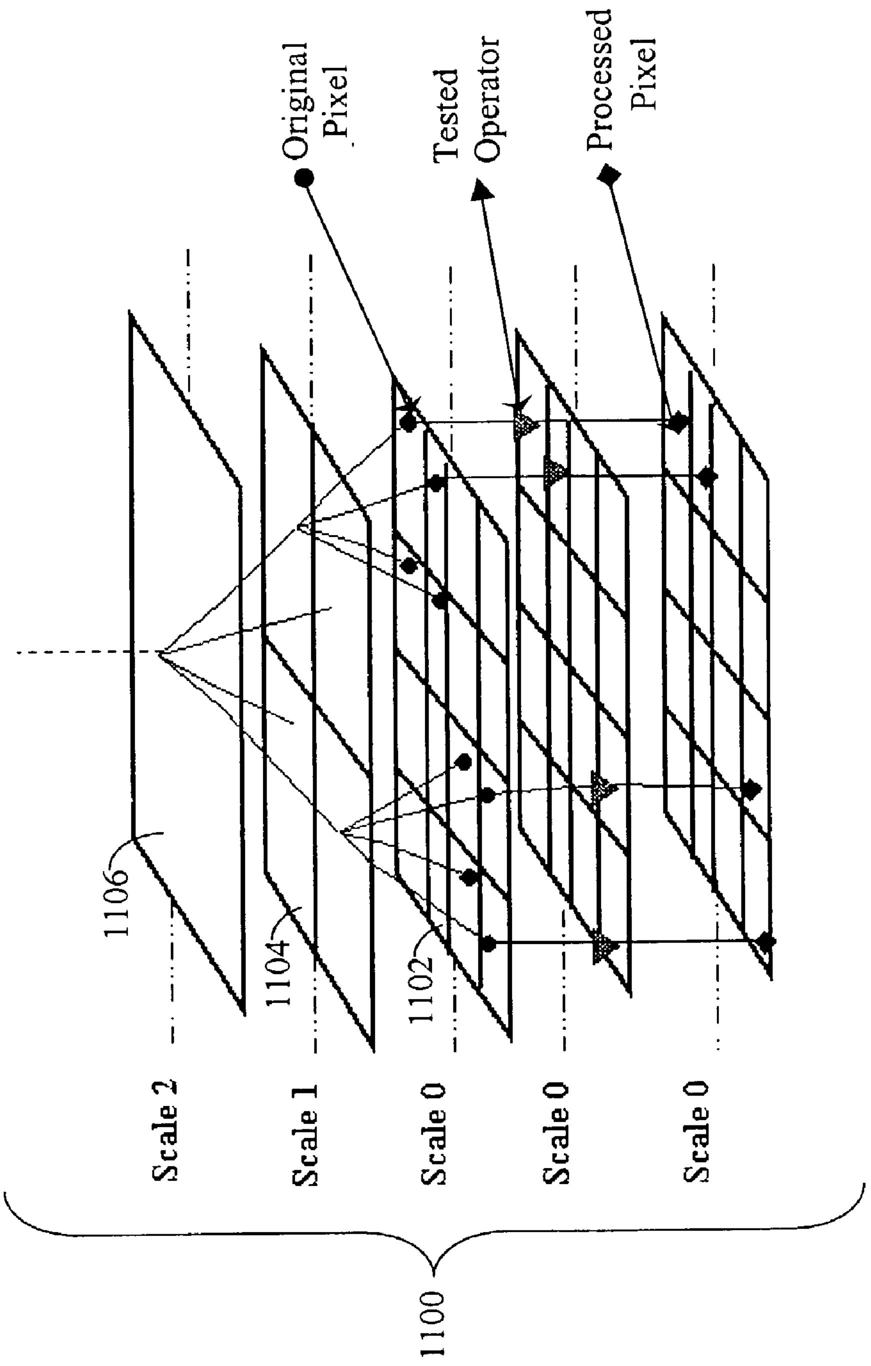
FIG. 23 is a diagram illustrating an example of an image represented according to the multiscale approach used in the system described herein.

Referring now to FIG. 23, shown is an example of an image represented in accordance with the multiscale technique described herein. The representation 1100 of FIG. 23 includes an original image 1102 shown as having a scale of zero. Applying, for example, the wavelet transformation a first-time, the original image or set of pixels 1102 may be transformed to a scale of one at an image 1104. Subsequently applied again, the wavelet transformation may produce yet another image 1106 having a scale of two. Beginning with the original pixel image, the same operation may be applied across the plurality of pixels of the same image in parallel generating a plurality of paths of the tree.

The Wavelet coefficients calculated in connection with performing the multiscale process are the features extracted at the routines 206, 206', 206" which may be used by follow on processing, as described below.

Another technique that may be used to extract features at the routines 206, 206', 206" is Principal Component Analysis (PCA), which considers an image as a single vector and computes eigenvalues of the correlation matrix of the image vector. Each eigenvalue corresponds to a so-called eigenimage. Computed eigenvalues may be used as projection weights of the original image into the space spanned by the eigenimages. Each class of images may be characterized by a weighting factor detailing its projections into a set of eigenimages. This technique may be used to represent an image by a relatively small number of eigenvalues that are coefficients of decomposition of an image into principal components. For example, eigenvalues may be determined for visual images corresponding to conditions that are normal, smoky, foggy or another type of an environment. The pixel image matrix may be represented with a small number of uncorrelated representative integers or eigenvalues.

The PCA technique may be used to discriminate between different sensed scenes, for example such foggy, cloudy or a fire, in a particular location of a plane. Different images, such as the foggy image and the smoke image, may have special principal components differing from principal components of other images. Accordingly, PCA techniques may be used to represent known images, for example, those associated with a smoky condition or a foggy condition.

Applying PCA techniques, a known condition, such as a smoky or foggy condition may be represented by a set of eigenimages together with a set of eigenvalues. Fog may be classified by a set of particular eigenvalues or weighting factors. Similarly, another condition may be characterized by a different set of weights or eigenvalues.

As described in more detail below, the PCA technique may be used, for example, with a neural network where a particular set of known weights may be associated with a particular condition such as foggy. The neural net may be trained to recognize and associate a particular set of eigenvalues of weight with the existence of a particular condition such as fog or smoke. Once the neural net is trained to differentiate between these different conditions, a target image may be used and the trained neural net may determine whether the particular target image corresponds to anyone of a particular set of conditions that the neural net has been trained for. In other words, the trained neural net compares certain characteristics or features with those of conditions specified by training data fed to the neural net. The neural net may be used to determine whether the target image corresponds to one of the particular conditions for which the neural net was trained. Generally, PCA transforms a number of correlated variables into a number of uncorrelated variables that may be referred to as Principal Components.

Generally, the first principal component may account for as much of the variability and data as possible and each succeeding component may also account for as much of the remaining variability as possible. The principal components reflect the inter-correlation between the matrix elements (e.g. image pixels). This procedure may often be referred to as eigenanalysis. In one embodiment, the eigenvector associated with the largest eigenvalue may have the same direction as the first principal component. Accordingly, the eigenvector associated with second largest eigenvalue may determine the direction of the second principal component and so on. The sum of the eigenvalues equals the trace of the square matrix and the maximum number of eigenvectors equals the number of rows or columns of this matrix.

PCA may be characterized as a one unit transformation similar to factor analysis. PCA may be represented or described as a weighted linear combination producing a new set of components by multiplying each of the bands or components in the original image by a weight and adding the results. The weights in the transformation may collectively be referred to as the eigenvectors. For any given number of original bands or components, an equal number of transformation equations may be produced yielding an equivalent number of component images.

Note that, in other embodiments, it is possible to use both the eigenvalues and the eigenimages to detect/verify various conditions. In those cases, the follow on processing (e.g., neural net) would be trained/programmed with both the eigenvector data and the eigenimage of particular conditions. Then, for detection/verification, both the eigenvector data and the eigenimages would be used.

PCA, and other techniques described herein, such as the multiscale modeling technique, may be used to reduce the data dimensionality and to develop meaningful features to describe and represent images. Example of such techniques may include wavelet coefficients, high order statistical moments, edges, skeletons, and the like.

Figure 24:
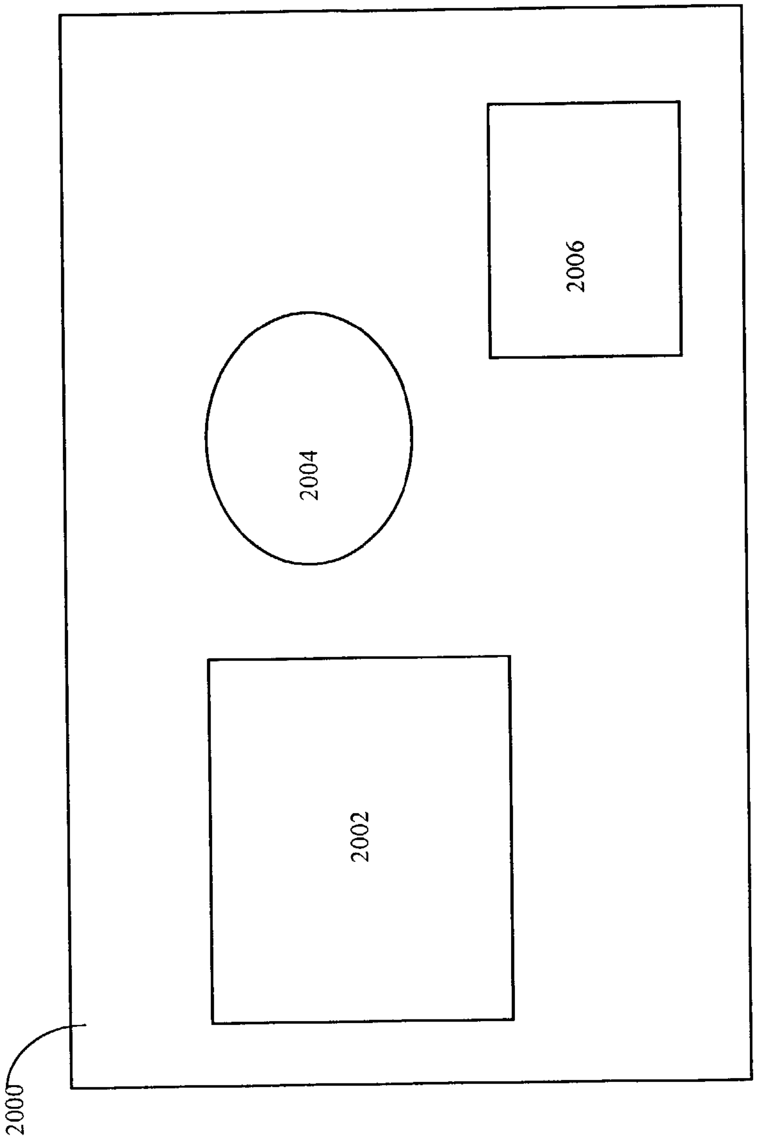
FIG. 24 is a diagram illustrating use of Principal Component Analysis (PCA) in connection with the system described herein.

Referring now to FIG. 24, shown is an example of an image 2000 that may be produced using cameras that are part of the system described herein. The image 2000 may include objects 2002, 2004, 2006. Each of the objects 2002, 2004, 2006 in the image 2000 may correspond, for example, to items included in one of the cargo bays 102-104. PCA may be used to extract feature information from the image 2000, for example, resulting in a first principal component corresponding to the object 2002, a second principal component corresponding to the object 2004, a third principal component corresponding to the object 2006, and a fourth principal component corresponding to the object 2008. The image 2000 may represent objects in a bay under normal conditions. In contrast, if there is a fire or smoke in the bay, there may be additional or different principal components when the PCA technique is applied to the image.

Figure 25:
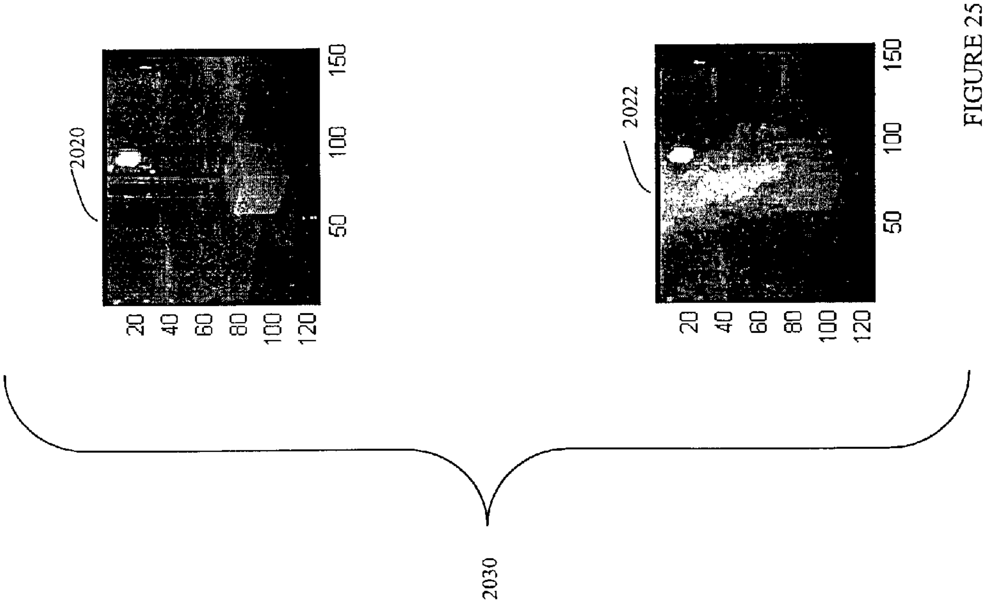
FIG. 25 is a diagram illustrating application of PCA on a background frame and a frame corresponding to a fire condition according to the system described herein.

Referring now to FIG. 25, shown is an example 2030 of images corresponding to normal and smoky conditions within one of the cargo bays 102-104. A first image 2020 may correspond to the normal condition. When a PCA technique is applied to the image 2020 one or more principal components may be produced corresponding, for example to the rectangular-shaped object in the center of the image 2020 and the elongated pipe-like shape extending from the top portion of the rectangular-shaped object.

A second image 2022 may correspond to a smoky condition of one of the bays 102-104. When a PCA technique is applied to the image 2022, one or more principal components may be produced corresponding to the rectangular-shaped object in the center of the image 2022 and the smoke arising from the top portion of the rectangular-shaped object. As described in more detail below, these principal components may be produced and used to "teach" for example, a neural net. The resulting trained neural net may be used to make a decision regarding whether one or more observed images exhibits the "normal" or "smoky" states.

In other embodiments, it may be possible to first combine signals from more than one camera (either before or after image compensation) prior to extracting features. In that case, the local fusion routines 212, 212', 212" may be processing features generated by more than one camera.

Once features have been extracted using the feature extraction routines 206, **206*i*', 206", the features are processed by a combination of the local fusion routines 212, 212', 212" and the multi-camera fusion routine 232. The fusion may be performed using any one of a variety of techniques, such as neural nets, fuzzy logic, hidden Markov models, and/or multiple model state estimation. The use of various techniques is described in more detail below. Note that any of the features discussed herein, or any other type of feature, may be processed using fusion techniques to provide a result. For example, the energy indicators discussed above in connection with FIG. 3 may be used as inputs to a neural net, fuzzy logic routine, hidden Markov model, and/or multiple model state estimator to detect some of the patterns/trends discussed above in connection with FIGS. 4-18**.

A neural network may be characterized as a set of units or nodes and connections between the nodes. A node may have one or more inputs and a single output. Nodes may be interconnected together by nets. The values of inputs of the node may be multiplied by an internal weight associated with the node. If there are multiple inputs to a node, the resulting value associated with each of these inputs multiplied by an internal unique weight may be combined and then processed by an internal function associated with the node to produce an output.

A neural network may learn by "training" using training input. The process of training a neural network may involve adjusting input weights associated with each of the nodes in accordance with training input such that the operative network is consistent with the desired output. This involves the development of a training file which may include data for each input node, and the correct or desired response for each of the network's output nodes. Training of a network may be used, for example, in image recognition and other applications.

For the system disclosed herein, features used in connection with neural net training may include any one of a variety of features extracted at the feature extraction routines 206, 206', 206". An embodiment may include any one of a different variety of different types of neural net training techniques. An embodiment may include a supervised training technique that requires a target for learning. In such an embodiment, the neural net based system adjusts its internal parameters (weights and biases) to minimize the error between the system estimated output and the target. This type of training may be included in an embodiment, for example, if there is good knowledge of the system model. An embodiment may also use a well known locally convergent technique such as the back propagation technique used to train a neural net by adjusting weights and biases. Note also that it may be possible to train the system using experimentally obtained image data recorded for various scenarios.

Once the network has been trained, input data may be provided to the network for processing to produce a response in accordance with what the network "learned" during its training. Neural networks may be implemented in hardware and/or software and be used in any one of a variety of different applications ranging from, for example, voice recognition systems, image recognition, medical imaging, and the like. In this particular example, neural networks may be used for follow on processing to process any of the features extracted using any one of a variety of different techniques such as, for example, principal component analysis or PCA, multiscale modeling techniques, and the like. As part of the training process, the interconnection strengths or weights between the nodes may be adapted to learn from a particular set of training patterns.

Figure 26:
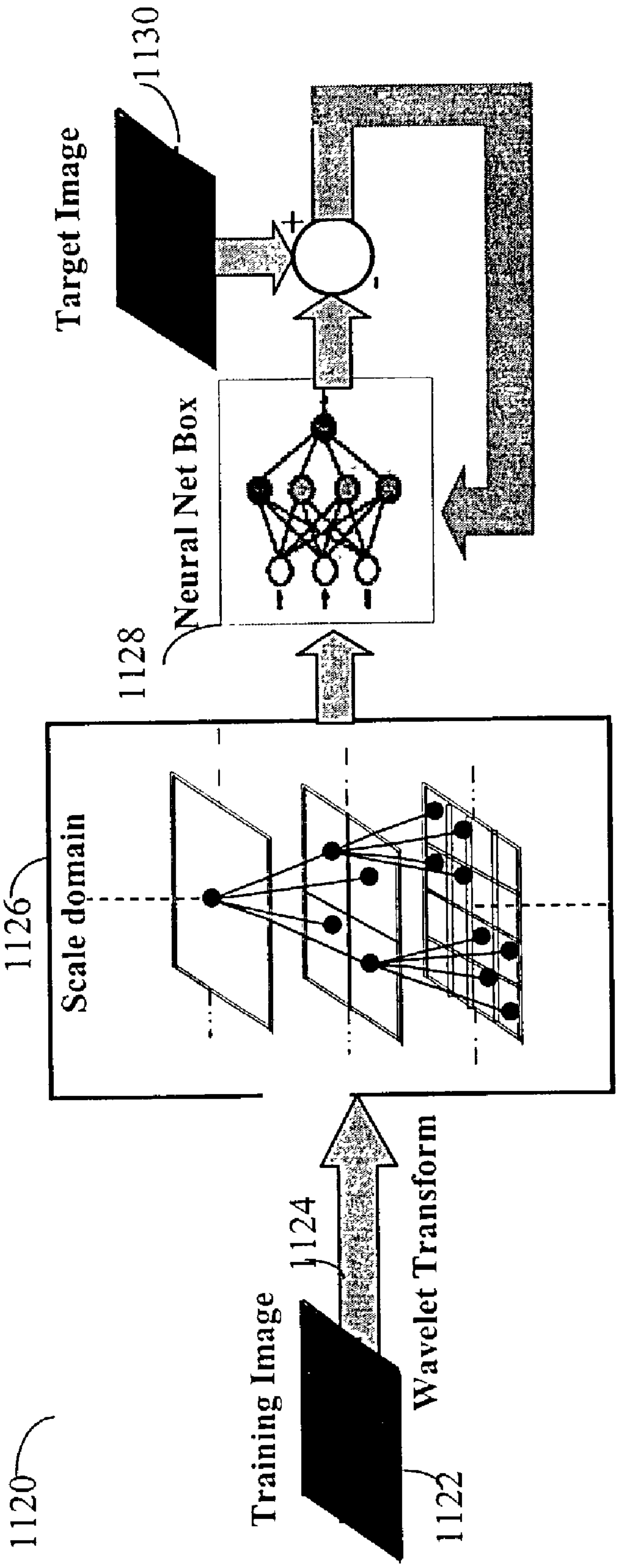
FIG. 26 is a diagram illustrating use of a neural net according to the system described herein.

Referring now to FIG. 26, shown is a block diagram 1120 of a neural network multiscale model that may be used in connection with identifying and implementing early fire detection. By analyzing wavelet coefficients associated with transforming images of different conditions such as, for example, normal conditions, smoky, foggy or other hazardous environments, training images 1122 may, in conjunction with the wavelet transformation 1124, be used to produce a structure of images 1126. The wavelet coefficients of the training images may be used to "teach" a neural net 1128 to recognize particular conditions. The result is the trained neural net 1128 which may subsequently receive as input wavelet coefficients of a target image 1130. Accordingly, the neural net 1128 may be used to identify or classify particular ones of the target image 1130 as one corresponding to, for example, normal conditions, smoky conditions, foggy conditions or other type of hazardous or alarm environment conditions in accordance with the particular training images uses.

In the block diagram 1120, the wavelet transformation may be used in an embodiment as part of the feature extraction processing 206, 206', 206" described elsewhere in connection with FIG. 2. The trained neural net 1128 may be executed as part of the processing associated with some combination of the local fusion routines 212, 212', 212" and the multi-camera fusion routine 232. Additionally an embodiment may also use one or more different feature extraction techniques with the neural network (or a different neural network running in parallel) such as, for example, Principal Component Analysis (PCA), Multiscale modelling, frame energy calculations, and the like. Generally, the system described herein may mix and match any one or more particular feature extraction techniques to be used in combination with any one or more different techniques associated with the combination of the local fusion processing 212, 212', 212" and the multi-camera fusion routine 232

Another technique that may be used by a combination of the local fusion routines 212, 212', 212" and the multi-camera fusion routine 232 is the Hidden Markov Model (HMM). An HMM may be used to identify patterns which appear over a period of time. In connection with images described herein, by observing images over time, a particular hidden state of interest may be determined.

Generally a Markov process may be defined as one which moves from state to state depending only on the previous N states. In this instance, the process may be called an order N Markov mode where N is the number of states affecting the choice of the next state. The simplest Markov process is a first order process (N=1) where the choice of state may be made purely on the basis of the prior state.

For a first order Markov process having M states, there are M squared transitions possible between states since it may be possible to move from any one state to another. Associated with each transition is a particular probability of progressing for moving from one state to another. Such a probability may be referred to as a transition probability. The M squared probabilities associated with each of the transitions in a first order Markov process having M states may be collected together in the form of a matrix that may be referred to as a state transition matrix. As described herein, these probabilities do not vary with time although it is possible to contemplate embodiments where the probabilities may vary over time.

In initializing a system using Markov processes, an estimate or probability at time=zero may be determined. In one embodiment, this quantity may be defined in a vector of initial probabilities also referred to as the $\pi$ vector. The initial vector $\pi$ of probabilities sum to one. Similarly, each of the rows or columns of the transition matrix also sum to a probability of one. A system that may be characterized in such a manner as to have one or more hidden states, a set of initial conditions defining initial probabilities at time=0 ($\pi$), and a state transition matrix defining the probability of a system in a state N given a previous state N−1 may be described as a Markov process. Markov processes permit recognition of patterns evolving over time or across any other variable such as scale.

In connection with an observed sequence of states or images, there may be a probabilistic relationship to the hidden process or hidden states, for example, such as those characterized as normal or others with the presence of smoke or fire. In the instance where an observed sequence of images is probabilistically related to hidden states, processes may be modeled using an HMM where there is an underlying hidden Markov process that changes over time as well as a set of observable states which are probabilistically related to the hidden states of the process. Similar to representing the sum of probabilities of hidden states, the probabilities involving all observable states sum to one. In addition to the state transition matrix, an HMM may also have what will be referred to herein as a confusion matrix containing the probabilities of the observable states given a particular hidden state. The hidden states may be characterized as the real states of the system described by a particular Markov process. The observable states may represent those states of the process that are observable, such as represented by images taken from a camera. A set of initial probabilities may also be specified as well as a state transition matrix and a confusion matrix. The HMM may be characterized as a standard Markov process or augmented by a set of observable states with the addition of a confusion matrix to express the probabilistic relation between the hidden and observable states. The terms of the state transition matrix and the confusion matrix may be constant in one embodiment and may not vary over time following a timing variance assumption in this example. Accordingly, the following triple (π, A, B) may be used to define an HMM mathematically in a more concise way as follows:

$\Pi=(\pi_i)$: Vector of initial state probabilities (4a)

$A=(a_{ij})=Pr(x_i^t/x_j^{t-1})$: State transition matrix (4b)

$B=(b_{ij})=Pr(y_i/x_j)$: Confusion matrix (4c)

What will now be described are three types of problems that may be solved using HMMs for processes that generate patterns evolving over a space of time. The evaluation problem matches the most likely system to a sequence of observations. In other words, given an HMM model, what is the probability of generating a given sequence of observations. This technique, based on the notion of HMM, that is used to solve this problem is known as the forward algorithm.

The decoding problem determines the hidden sequence most likely to have generated a sequence of observations. In other words, given a sequence of observations that are associated with a given HMM, what sequence of hidden states most probably generated such observations. The technique, based on the notion of HMM, that is used to solve this problem is known as the Viterbi algorithm.

The learning problem determines the model parameters most likely to have generated a sequence of observations. In other words, given a set of observed sequences, what HMM most probably underlies such set, such as, for example, what are the parameters of such an HMM. The technique, based on the notion of HMM, that is used to solve this problem is known as the forward-backward algorithm. Each one of these three problems and techniques are described in more detail in following paragraphs.

In connection with the evaluation problem and the forward algorithm, given a triple (π, A, B), what is the probability that an certain observable sequence may occur?

Figure 27:
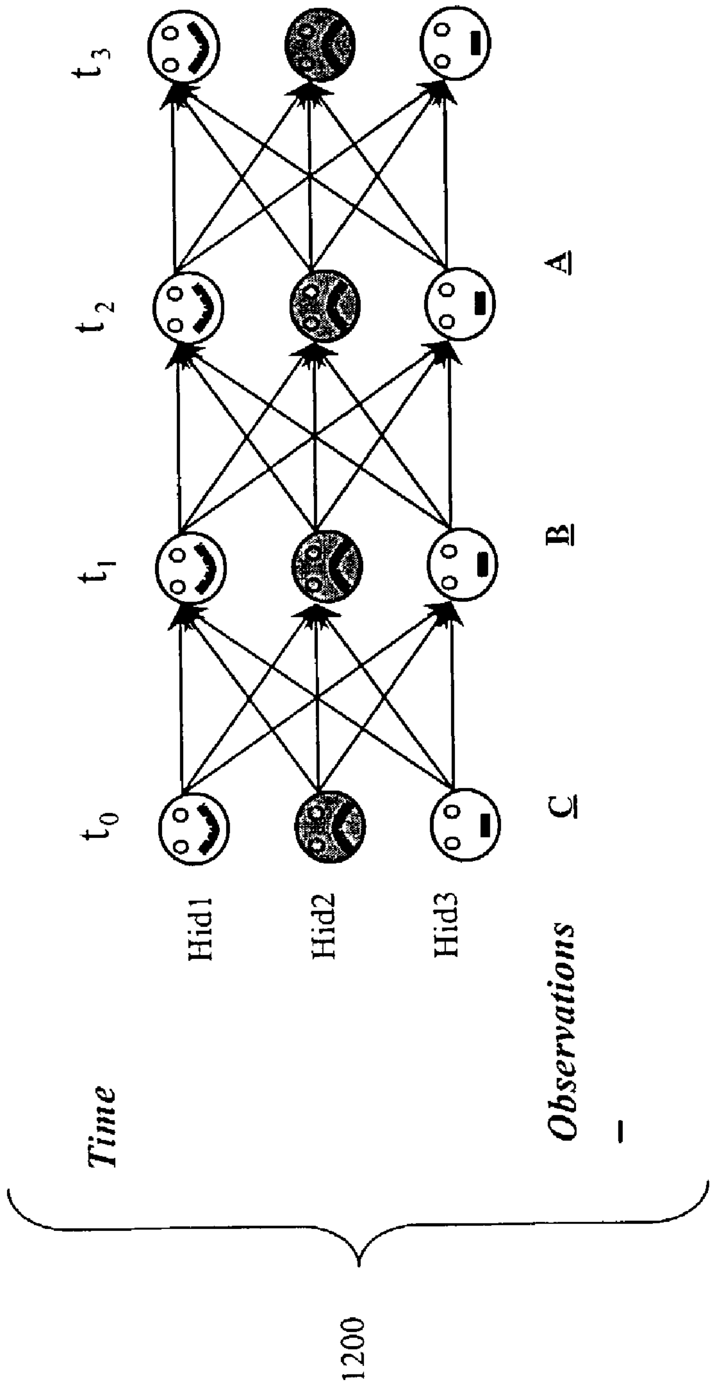
FIGS. 27-31 are diagrams illustrating use of a Hidden Markov Model in connection with the system described herein.

Referring now to FIG. 27, shown is an example 1200 of a representation of hidden states over a period of time. The hidden states in this example may be referred to as Hid1, Hid 2, and Hid 3 at various times t0, t1, . . . in the trellis representation 1200. Each of the hidden states has a probabilistic relationship to one or more hidden observations. For example, there may be four observable states (A, B, C, D) in an embodiment which represent the customer satisfaction ratings made by consumers in connection with a particular service. These observed states may be associated with, for example, three hidden states (Hid1, Hid2, Hid3). The probabilistic relationship when moving from one hidden state to the next with a Markov process of order 1 may be used to define the transition matrix which is a 3×3 matrix of probabilities in this example.

The initial probability vector is a 1×3 vector and the confusion matrix is a 3×3 matrix of probabilities representing the probability of an observed state given a particular hidden state.

Figure 28:
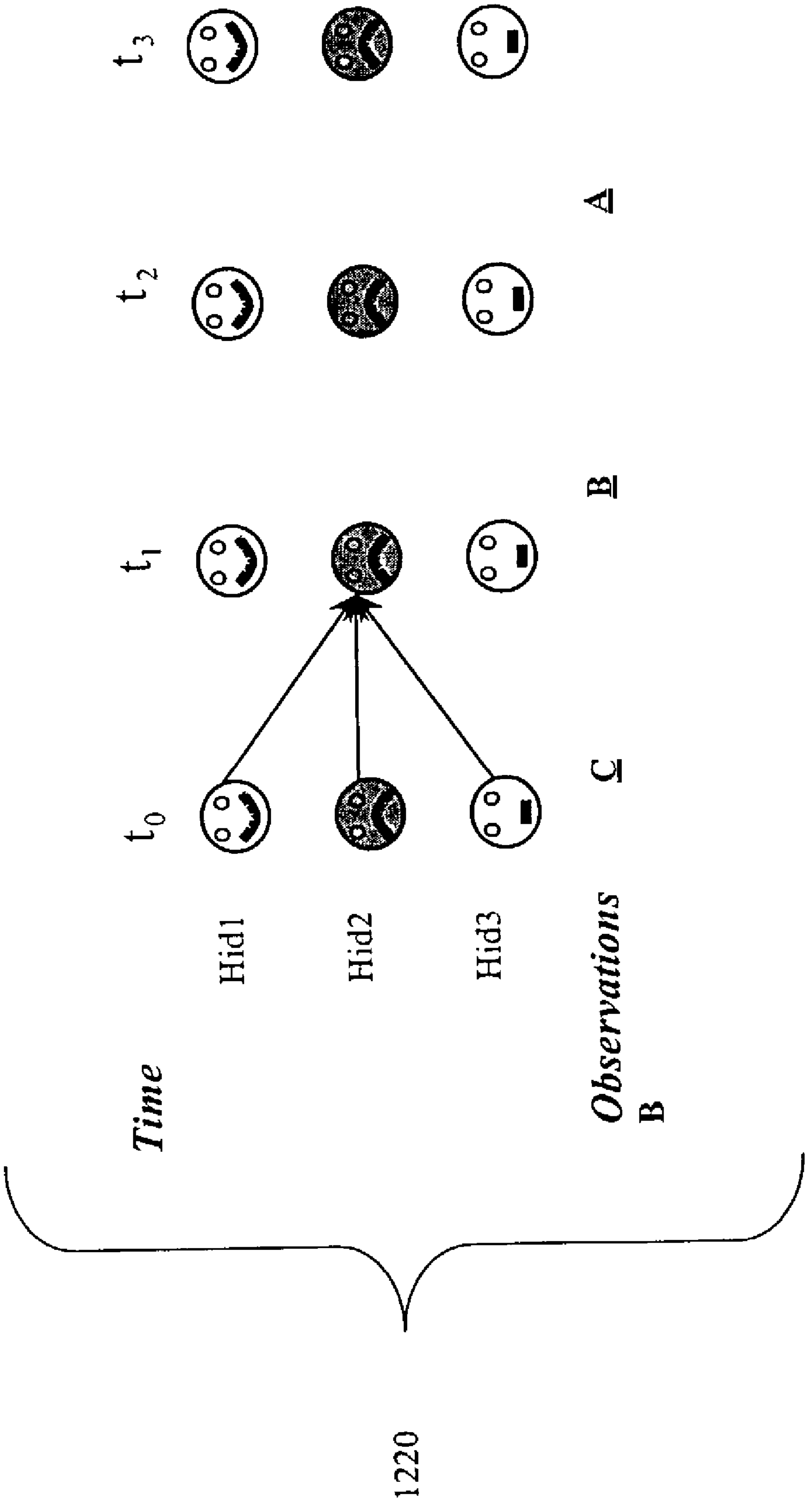

The forward technique uses the time invariance property of the probabilities to reduce the complexity of the calculations such that partial probabilities may be used in a recursive manner. The partial probability may be defined as the probability of reaching an intermediate state in the trellis representation 1200. The probability of reaching an intermediate state in the trellis is the sum of all possible paths to that state. For example, referring to FIG. 28, the probability of the customer being in state Hid2 at time t1 may be represented as in the trellis representation 1220.

Let the partial probability of state j at time $t_k$ and observation $O_k$ be denoted as $$\alpha_{t_k}^j(o_k).$$

In other words, $$\alpha_{t_k}^j(o_k) = Pr$$

(Observation $O_k$|hidden state is j)×Pr (all paths to state j at time $t_k$). If the partial probability is determined for reaching each of states Hid1, Hid2, and Hid3 at time t3, and these three partial probabilities are summed together, the sum of these partial probabilities is the sum of all possible paths through the trellis. Following is a representation of the recursive formula that may be used to determine the partial probabilities:

$\alpha_{t_k}^j(O_k)$=Probability (observation $Ok$|hidden state is $j$)×$Pr$(all paths to state $j$at time $tk$).

At time 0 (i.e. $t_k=t_0$), there are no paths leading to the first column of the hidden states in the trellis representation. Hence, the partial probability of a certain observation o given a hidden state j is defined as the initial probability of the HMM at the hidden state j multiplied by the probability of having the observation o at time 0; that is:

$$\alpha_{t_0}^j(o) = \pi(j)b_{jo}$$

where, π(j) stands for the probability of the HMM being at the hidden state j at time 0 and $b_{jo}$ stands for the probability of observing the observation o given the hidden state j. Assuming the partial probabilities at any time $t_k$ are available, the partial probabilities at time $t_k$ may be used in determining the probabilities at time $t_{k+1}$. This may be represented recursively as:

$$\alpha^{j}_{t_{k+1}}(o_{k+1}) = b_{jk}\sum_{l=1}^{n} a_{ij}\alpha^{l}_{t_k}(o_k)$$

Thus the partial probability may be calculated as the product of the appropriate observation probability (i.e. probability of having the observation $O_{k+1}$, being provoked by hidden state j, at time $t_{k+1}$) with the sum of probabilities of reaching that state at that time. Finally the sum of all partial probabilities gives the probability of the observation, given the HMM. The recursive relationship given by the foregoing permits calculation of the probability of an observation sequence given an HMM at any time. This technique reduces the computational complexity of calculating the probability of an observation sequence given a HMM. For instance, consider the case of a sequence of T observations and a HMM (Π, A, B). The computation of partial probabilities grows linearly with T if this forward algorithm is used. However, this computation grows exponentially with T if one uses the "naive" (or exhaustive) method.

Figure 29:
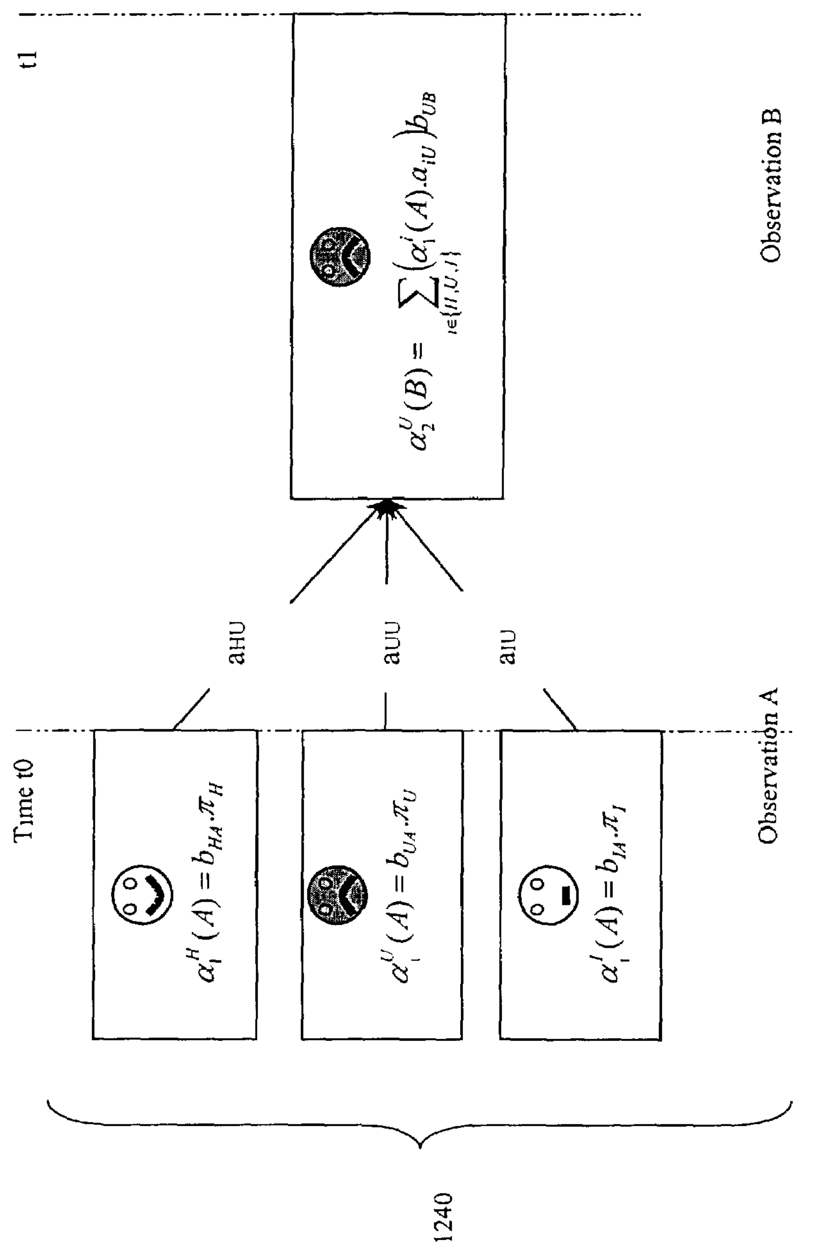

Referring now to FIG. 29, shown is a representation 1240 of an example of the forward algorithm applied. FIG. 29 shows the calculation of the partial probability at time $t=t_1$ for an "Unhappy" state with a sequence of observations ("A", "B"). This is the product of the appropriate observation probability and the sum of the previous partial probabilities multiplied by the appropriate transition probabilities. In this diagram 1240, the notation was changed for clarification purposes. Upper and lower scripts were used to designate hidden and observed states.

In connection with the second problem, the Viterbi algorithm may be used to efficiently answer the following question: "Given a particular HMM and an associated sequence of observations, what is the most likely sequence of underlying hidden states that might have generated such observation sequence"? One technique that may be used in determining this most likely sequence is to find the most probable sequence of hidden states that generated such observation sequence. First, all possible sequences of hidden states may be listed and the probability of the observed sequence for each of the combinations. Second determine the sequence of hidden states that maximizes:

Pr(observed sequence|hidden state combination).

Such a sequence of hidden states is the most likely sequence that generated the observation sequence at hand. A naïve approach may be used by exhaustively calculating each combination. Alternatively, the time invariant property may be considered as with the forward algorithm described herein.

Figure 30:
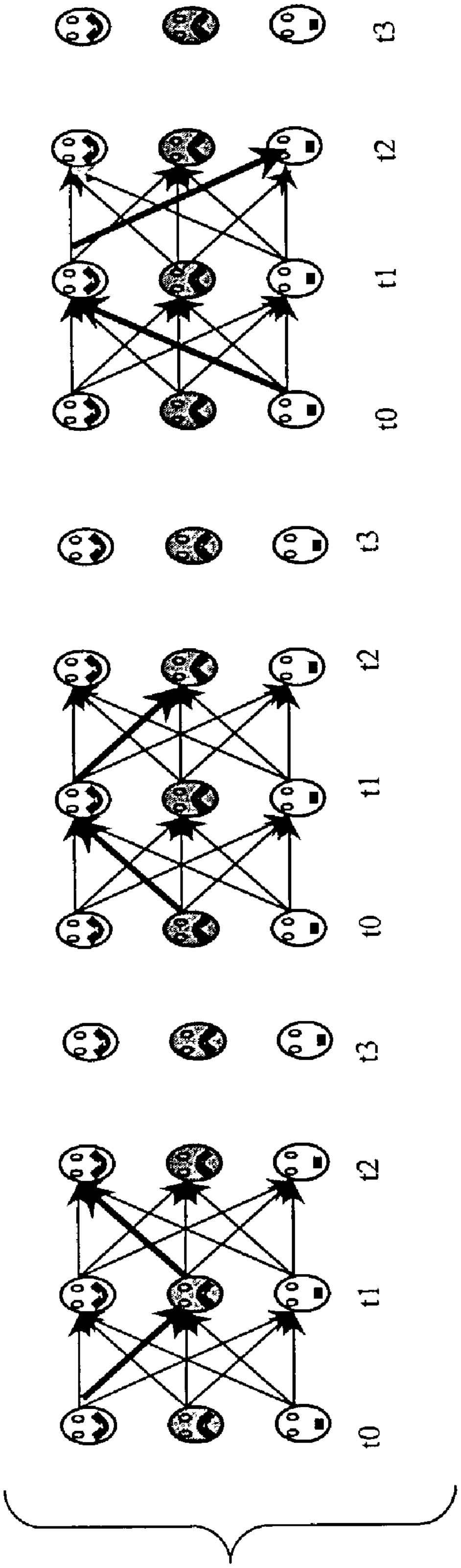

Referring now to FIG. 30, shown is an example of a trellis state representation 1280. Each hidden state in the trellis has a most probable path leading to it. Consider, for instance, the three intermediate states at time $t_2$. The most probable partial path to each one of these three states at time t=2 may be as in 1280. These paths may be referred to as best partial paths. Each of these best partial paths has an associated probability called partial probability denoted by $$\delta^{j}_{t_k}(o_k)$$

where j stands for the hidden state, $t_k$ for the time of observation (i.e. $k^{th}$ column in the trellis), and $O_k$ for the observation at that time. Unlike its definition in the forward algorithm, the partial probability $$\delta^{j}_{t_k}(o_k)$$

is defined here as the maximum probability of all sequences ending at state j and observation $O_k$ at time $t_k$. The sequence of hidden states that achieves this maximal probability is the partial best path. The partial probability and its associated best path exist for each cell of the trellis (i.e. for any triplet j, $t_k$, and $O_k$). In particular, each state at the final time $t_k$=T (i.e. end of the observation sequence) will have a partial probability and a partial best path. The overall best path is associated to the state with the maximum partial probability.

This maximum partial probability may be defined recursively. Recall that the Markov assumption in the case of a first order Markov model states that the probability of $$j^1_k$$

occurring after a sequence depends only on the previous state. Hence, the most probable path to the hidden state $$j^1_k$$

at time $t_k$ and observation $O_k$ is given by:

$$Pr(j^1_k \text{ at time } t_k \text{ and observation } o_k) = \max_{i\in\{1,2,3\}}\begin{bmatrix} Pr(j^1_{k-1} \text{ at time } t_{k-1} \text{ and observation } o_{k-1})\times \\ Pr(j^1_k / j^1_{k-1})\times Pr((o_k \text{ at } t_k)/j^1_k) \end{bmatrix} \tag{9}$$

The first term of the right-hand side of the above equation (9) is given by the partial probability at $t_{k-1}$, the second by the transition probabilities and the third by the observation probabilities. The probability of the partial path to the state $$j^{i_0}_k$$

at time $t_k$ and observation $O_k$ is recursively computed in a general way as:

$$\delta^{j^{i_0}_k}_{t_k}(o_k) = \max_{i\in\{1,2,\ n\}}\left\lfloor \delta^{j^{1}_{k-1}}_{t_{k-1}}(o_{k-1})a_{j^{i_0}_k j^{i}_{k-1}} b_{j^{i_0}_k o_k}\right\rfloor \tag{10}$$

Equation 10 provides the partial probability $$\delta_{t_k}^{j_k^{1_0}}(o_k)$$

at each intermediate and final hidden state of the trellis. Recall that the aim is to find the most probable sequence of states through the trellis given an observation sequence. Hence, one needs to develop a technique of "remembering" the partial best paths through the trellis. This remembering can be achieved by holding, for each state, a back pointer that points to the predecessor state that optimally led to the current state; that is:

$$\phi_{t_k}\left(j_k^{1_0}\right) = \arg\left\langle \max_{i\in\{1,2,\ n\}} \left\lfloor \delta_{t_{k-1}}^{j_{k-1}^{1}}(o_{k-1}) a_{j_k^{i_0} j_{k-1}^{i}} \right\rfloor \right\rangle \tag{11}$$

The operator at the right-hand side of the equation (11) selects the index i which the bracketed expression. This expression is calculated from the previous partial probability δ of the preceding time step and the transition probabilities. It does not include the observation probability as in (10). The foregoing Viterbi algorithm may be used to decode an observation sequence providing two important advantages: i) reduction in computational complexity by developing a recursive relationship between partial probabilities and ii) providing the best interpretation given the entire sequence of the observations.

Figure 31:
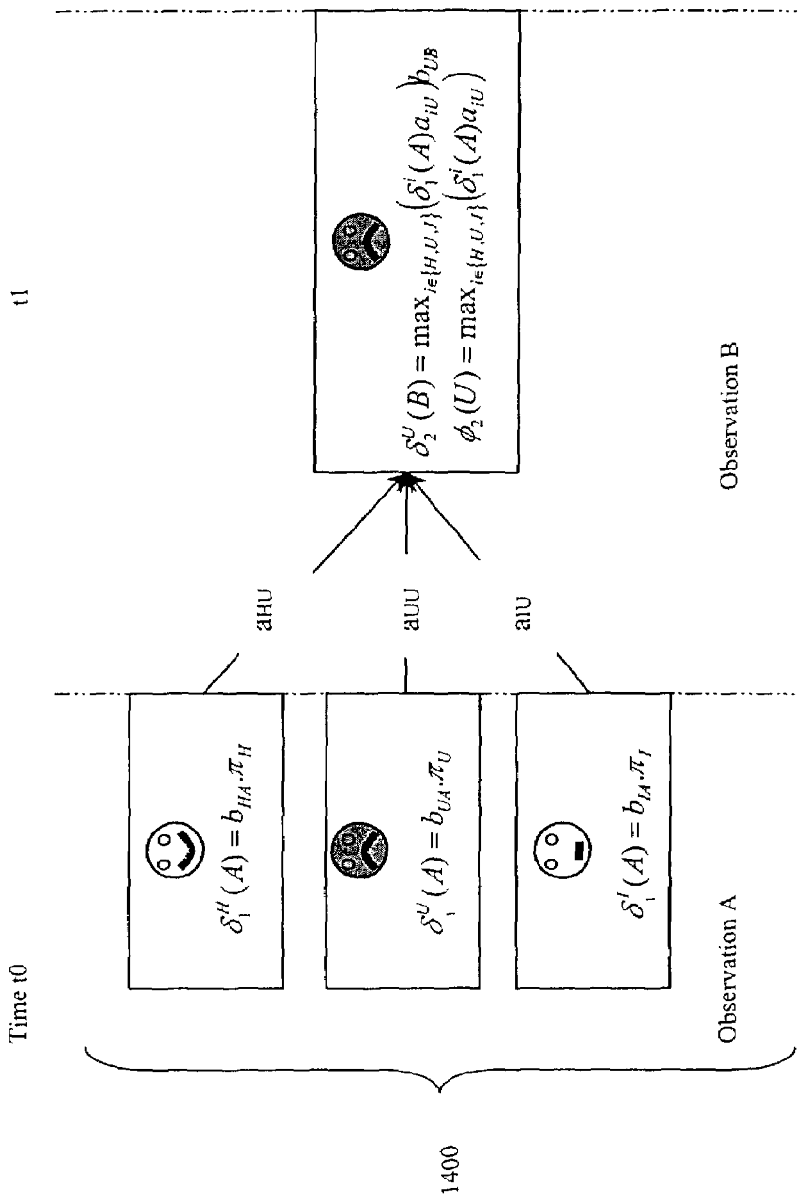

Referring now to FIG. 31, shown is a representation 1400 of the calculation of the Viterbi coefficients. The calculation of these coefficients is similar to the calculation of partial probabilities in the forward algorithm. Consider, for instance, the same example 1240 and calculate the Viterbi coefficients at time $t=t_1$ for the "Unhappy" state with a sequence of observation ("A", "B").

The representation 1400 is similar to the representation 1240. One difference is that the summation operator of the forward algorithm of 1240 is replaced by the maximization operation in the Viterbi algorithm in 1400. It should be noted that the Viterbi algorithm makes a decision based on an entire sequence rather than determining the most likely state for a given time instant. In other words, the Viterbi algorithm determines the maximum probability after examining all paths.

What will now be described is the third problem, the learning problem, and the associated forward-backward algorithm (also known as the Baum-Welch algorithm). The forward-backward algorithm is an iterative procedure that solves the learning problem based on a set of sequences of observations that follow a known hidden HMM. For example, a speech processing database may have underlying speech modeled by a Markov process based on known phonemes. As another example, an image database may have a series of images model a process for a fire within a bay. Given a current model approximation, the forward-backward algorithm computes the 'forward' probability of arriving at each state in the trellis and the 'backward' probability of generating the final state of the model. Both of these executions are computed advantageously by exploiting recursion.

As defined elsewhere herein, coefficients $$\alpha_{t_k}^{j}(o_k)$$

are the partial probabilities that a given HMM has generated an observation $O_k$ at instant $t_k$ and at hidden state j. The Forward algorithm is build on a left-to-right sweep through the trellis starting from time zero (i.e. first column of the trellis) and ending at time T of the last observation in the sequence. The counterpart of $$\alpha_{t_k}^{j}(o_k),\ \beta_{t_k}^{j}(o_k),$$

build on a right-to-left sweep through the trellis starting from time T (i.e. last column of the trellis) and ending at time 0, may also be defined. Similarly to α, β can be computed recursively as follows:

$$\begin{cases} \beta_{t_T}^{j}(o_T) = \varphi(j) b_{jo_T}(o_T); & \text{for } k = T \\ \beta_{t_k}^{j}(o_k) = b_{j(k+1)}(o_{k+1}) \sum_{1=1}^{n} a_{1j} \beta_{t_{k+1}}^{1}(o_{k+1}); & \text{for } 0 \le k < T \end{cases} \tag{13}$$

The vector ϕ is defined similarly to the vector π of initial probabilities in the forward algorithm. $\gamma_{ij}(O_k)$ may be defined as the HMM probability of moving from the hidden state i to the hidden state j and observing $O_k$ given the observation sequence $(O_0, O_1, \ldots, O_T)$; that is:

$$\gamma_{ij}(o_k) = \frac{\alpha_{t_k}^{i}(o_{k-1}) a_{ij} b_{ij}(o_k) \beta_{t_k}^{j}(o_k)}{\alpha_{t_T}^{s_f}} \tag{14}$$

where $$\alpha_{t_T}^{s_f},$$

known as the alpha terminal, is the probability that the HMM generated the observation sequence $(O_0, O_1, \ldots, O_T)$. The expected number of transitions from state i to state j given $$(o_0, o_1, \ldots, o_T) \text{ is } \sum_{k=0}^{T} \gamma_{ij}(o_k)$$

and the expected number of transitions from state i to all other states is $$\sum_{k=0}^{T} \sum_{l=1}^{n} \gamma_{il}(o_k).$$

The coefficients $a_{ij}$ and $b_{ij}$ can be then recomputed as follows:

$$\hat{a}_{ij} = \frac{\sum_{k=0}^{T} \gamma_{ij}(o_k)}{\sum_{k=0}^{T} \sum_{l=1}^{n} \gamma_{il}(o_k)} \tag{15}$$

and, $$\hat{b}_{ij}(o_l) = \frac{\sum_{k \ni o_k = o_l} \gamma_{ij}(o_k)}{\sum_{k=0}^{T} \gamma_{il}(o_k)} \tag{16}$$

Equation (15) means that the estimate of $a_{ij}$ is recomputed as the probability of taking the transition from state i to state j. However, equation (16) means that the estimate of $b_{ij}(O_1)$ is recomputed as the ratio between the frequency that symbol $O_1$ is emitted and the frequency that any symbol is emitted $a_{ij}$ and $b_{ij}(O_1)$ given respectively by (15) and (16) are unique global values. This means that at every iteration there is an improvement of the HMM unless it is already in a critical point. The following steps may be used to define the forward-backward algorithm:

1. Guess an initial set of the parameters {a, b}
2. Compute $\hat{a}_{ij}$ and $\hat{b}_{ij}$ using the re-estimation formulas (15) and (16)
3. Set $\hat{a}_{ij}$ to $a_{ij}$ and $\hat{b}_{ij}$ to $b_{ij}$ As described elsewhere herein, an HMM may be used if hidden states of a particular phenomena under investigation are accessible through some observations. In one embodiment in connection with images, HMM may be used to model the distribution map, for example, of fire and smoke, within the space domain. Hidden states representing, for example, normal air, smoke and fire may be defined in one embodiment. Various interpretations may be investigated including, for example, coefficients of the Karhunen-Loeve Transform (KLT) for each feature under consideration.

In connection with the distribution map as described above, reference is made to one or more types of features that may be based upon an image distribution map. For example, intensity, such as the gray level value associated with a pixel distribution, is one way to reference the distribution of pixels in a given frame or image. Other features in addition to pixel intensity may be used to describe and characterize the distribution map of various regions of interest in a particular frame such as, for example, fire, smoke, or hot spots. Among those features, one may also consider Fourier descriptors, wavelet coefficients, statistical moments, and the like. These features may be evaluated, decoded, and taught to the HMM to identify various regions of interest in a particular image. Thus, a distribution map may relate to one or more features including direct intensity level values of image pixels as well as single or combined relevant factors such as time, statistical properties, correlation between pixels, and the like.

An embodiment using the HMM technique described herein may use the three general solutions described elsewhere herein to be solved referenced as the evaluation problem, the decoding problem, and the learning problem. The evaluation problem may be used to determine the probability of an observed sequence such as hot spot to smoke to fire or the sequence hot spot to hot spot to smoke for example. The decoding problem may be used to estimate the most likely sequence of underlying hidden states that might have generated a particular observed sequence. Knowing in a probabilistic way the hidden sequence that enables the HMM process to produce a given sequence may be used in confirming and predicting the evolution of a particular sequence either on time or on space to characterize growing and shrinking regions in an image.

The description of an observation of a particular process at hand, for example, such as one of fire, smoke or a detected hot spot, may be closely related to the feature being used. Once a given feature, such as the pixel gray level or the energy indicator, is decided upon to be included in an embodiment, various matrices described herein in connection with the HMM model may be determined. In particular, in connection with a particular feature, the initial probability matrix, the transition matrix, and the confusion matrix may be determined. Recall that the initial probability matrix represents the determination of the probabilistic matrix defining the initial condition of the state. The transition matrix includes probabilities of moving from one hidden state to another. The confusion matrix includes probabilities of observing a sequence given an HMM process. Values of the probability matrices depend on the selected features and the adopted statistical method used to classify those particular features. Consider an example in which the pixel gray level is a feature to be used. A smoky region may be defined as a set of contiguous pixels with values in the interval [S1, S2]. A fire region may be defined as a set of contiguous pixels with values in the interval [F1, F2]. A hot spot region may be defined as a set of contiguous pixels with values in the interval [H1, H2]. In determining such distributions, an embodiment may use a statistically meaningful set of images of pixels such as thousands of images. The probability of a given pixel to be in one of the various regions of interest such as the smoky region may be calculated as the ratio of the number of pixels whose intensity values are within the particular range [S1, S2] and the total number of pixels. A pixel may vary in one or more particular regions in accordance with time. The forward algorithm as described elsewhere herein in connection with the evaluation problem may be used in providing an estimation of the probability of the system changing from one state to another such as used in connection with the transition matrix. An embodiment may also use a more heuristic approach in accordance with experience and common sense of an experienced user to determine the values of particular matrices described and used in connection with defining an HMM.

In the foregoing, it should be noted that the forward algorithm as may be used in connection with the evaluation problem described elsewhere herein may be used in determining an estimation of the probabilities used in connection with the transition matrix. An example of a use in an embodiment of the decoding problem and associated algorithm is that it may first be executed to determine the most likely sequence of underlying hidden states given a particular observed sequence. This decoding problem and associated algorithm may be used in connection with confirming or denying the existence of a particular state such as fire, smoke and the like. Similarly, the learning problem as described herein may be used in determining model parameters most likely to have generated a sequence of observations and may be used in providing initial values for probabilities as part of a learning phase, for example, in connection with determining probabilities the state transition matrix and confusion matrix.

In connection with an HMM, the KLT transform is a decomposition technique that is a variation of the PCA also described herein. It should be noted that PCA may also be referred to as the Hotelling transform. The KLT decomposition or transformation technique may be characterized as a decorrelation technique proceeding by finding an orthogonal set of eigenfunctions that capture, in increasing order, most of the image energy (entropy information or a variability between pixels). The data may then be expanded in terms of an eigenfunctions at each frame, varying in time or in space, for example. The variation of the KLT coefficients v. time in space describes the dynamics of the particular process. The KLT may be preferred in an embodiment, for example, when the data contains a certain degree of symmetry. The KLT decomposition technique extracts features that may not be ostensible in the original image and preserves essential information content in the image where the reduced number of features. These features, as described elsewhere herein, may be used as an input in connection with the HMM processing or any other image classification and interpretation process such as, for example, the neural net, fuzzy logic, multiple model state estimator, and the like also described elsewhere herein.

Note that for the example of HMM provided herein, hidden customer states were provided. However, it would be possible to adapt this example to fire detection by replacing the customer states with various fire-related states, such as no fire, fog, and smoke situations. For a general discussion of HMM and applications thereof, see L R Rabiner and B H Juang, "*An introduction to HMMS*," IEEE ASSP Magazine 3, pp. 4-16, January 1986.

The features which are obtained from a particular image or set of images observed may be initially determined to correspond to a particular condition, such as smoke, fire, and the like. In one embodiment, once a particular alarm condition has been determined, one or more estimators may be used to obtain the "true" values of the particular features. The use of the estimators may be characterized as a type of filtering to process feature values. There may be many estimators running in parallel as fire-related image features, for example, are identified.

Described in following paragraphs are techniques that may be included in an embodiment having a plurality of estimators. Each estimator may be utilizing a different model of the system being considered. An estimator may be utilizing, for example, the PCA technique or the multiscale modeling technique. Inputs to the estimators may be the features under consideration that may be combined and accordingly weighted to produce a final result or estimate as to the existence of a particular state. By using multiple state estimation modules, an embodiment may reduce dependence of the overall state estimator on stand-alone fault detectors and provide a more robust system against sensor faults.

The multiple state estimation module and techniques used therein may be included in the multi-camera fusion routine 232 in an embodiment. It should be noted that other embodiments may include the multiple state estimation module and techniques used therein in other components of a system.

An embodiment may include features or sensors of different types that are inputs to the estimators. In one embodiment, these features may be extracted from images as described herein. The techniques described in following paragraphs uses analytical redundancy such that the inputs (sensor data or features based thereon) to the estimators depend on each other via a set of equations.

In this instance, the inputs to the multiple state estimation module correspond to features determined, for example, by the feature extraction routines 206, 206', 206" using, for example, feature extraction techniques like those discussed herein, such as frame energy determination, edge detection, PCA, etc One type of estimator may utilize Kalman filtering techniques. The concept of event detection via Kalman filtering is based on comparison between expected and actual prediction error, where an event is defined as a transition between states such as a transition from a no fire state to a fire state. At each iteration, the filter makes a prediction of future feature values $$\hat{y}_{k+1|k}=C\hat{x}_{k+1|k}$$

and compares the estimated or computed value it to the actual feature value. In an extended Kalman filter, the prediction is made via a nonlinear function $\hat{y}_{k+1|k}=g(\hat{x}_{k+1|k})$ The correction step is based on the assumption that the prediction errors $$e_{k+1}=y_{k+1}-\hat{y}_{k+1|k}$$

referred to as innovations, form a sequence of uncorrelated Gaussian variables with zero mean and covariance $S_{k+1}=\Sigma_{k+1|k}+R_{k+1}$ where innovation covariance is denoted as S; in [3] it is denoted $\Sigma$). Intuitively speaking, unusually large (or small) values of innovation indicate that the model used by the filter does not adequately represent the actual system. A method suggested in Y. Bar-Shalom and X.-R. Li, *Estimation and tracking: principles, techniques, and software*, Artech House, 1993 is to monitor normalized squared innovation $$\epsilon_k=e_k^T S_k^{-1} e_k$$

which, if the model is correct, has a $\chi^2$ distribution with m degrees of freedom. At a risk of delayed change detection, a system may also monitor a moving average of past s innovations $$\varepsilon_k = \sum_{j=k-s+1}^{k} e_j^T S_j^{-1} e_j$$

which should have $\chi^2$ distribution with ms degrees of freedom. Then, an event can be signaled if $\epsilon_k$ exceeds a threshold value, based on some pre-specified tail probability. This technique is suitable if the goal is a Boolean choice between two competing hypotheses: that the model is correct and that it is not. In using a particular model, observed discrepancies may be caused not only by events, but also, for example, by inaccurate specification of noise parameters Q and R. Consequently, event detection based on statistical testing of normalized innovation may be very sensitive to threshold choices.

An alternative method to the foregoing to assess model validity using innovations is based on multi-dimensional distribution of the innovation. If the model is correct, feature vector $y_{k+1}$ (features extracted from the k+1 image) has Gaussian distribution with mean $\hat{y}_{k+1}$ and covariance $S_{k+1}$, or equivalently innovation $e_{k+1}$ has Gaussian distribution with zero mean and covariance $S_{k+1}$. Likelihood of the current feature vector $y_{k+1}$, conditioned on the previous feature vectors, is the value of the corresponding probability density function calculated at point $e_{k+1}$ $$p(y_{k+1} \mid \hat{y}_{k+1}, S_{k+1}) = \frac{\exp\left(-\frac{1}{2}e_{k+1}^T S_{k+1}^{-1} e_{k+1}\right)}{\sqrt{(2\pi)^m \det(S_{k+1})}}$$

Calculation of likelihood values for different competing models allows differentiating between those models that fit the observed data better than the others. In the multiple-model estimation techniques, the above likelihood value may be used to generate relative weighting for combining estimates from the different models and associated estimators.

The multiple models may be weighted as described below. Suppose that there are K competing state estimators, each utilizing a different model of the system. Suppose that prior to measurement at moment k+1, an i-th estimator produced its own state estimate $$\hat{x}_{k+1|k}^{(i)},$$

its covariance $$\Sigma_{k+1|k}^{(i)},$$

the predicted feature vector value $$\hat{y}_{k+1}^{(i)},$$

and the innovation covariance $$S_{k+1}^{(i)}.$$

Assume also that based on observations collected so far, probability that the i-th model is the correct one has been assessed as $$P_{k+1|k}^{(i)}.$$

Then, after the features calculated on image k+1 ($y_{k+1}$) arrives, each of the estimators performs its own state update $$\hat{x}_{k+1|k+1}^{(i)}$$

and calculates an updated covariance $$\sum_{k+1|k+1}^{(i)}.$$

In addition, for each estimator there is an innovation $$e_{k+1}^{(i)} = y_{k+1} - \hat{y}_{k+1|k}^{(i)},$$

and the associated likelihood of the observed feature vector $$p_{k+1}^{(i)} \equiv p(y_{k+1} \mid \hat{y}_{k+1|k}^{(i)}, S_{k+1}^{(i)}) = \frac{\exp\left(-1/2 e_{k+1|k}^{(i)T} (S_{k+1}^{(i)})^{-1} e_{k+1|k}^{(i)}\right)}{\sqrt{(2\pi)^m \det(S_{k+1}^{(i)})}}$$

At this point, the Bayes formula may be used to update the probabilities of the competing models $$P_{k+1|k+1}^{(i)} = \frac{p_{k+1}^{(i)} P_{k+1|k}^{(i)}}{\sum_{j=1}^{K} p_{k+1}^{(j)} P_{k+1|k}^{(j)}}$$

Note that some models may only be concerned with a subset of the features, but for clarity of notation it is assumed in the discussion herein that all features are provided to all models. With the posterior probabilities calculated, the combined estimate and its approximate covariance is calculated using formula for approximation of mixture of Gaussian densities $$\hat{x}_{k+1} = \sum_{i=1}^{K} P_{k+1|k+1}^{(i)} \hat{x}_{k+1|k+1}^{(i)}$$

$$\sum_{k+1} = \sum_{i=1}^{K} P_{k+1|k+1}^{(i)} \left( \sum_{k+1|k+1}^{(i)} + v_{k+1}^{(i)} v_{k+1}^{(i)T} \right)$$

where terms $$v_{k+1}^{(i)}$$

represent the spread of means of all estimators around the weighted average $\hat{x}_{k+1}$:

$$v_{k+1}^{(i)} = \hat{x}_{k+1}^{(i)} - \hat{x}_{k+1|k+1}^{(i)}$$

The above formulae and associated description may be utilized in connection with the multiple-model estimation techniques described herein. The difference between different multiple-model estimation techniques is due to the way in which the prior estimates $$\hat{x}^{(i)}_{k+1|k},\ \sum^{(i)}_{k+1|k+1},\ \text{and } P^{(i)}_{k+1|k}$$

(to be used in the next iteration k+1) are calculated from the posterior estimates $$\hat{x}^{(i)}_{k|k},\ \Sigma^{(i)}_{k|k},\ \text{and } P^{(i)}_{k|k}$$

(generated in the previous iteration k).

Following is a description of how the basic concept of multiple-model estimation may be used for detection of changes in the status of the bay, such as appearance of a smoke cloud, hot spot or a flame. The feature extraction stage that precedes the multiple estimator module outputs a set of features that characterize the image. This set may be represented as a vector of M inputs to the multiple model estimator. To provide possibility of detecting all events of interest, a separate state estimator may be included for each of possible K states of the cargo bay. Each of the K models associated with different possible states of the cargo bay may use some or all elements of the feature vector. Each model incorporates different mechanism of predicting future values of the feature vector assuming that its hypothesis about the state of the bay is correct. The prediction function of the i-th model may be expressed as $$\hat{y}^{(i)}_{k+1} = g^{(i)}(\hat{x}^{(i)}_{k+1|k})$$

Innovation for this model may be calculated as:

$$e^{(i)}_{k+1} = y^{(i)}_{k+1} - \hat{y}^{(i)}_{k+1|k} = y_{k+1} - g^{(i)}(\hat{x}^{(i)}_{k+1|k})$$

Different measurement prediction functions $g^{(i)}$ can be used by different models.

Figure 32:
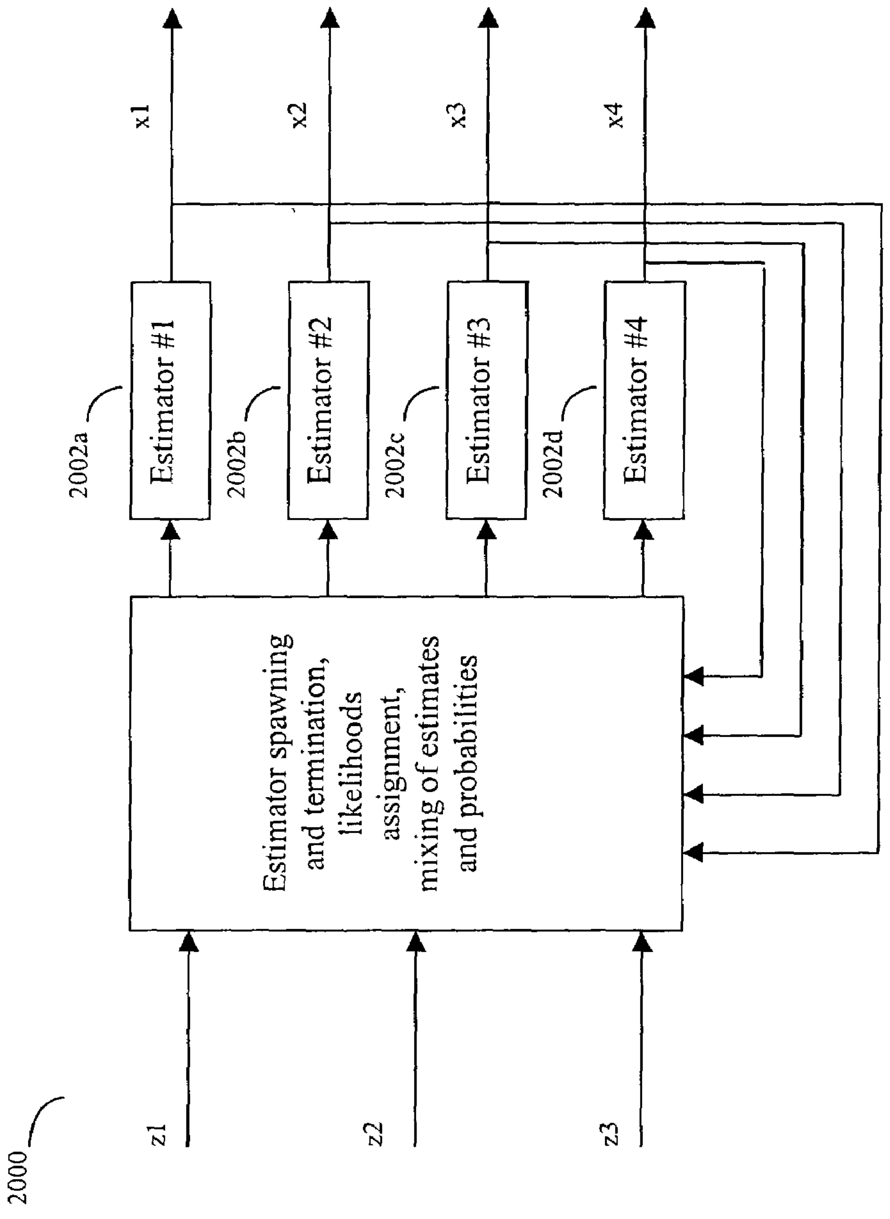
FIGS. 32-35 are diagrams illustrating use of a multi-model estimator according to the system described herein.

Referring now to FIG. 32, shown is an example of an embodiment of the multiple-model estimator 2000. All estimators have access to the same feature vector and use to predict the future values of the feature vector based on their different assessment of the state of the cargo bay. The likelihood of current feature vector under each model is determined and the one estimator with the highest likelihood value dominates the fused output. In other words, we select the outlier in terms of the likelihood function as the selected correct model.

Figure 33:
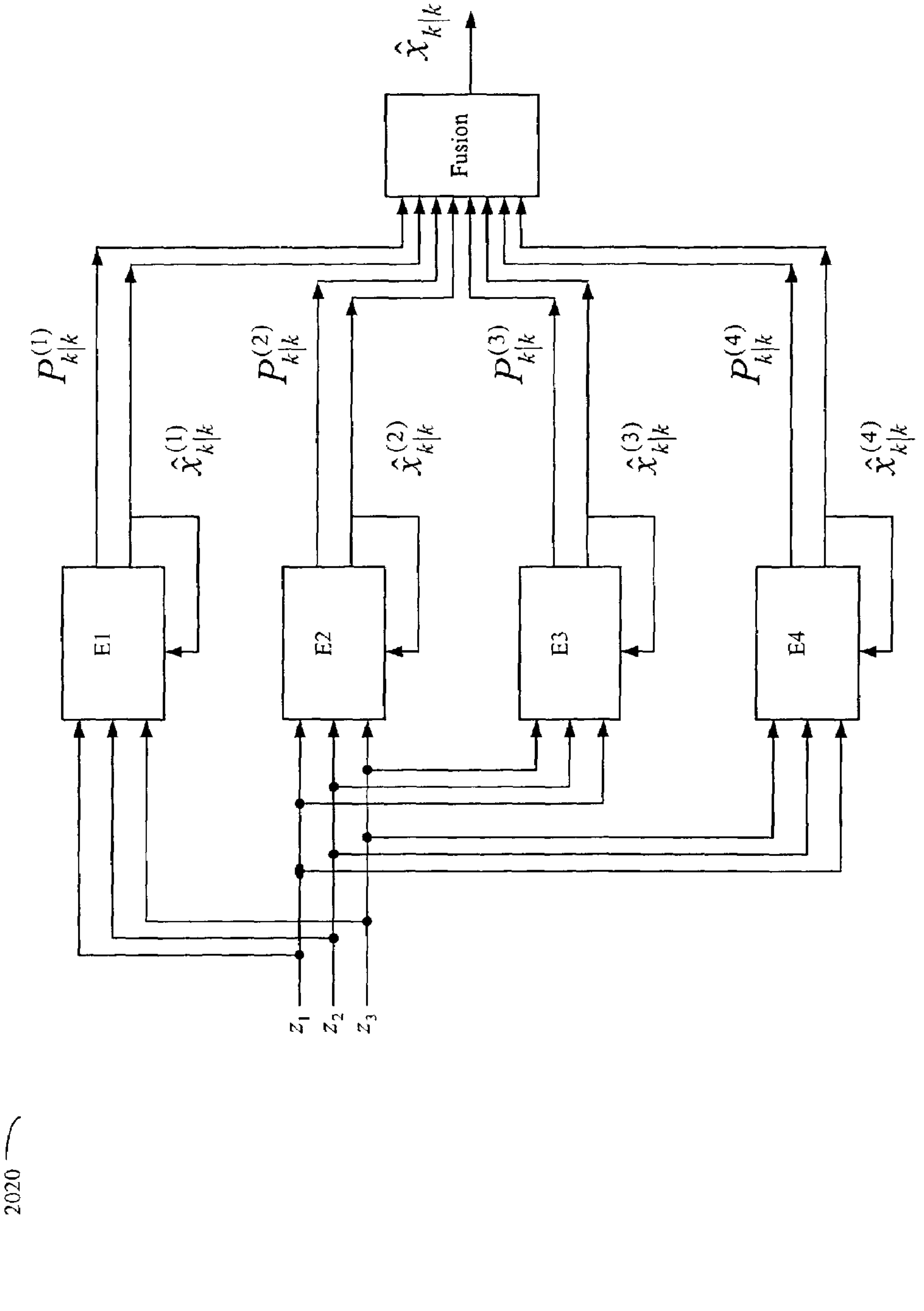

Referring now to FIG. 33, shown is another example of an embodiment of a multiple model estimation technique that may be characterized as a non interacting multiple state model.

In this arrangement 2020, the multiple models run separately, with no interactions between the internal state of other models. The only mixing of the estimates is the calculation of the combined output. The prediction of the next state and measurement in each estimator is based only on its own previous estimate:

$$\hat{x}^{(i)}_{k+1|k} = f^{(i)}(\hat{x}^{(i)}_{k|k})$$

$$\hat{y}^{(i)}_{k+1|k} = g^{(i)}(\hat{x}^{(i)}_{k+1|k})$$

For calculation of appropriate covariance matrices, separate Jacobian matrices $$A^{(i)}_k \text{ and } B^{(i)}_k$$

are obtained for each filter by linearizing functions $f^{(i)}$ around the posterior estimates $$\hat{x}^{(i)}_{k|k}$$

from the previous moment k, and Jacobians $$C^{(i)}_{k+1}$$

are found by linearizing functions $g^{(i)}$ around the predicted estimates $$\hat{x}^{(i)}_{k+1|k}.$$

As a starting condition, the system may use initial state estimates $$\hat{x}^{(i)}_{0|0}$$

for each of the estimators, as well as prior probabilities $$P^{(i)}_{0|0}.$$

The arrangement 2020 utilizes techniques that may be referred to as the ZOA or zero-order approximate filter as described in D. T. Magill, "Optimal adaptive estimation of sampled stochastic processes", *IEEE Transactions on Automatic Control*, vol. 10, 435-439, 1965; and D. G. Lainiotis, "Partitioning: a unifying framework for adaptive systems, I: estimation", *Proceedings of the IEEE*, vol. 64, 1127-1143; and K. A. Loparo, M. R. Buchner and K. S. Vasudeva, "Leak detection in an experimental heat exchanger process: a multiple model approach", *IEEE Transactions on Automatic Control*, vol. 36, 167-177, 1991.

An embodiment utilizing the ZOA technique may be based on the assumption that one of the competing models/estimators is correct at all times in that only one hypothesis about the internal state of the aircraft bay is likely all the time. Because of this, the a priori probability at the beginning of step k+1 is the same as the a posteriori probability at the end of step k $$P^{(i)}_{k+1|k} = P^{(i)}_{k|k}$$

An embodiment using the ZOA approach may have the probability of all models, except the one most likely, decay virtually to zero because at each iteration the a priori probability is multiplied by the relative likelihood of the current observation under the particular model. Therefore, after some time, the estimator may lose ability to detect changes and adapt. An embodiment may compensate for this, for example, by specifying some small lower bound on probability of each possible model, to keep all models "alive" even when highly unlikely.

Another multiple state model estimation technique may be referred to as the generalized pseudo-Bayesian algorithm I (GPBI). This multiple-model approach is an approximation of the optimal Bayesian estimation for a system that may switch from one operational regime to another, for example, as described in G. A. Ackerson and K. S. Fu, "On state estimation in switching environments", *IEEE Transactions on Automatic Control*, vol. 15, 10-17, 1970; and Y. Bar-Shalom and X.-R. Li, *Estimation and tracking: principles, techniques, and software*, Artech House, 1993. This particular technique is based on the assumption that the system configuration (or operational regime) may change randomly at any time. The system is modeled as a Markov chain—that is probability of a switch from regime (or model) i to regime j depends only on the current regime, and is not dependent on history of previous switches. This makes it possible to recover from a misdiagnosed event or to detect temporary events, such as forming of fog that subsequently disperses, or a flame that is subsequently suppressed by an extinguishing action.

An embodiment using the GPBI technique includes a matrix of transition probabilities $P_T$, whose elements $p_{i,j}$ are a priori probabilities that a switch from model i to model j may occur at any given iteration. The transition probabilities are used to calculate the prior probability of model i at the start of iteration k+1 as a function of all posterior probabilities at the end of iteration k $$P^{(j)}_{k+1|k} = \sum_{i=1}^{K} p_{i,j} P^{(i)}_{k|k}$$

Because of this, model j may be still a viable option at iteration k+1 even if it was unlikely at iteration k, provided that a switch from some other, more likely model is possible.

Another aspect of the GPBI approach is that at each iteration, all estimators make their temporal predictions using as a starting condition the same fused (weighted) estimate $\hat{x}_{k|k}$ from the previous iteration. In addition, for the temporal update they all use the same fused covariance $\Sigma_{k|k}$.

Figure 34:
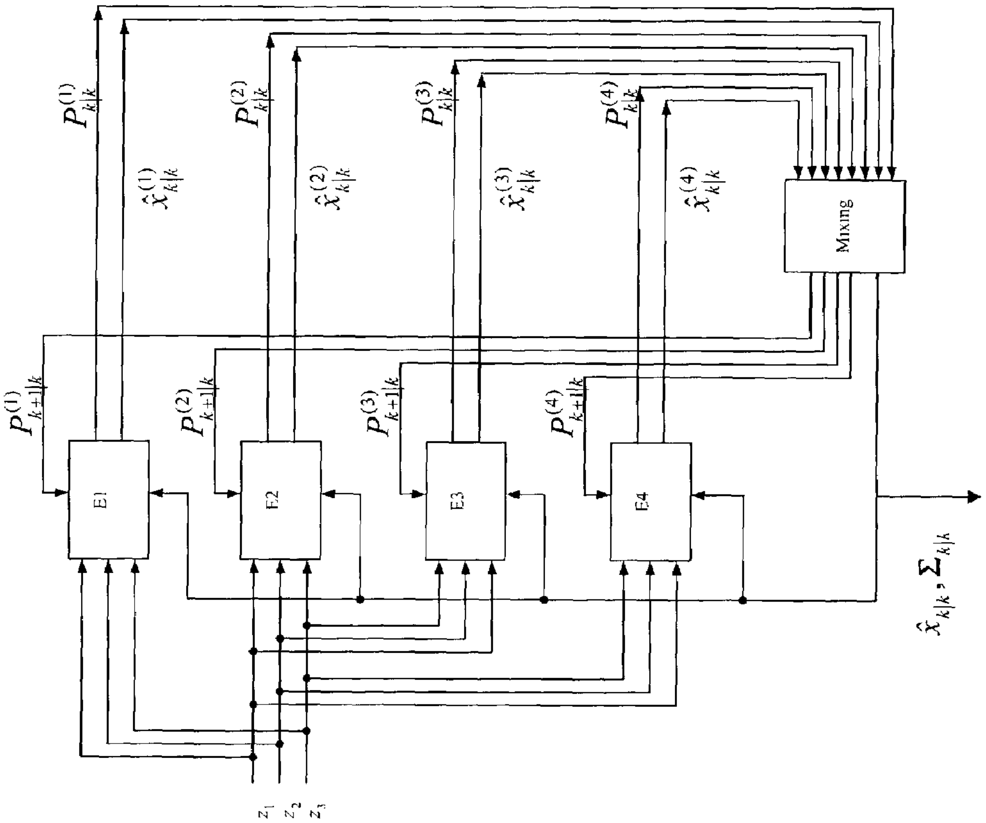

Referring now to FIG. 34, shown is an example of an embodiment of the GPBI technique. The example 2100 includes three inputs or feature inputs to the four estimators. Each model/estimator uses its own state transition and measurement function to calculate its a priori estimate $$\hat{x}^{(i)}_{k+1|k}$$

based on the common estimate $\hat{x}_{k|k}$. Similarly, each estimators calculates its own covariance matrix $$\sum\nolimits^{(i)}_{k+1|k}$$

calculated from the fused covariance $\Sigma_{k|k}$.

$$\hat{x}^{(i)}_{k+1|k} = f^{(i)}(\hat{x}_{k|k})$$

$$\sum\nolimits^{(i)}_{k+1|k} = A^{(i)}_k \sum\nolimits_{k|k} A^{(i)T}_k + B^{(i)}_k Q B^{(i)T}_k$$

Jacobian matrices $$A^{(i)}_k \text{ and } B^{(i)}_k$$

are calculated separately for each estimator such that linearization of functions $f^{(i)}$ is performed around the points $$\hat{x}^{(i)}_{k|k}.$$

Prediction of measurement values may be performed for each model according to its own output equation $$\hat{y}^{(i)}_{k+1|k} = g^{(i)}(\hat{x}_{k+1|k})$$

All other computations may be performed as described in a previous section on general multiple-model approach.

Note that the GPBI technique has interacting models, which may make analysis more difficult, for example, than using the ZOA technique. Additionally, if using the GPBI technique, an embodiment should note that using a weighted sum of two likely estimates may not produce a good fused estimate.

An embodiment may also utilize the IMM or Interactive Multiple Models technique in connection with the Multiple Model State estimation. The IMM is described in Y. Bar-Shalom and X.-R. Li, *Estimation and tracking: principles, techniques, and software*, Artech House, 1993. In this approach, global pooling of a posteriori estimates for all models is replaced by local mixing of a priori estimates for each model separately. As in GPBI, one parameter is the transition probability matrix $P_T$. Its elements $p_{i,j}$ are used at the beginning of each iteration to calculate mixing coefficients $$\mu^{i,j}_k,$$

which are interpreted as probabilities that model i was in effect during previous iteration and that model j is in effect during current iteration. Since such a transition has a priori probability $p_{i,j}$, the mixing coefficients are calculated as follows:

$$\mu_k^{i,j} = \frac{p_{i,j} P_{k|k}^{(i)}}{\sum_{l=1}^{K} p_{l,j} P_{k|k}^{(l)}}$$

Note that the expression in the denominator is in fact the a priori probability that model j is in effect during current operation, calculated as in GPBI algorithm $$P_{k+1|k}^{(j)} = \sum_{i=1}^{K} p_{i,j} P_{k|k}^{(i)}$$

Then for each model, prior to the temporal update step, state estimates and covariance are mixed:

$$\tilde{x}_{k|k}^{(j)} = \sum_{i=1}^{K} \mu_k^{i,j} \hat{x}_{k|k}^{(i)}$$

$$\tilde{\Sigma}_{k|k}^{(j)} = \sum_{i=1}^{K} P_{k|k}^{(i,j)} \left( \Sigma_{k|k}^{(i)} + \tilde{v}_k^{(i,j)} v_k^{(i,j)^T} \right)$$

where terms $$\tilde{v}_k^{(i,j)}$$

represent the spread of non-mixed estimates around the mixed j-th estimate $$\tilde{x}_{k|k}^{(j)}$$

$$v_k^{(i,j)} = \hat{x}_{k|k}^{i} - \tilde{x}_{k|k}^{(i,j)}$$

The prediction step is performed for each estimator separately, using the mixed values $$\tilde{x}_{k|k}^{(i,j)} \text{ and } \tilde{\Sigma}_{k|k}^{(j)}:$$

$$\hat{x}_{k+1|k}^{(j)} = f^{(i)}(\tilde{x}_{k|k}^{(j)})$$

$$\Sigma_{k+1|k}^{(j)} = A_k^{(j)} \tilde{\Sigma}_{k|k}^{(j)} A_k^{(j)^T} + B_k^{(j)} Q B_k^{(j)^T}$$

$$\hat{y}_{k+1|k}^{(j)} = g^{(i)}(\hat{x}_{k+1|k}^{(j)})$$

Calculation of Jacobian matrices in IMM is performed separately for each estimator, since the corresponding non-linear functions are linearized around different points. The measurement prediction and linearization of functions $g^{(i)}$ is performed with a different argument $$\hat{x}_{k+1/k}^{(j)}$$

for every model, as in an embodiment using the ZOA technique. Thus, in a general case IMM has computational complexity greater than the non-interacting ZOA algorithm. The additional cost comes from the mixing operation—in particular from calculation of mixed covariance matrices $$\tilde{\Sigma}_{k/k}^{(j)}.$$

The final estimate output may be calculated as in GPBI and ZOA algorithms—through a weighted sum using probabilities $$P_{k/k}^{(j)}.$$

Unlike in GPBI, though, the fused estimate $\hat{x}_{k+1|k+1}$ is not used internally within the estimator.

Figure 35:
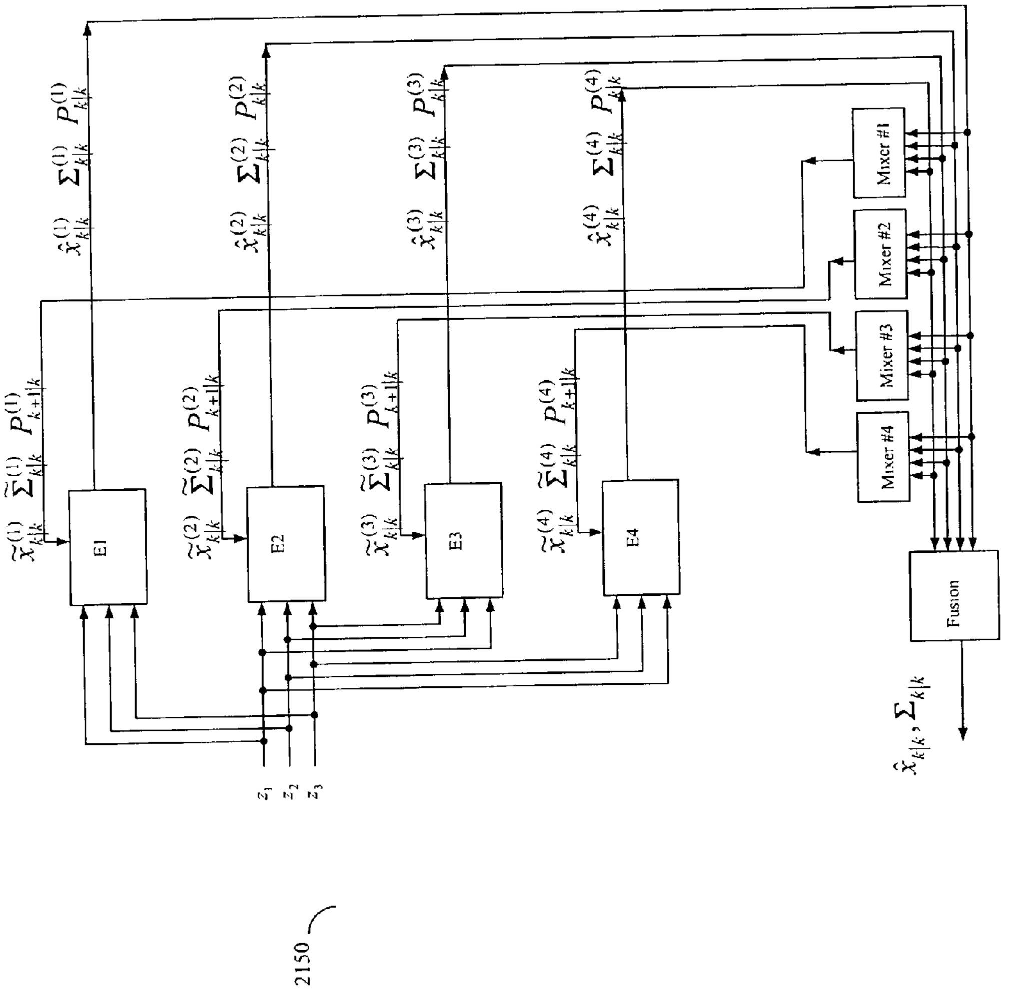

Referring now to FIG. 35, shown is an example of an embodiment 2150 of a three-input or feature input IMM estimator.

In the foregoing, it should be noted that the GPBI and IMM approaches require specification of model transition probabilities. In one embodiment, those may be probabilities of the state of the bay changing, for example from clear to foggy or smoky. The form of transition probability matrix corresponds to the user's knowledge, or belief about likelihood of such a change of the bay stste in any given time instant. At the same time, the structure of the matrix may influence computational load of the algorithm. As mentioned before, a significant fraction of processor time may be spent calculating the fused or mixed covariance matrices. Since the mixing coefficients $$\mu_k^{i,j}$$

in IMM are proportional to model transition probabilities $p_{i,j}$, it follows that a sparse matrix $P_T$ may help significantly reduce computational effort such that the only non-zero contributions to the mixed covariance are those that correspond to non-zero $p_{i,j}$.

If no specific prior knowledge is available about transition probabilities, then a sensible approach is to utilize a dense transition probability matrix in which all elements of the transition matrix are equal:

$$p_{i,j} = \frac{1}{M+1}$$

This, in Bayesian terms, may be characterized as a non-informative case in that nothing is known about probabilities of input faults, so any model transition is judged equally probable at any given time. An embodiment of the three feature or three-input example may use a matrix represented as:

$$P_T = \begin{bmatrix} 1/4 & 1/4 & 1/4 & 1/4 \\ 1/4 & 1/4 & 1/4 & 1/4 \\ 1/4 & 1/4 & 1/4 & 1/4 \\ 1/4 & 1/4 & 1/4 & 1/4 \end{bmatrix}$$

Even though the foregoing is a dense matrix, use of this matrix leads to dramatic reduction of computational effort in IMM. In fact, an embodiment using IMM in this instance may be computationally equivalent to the GPBI algorithm, since all mixing equations are the same.

In an embodiment, if transition probabilities are approximately known and different, then it is possible to exploit those differences by propagating independent multiple models. Alternatively, if there is little or no knowledge about transition probabilities, there is no advantage in using more sophisticated techniques, and simple pooling as in GPBI may be included in an embodiment.

The uniform matrix structure above may seem extremely conservative in its assessment of risk, that is it assumes that any fire-related scenario is as likely as the non-fire scenario. In the sparse structure, small transition probabilities may be used and characterized as "cautious". Using the uniform matrix may lead to frequent false alarms, but recovery from a misdiagnosis may be easy in comparison to other techniques and values. Since maximal distance between any two nodes on the transition graph is equal to one, the technique used should be able to quickly recover and detect true fire events.

What will now be described are some implementation concerns that may be taken into consideration for an embodiment.

One difficulty in using the proposed multiple-model estimation scheme may be the necessity to calculate likelihood values. As described elsewhere herein, calculation of likelihood values requires inversion of innovation covariance matrix $S_{k+1}$, and calculation of its determinant. Both problems may be solved if all covariance matrices are represented using modified Cholesky, or upper-unit-triangular-diagonal (UD) factorization, for example, as explained in M. S. Grewal and A. P. Andrews, *Kalman filtering: theory and practice*, Prentice Hall, 1993. An innovation covariance matrix may be written as:

$$S = U_{SDSUS}^T$$

where $U_S$ is the upper-unit-triangular factor (with ones on its main diagonal), and $D_S$ is the diagonal factor. The determinant of the covariance matrix may be expressed as the product of diagonal elements of $D_S$ $$\det S = \Pi d_{i,j}$$

This factorization technique provides for avoiding inversion of matrix S. Special form of factors $U_S$ and $D_S$ facilitates calculation of $S^{-1}e$.

An embodiment using Kalman filtering within the estimator may assume uncorrelated measurement noises—that is matrix R is diagonal. In this case, the observational update in Kalman filtering algorithm may be performed sequentially—a version using UD factorization of matrix $\Sigma_{k+1|k}$, as described in section 6.5.3 of M. S. Grewal and A. P. Andrews, *Kalman filtering: theory and practice*, Prentice Hall, 1993, such that the direct factorization of $S_{k+1}$ is not necessary. In other words, diagonal elements of $D_S$ naturally appear as a by-product of the observational update procedure, as do elements of $S^{-1}e$. Therefore, in case of uncorrelated measurement noise, calculation of likelihood values requires virtually no additional computational effort.

In an embodiment utilizing a standard Kalman filter as an estimator, calculation of a priori covariance matrix may be computationally expensive:

$$\Sigma_{k+1|k} = A_k \Sigma_{k|k} A_k^T + B_k Q B_k^T$$

An efficient method to compute UD factors of $\Sigma_{k+1|k}$ in terms of factors of $\Sigma_{k|k}$ and Q is given in section 6.6.3 of M. S. Grewal and A. P. Andrews, *Kalman filtering: theory and practice*, Prentice Hall, 1993. This method may also be used with a sum of more than two matrices, so that factorization of the mixed covariance can be performed using the already available factors of the contributing covariances. An advantage of using UD factorization approach is that multiplication of a matrix by a mixing coefficient μ may use only m scalar multiplications of diagonal factors, rather than $$\frac{m(m-1)}{2}$$

multiplications

In IMM and GPBI, an embodiment may change number and structure of the individual estimators. Based on observed feature vectors and operating conditions. Some models may be removed from the list of viable m\syetm model, and some other may be added.

In case of elimination or addition of certain models, the transition probability matrix $P_T$ may be rectangular, instead of square. In an embodiment, it may also necessary that all newly added models use the same structure of the state vector, so that mixing and fusing of state estimates and covariance matrices is possible. An embodiment using the ZOA technique may not take into account this latter condition where there is no interaction between estimators. State vectors of different estimators may have different dimensionalities, as long as the fused output is in their common subset.

The foregoing describes multiple model state estimator techniques. In particular, described herein are embodiments of the IMM, GPBI and ZOA multiple model state estimator techniques that may utilize a plurality of estimators. These estimators may use as their inputs different feature vectors, which may resul from different feature extraction methods such as PCA, wavelet transforms, and others. Each of these estimators may be used to predict an expected next set of feature values and compare those to actual input. The output values of estimators may be weighted and combined in accordance with the particular multiple model state estimator technique utilized. The way in which the estimators and inputs are arranged as described herein provides for detection and confirmation of change of state of the aircraft bay, for example, in the instance of fog or smoke formation.

It is also possible to use fuzzy logic to process the features determined at the feature extraction routines 206, 206', 206". Fuzzy logic is a known system of implementing, for example, rule-based expert systems that can account for uncertainties in values and rules applied thereto. It would be straightforward to one of ordinary skill in the art to process features extracted at the feature extraction steps 206, 206', 206" using fuzzy logic to detect the presence or absence of fire.

The system described herein may be seen as a particular application of a more general Autonomous Vision System (AVS) which is a concept for a family of products. The AVS provides a user with a tireless automated surveillance capability to monitor various elements of the aircraft integrity. The system may be used in applications where surveillance is needed and simple decisions for immediate corrective actions are well defined. Most of the hardware and software described herein is expandable to various applications of the AVS where analysis of "visual" phenomena is expected. Some examples of other AVS applications, where most of the system functions can be expanded, are described below.

The system may handle parked aircraft surveillance by monitoring the surroundings of the airplane by cameras and by detecting unexpected motion or intrusion such as loitering or movement of unauthorized personnel in restricted areas. The system can also be designed to take actions against acts of vandalism (e.g. forceful intrusion, intentional damage of the aircraft by stones and other means) by issuing an alarm signal to a designated third party through a wireless connection. This latest feature is useful particularly for general aviation and business jets that may have to park in remote areas and small airports (in the US and abroad) where aircraft and crew physical protection is inadequate. The concept would include standard surveillance function plus added intelligence in image processing, situational awareness, decision process and then some type of notification. This notification could be via some wireless, internet or other technique which would remote the information to some security center any where in the world or even to the pilot in his hotel room via his lap top computer.

The system may also be used for aircraft taxiing and moving assistance. The system would provide "eyes" for the pilot when moving the aircraft. In particular, the system could help assess wing tip clearances and verify that nothing is in the path of backing out aircraft. This functionality of enhancing the pilot awareness is useful for nose wheel steering and other activities such as docking. The value difference would be the augmentation of the video with intelligence to prompt the pilot of pending critical situations via the classical image process, situational awareness, decision algorithms and notification through human friendly graphical or other interfaces.

The system may also handle runway incursion prevention. The system could provide video monitoring data and possibly issue alerts to the crew if another plane, a ground vehicle, an airport crew, or any other unauthorized body or material (e.g. chocks) is intruding onto the runway. The system would improve the aircraft safety and help prevent on-the-ground collisions at overcrowded airports. The system could be tied to GPS and a data base of runway features to provide the pilot with an enhance image at several levels, including a synthetic heads up display.

The system may be used for pilot alertness monitoring. Long flight operations can often result in fatigue and disruption that may significantly diminish the pilot alertness leading to a decline in the safety margin of the aircraft and its crew. A way to detect pilot fatigue is highly desirable to prevent fatigue-related accidents. One way to check the pilot awareness is to directly monitor his/her eyes (and face) to detect micro-sleeps, head nodding, and eyelid movements. A video-based system, where a camera points directly toward the pilot's face and monitors the eyelid droop, pupil occlusion, and eyelid closure, seems an appropriate technique to implement this approach for pilot awareness monitoring.

The system may also be used as way for the aircrew to survey the situation of the physical aircraft. An option of showing images from outside of the aircraft body parts and the surroundings is a particular system upgrade that may become a baseline in the future. This could include the Goodrich Ice Hawk product function for detection of wing icing and complementary functions. This function may have also dual use as entertainment display for passengers. Live view from outside the airplane to the cabin passengers can be put in an entertainment and distraction context, particularly for business jet passengers.

The system could be used for monitoring of aircraft body parts and other inaccessible area for safety and security enhancement. Dedicated video-based systems with specific functions, cameras, and optics can be designed to monitor specific parts of the aircraft that include, for example, i) wheel wells and landing gear (e.g. to look for closure and hot spots); ii) engine nacelle; iii) battery compartment; iv) oxygen generator compartment; v) electronics compartment; vi) radar compartment; vii) communication compartments; viii) flaps; ix) actuator movement; x) wings (Tail mounted camera and others provide view of A/C while in flight to look for wing icing); xi) access door; and xii) cabin.

The AVS may be designed to sense patterns of interest at the monitored places such as motion, smoke, flames, hot spots (by means of the IR sensor), signs of fatigue, or suspicious action. Upon detection and verification (by numerous cameras and sensor fusion techniques) of patterns of interest, the system can be designed to take a set of predefined actions that include i) issuing an alarm to a third party with the specific type of threat; ii) initiating video recording of the view of interest and transmitting it to a remote location for storage or independent review. The importance of this action is such that the video recording may begin before the event could take place; and iii) taking measures to protect the aircraft such as turning the lights on if applicable, stopping the aircraft movement on the ground, and releasing of fire extinguishing agents.

The scope of the AVS can be expanded beyond the commercial aerospace segment to include military applications and other ground and sea transportation vehicles. Potential applications of the AVS in the military segment includes tanks and military vehicles to augment the user vision and awareness situation. Almost all the above applications apply to busses and heavy trucks. An AVS integrated to a large ship or submarine can provide close maneuvering and docking, monitoring exterior conditions and hazardous areas such as cargo bays, motor winch and munitions compartments.

Hardware and software elements of the system described herein may be expanded to other applications without or with minor changes. Cameras and associated modules (CCD or CMOS type cameras) and IR (Infra Red) are directly expandable to other applications. In particular, cameras optics that include lenses and camera calibration routines are expected to be applicable with minor changes to most of the mentioned AVS applications. A Digital Signal Processor unit may be used herein to process and move video data between cameras, memory units, logging system, and display screen. Characterization of the DSP unit including memory capacity, periphery architecture, processing speed and style (e.g. serial or parallel), and data bus configuration may be directly expandable to other AVS products. Image processing and decision making techniques constitute a universal platform that may be applicable to any AVS product. Among such image-processing functions that are directly expandable, it is expected that others that will be developed and tested. Validated and verified algorithms are expected to be applied to other AVS products directly or with some minor changes. These algorithms include spatial transformation, gray-level interpolation, correlation techniques, lowpass filtering, highpass filtering, homomorphic filtering, generation of spatial masks for enhancement, generation of spatial masks for restoration, image subtraction, image averaging, intensity transformation, histogram processing, gray level interpolation, inverse filtering to remove blur caused by linear motion, algebraic approach, Wiener filter, constrained least squares restoration, line detection, edge detection by gradient operator, edge detection by Laplacian operator, edge detection by Canny and Sobel operators, multiscale decomposition, edge linking, segmentation by thresholding, illumination effect, global thresholding, optimal thresholding, adaptive thresholding, multivariable thresholding, region-oriented segmentation, region growing by pixel aggregation and averaging, region splitting and merging, use of motion in segmentation, spatial segmentation by accumulative differences, frequency-based segmentation, feature representation and extraction, representation approach, chain codes, polygonal approximation, boundary segments, skeleton, boundary descriptors, geometrical quantities, Fourier descriptors, moments, relational descriptors, pattern recognition and decision making, pattern classification, decision-theoretic methods, pixel matching, optimal statistical classifiers, neural networks, structural methods, feature matching, syntactic methods, multiscale modeling, decision making, If-Then rules, neural networks, expert systems.

All the techniques set forth above are well defined and established in the public domain. It is expected that most, if not all of them, can be applied to a given AVS. Selecting one technique or another depends mainly on the application at hand.

While the invention has been disclosed in connection with various embodiments, modifications thereon will be readily apparent to those skilled in the art. Accordingly, the spirit and scope of the invention is set forth in the following claims.

What is claimed is:

1. A method of detecting a fire, comprising:

receiving a plurality of frames of video information;

determining an energy indicator for each of a subset of the plurality of frames;

determining whether a plurality of characteristics indicative of fire are present, said plurality of characteristics including a hotspot, flame and smoke, each of said plurality of characteristics having a corresponding predetermined pattern as a function of time, wherein a determination regarding the presence of at least one of the plurality of characteristics is made in response to the energy indicator for each of the subset of the plurality of frames corresponding to a predetermined pattern that is a function of time for said at least one characteristic, wherein said determining whether a plurality of characteristics indicative of fire are present further includes:

determining a first result indicating whether a hotspot is detected;

determining a second result indicating whether a flame is detected; and determining a third result indicating whether smoke is detected, each of said first result, said second result and said third result being determined independently without using any of the other results; and detecting the presence of fire in accordance with whether said plurality of characteristics indicative of fire are present using at least said first result, said second result, and said third result.

2. A method, according to claim 1, further comprising:

comparing energy indicators for each of the subset of the plurality of frames to a reference frame to determine if the subset of the plurality of frames corresponds to a predetermined pattern as a function of time.

3. A method, according to claim 2, wherein the reference frame corresponds to a video frame taken when no fire is present.

4. A method, according to claim 2, wherein the reference frame corresponds to a video frame immediately preceding each of the subset of the plurality of frames.

5. A method, according to claim 1, wherein at least some of the subset of the plurality of frames are provided by a camera having a sensitivity of between 400 nm and 1000 nm.

6. A method, according to claim 5, wherein the camera generates 640×480 pixels per frame.

7. A method, according to claim 6, wherein the camera is a CCD camera.

8. A method, according to claim 6, wherein the camera is a CMOS camera.

9. A method, according to claim 1, wherein at least some of the subset of the plurality of frames are provided by a camera having a sensitivity of between 7 and 14 micrometers.

10. A method, according to claim 9, wherein the camera is an IR camera.

11. A method, according to claim 6, wherein the camera generates thirty frames per second.

12. A method, according to claim 11, wherein one in ten frames is selected for processing.

13. A method, according to claim 6, wherein the camera provides black and white output.

14. A method, according to claim 1, wherein determining an energy indicator includes calculating energy provided by a subset of the pixels of each of the subset of frames.

15. A method, according to claim 1, further comprising:

prior to determining an energy indicator, downsizing each of the plurality of the subset of the plurality of frames.

16. A computer program product comprising a computer readable medium having code stored thereon, the computer readable medium comprising:

executable code that receives a plurality of frames of video information;

executable code that determines an energy indicator for each of a subset of the plurality of frames;

executable code that determines whether a plurality of characteristics indicative of fire are present, said plurality of characteristics including a hotspot, flame and smoke, each of said plurality of characteristics having a corresponding predetermined pattern as a function of time, wherein a determination regarding the presence of at least one of the plurality of characteristics is made in response to the energy indicator for each of the subset of the plurality of frames corresponding to a predetermined pattern that is a function of time for said at least one characteristic, wherein said executable code that determines whether a plurality of characteristics indicative of fire are present further includes executable code that:

determines a first result indicating whether a hotspot is detected;

determines a second result indicating whether a flame is detected; and determines a third result indicating whether smoke is detected, each of said first result, said second result and said third result being determined independently without using any of the other results; and executable code that detects the presence of fire in accordance with whether said plurality of characteristics indicative of fire are present using at least said first result, said second result, and said third result.

17. A computer program product, according to claim 16, further comprising:

executable code that compares energy indicators for each of the subset of the plurality of frames to a reference frame to determine if the subset of the plurality of frames corresponds to a predetermined pattern as a function of time.

18. A computer program product, according to claim 17, wherein the reference frame corresponds to a video frame taken when no fire is present.

19. A computer program product, according to claim 17, wherein the reference frame corresponds to a video frame immediately preceding each of the subset of the plurality of frames.

20. A computer program product, according to claim 16, wherein the executable code that determines an energy indicator calculates energy provided by a subset of the pixels of each of the subset of frames.

21. A computer program product, according to claim 16, further comprising:

executable code that downsizes each of the plurality of the subset of the plurality of frames prior to determining an energy indicator.

22. An apparatus for detecting fire, comprising:

a plurality of cameras that provides a plurality of video frames; and at least one processor, coupled to the plurality of cameras, that determines an energy indicator for each of a subset of the plurality of frames, determines whether a plurality of characteristics indicative of fire are present, said plurality of characteristics including a hotspot, flame and smoke, each of said plurality of characteristics having a corresponding predetermined pattern as a function of time, wherein a determination regarding the presence of at least one of the plurality of characteristics is made in response to the energy indicator for each of the subset of the plurality of frames corresponding to a predetermined pattern that is a function of time for said at least one characteristic, determines a first result indicating whether a hotspot is detected, determines a second result indicating whether a flame is detected, determines a third result indicating whether smoke is detected, each of said first result, said second result and said third result being determined independently without using any of the other results, and detects the presence of fire in accordance with whether said plurality of characteristics indicative of fire are present using at least said first result, said second result, and said third result.

23. An apparatus, according to claim 22, wherein the at least one processor also compares energy indicators for each of the subset of the plurality of frames to a reference frame to determine if the subset of the plurality of frames corresponds to a predetermined pattern as a function of time.

24. An apparatus, according to claim 23, wherein the reference frame corresponds to a video frame taken when no fire is present.

25. An apparatus, according to claim 23, wherein the reference frame corresponds to a video frame immediately preceding each of the subset of the plurality of frames.

26. An apparatus, according to claim 22, wherein at least a subset of the plurality of cameras have a sensitivity of between 400 nm and 1000 nm.

27. An apparatus, according to claim 26, wherein at least some of the subset of the plurality of cameras that generate 640×480 pixels per frame.

28. An apparatus, according to claim 27, wherein at least some of the subset of the plurality of cameras are CCD cameras.

29. An apparatus, according to claim 27, wherein at least some of the subset of the plurality of cameras are CMOS cameras.

30. An apparatus, according to claim 22, wherein at least a subset of the plurality of cameras having a sensitivity of between 7 and 14 micrometers.

31. An apparatus, according to claim 30, wherein at least some of the subset of the plurality of cameras are IR cameras.

32. An apparatus, according to claim 22, wherein at least a subset of the plurality of cameras generates thirty frames per second.

33. An apparatus, according to claim 32, wherein the processor selects one in ten frames for processing.

34. An apparatus, according to claim 22, wherein at least a subset of the plurality of cameras provides black and white output.

35. An apparatus, according to claim 22, wherein the processor determines an energy indicator by calculating energy provided by a subset of the pixels of each of the subset of frames.

36. An apparatus, according to claim 22, wherein the processor downsizes each of the plurality of the subset of the plurality of frames prior to determining an energy indicator.

37. A system for fire detection comprising:

a plurality of cameras that provides a plurality of video input signals;

a video control unit, coupled to said plurality of cameras, including two processing boards for processing said plurality of video input signals producing a system fire detection signal, said two processing boards configured in one of a first configuration and a second configuration, said first configuration including said first processing board processing a first portion of said video input signals and said second processing board processing a second portion of said video input signals, said second configuration including said first processing board having functionality identical to that of said second processing board and, when one of said first and said second processing boards fails, the other of said first and second processing boards processes all video input signals, wherein said system fire detection signal is produced using at least three inputs, each of said at least three inputs indicating whether presence of a different one of a hotspot, flame or smoke is detected, each of said at least three inputs being determined independently without using any of the other inputs; and a conventional smoke detection control unit that outputs a smoke detection signal that is an input to at least one of said first and said second processing boards.

38. The system of claim 37, wherein said two processing boards are configured such that each of said two processing boards processes approximately half of said plurality of video input signals.

39. The system of claim 37, further comprising:

a video selector unit having one or more input signals so that the video selector unit may select for display video output.

40. The system of claim 39, wherein said one or more input signals to said video selector unit includes an input signal from each of said processing boards, said video selector unit provides for selecting a portion of the cargo bay for video display on one of a plurality of display units.

41. The system of claim 40, further comprising:

a recorder having as an input a video output signal from each of said two processing boards such that the recorder records video output from each of said two processing boards.

42. The system of claim 37, further comprising at least one video display unit wherein a text message indicating processing results by at least one of said two processing boards is overlayed on said at least one video display unit displaying video output.

43. The system of claim 37, further comprising:

a central maintenance system that outputs a fire suppression signal used as input to said two processing boards indicating whether fire suppression has been performed.

44. The system of claim 43, wherein each of said two processing boards performs processing in response to said fire suppression signal indicating that fire suppression has been performed to filter out image distortion caused by said fire suppression.

45. The system of claim 44, wherein said fire suppression signal indicates that Halon has been sprayed as part of fire suppression.

46. The system of claim 37, wherein each of said two processing boards includes at least one of: hardware that actuates a light source, hardware that processes camera input signals in accordance with one or more different camera types in the system, hardware that provides video output to be viewed by a user, and hardware for performing fire detection.

47. The system of claim 37, wherein said smoke detection signal from said conventional smoke detection system performs a gating function so that a system fire detection signal is generated by said system only after said conventional smoke detection control unit also provides a positive fire indication signal.

48. The system of claim 37, wherein said smoke detection signal from said conventional smoke detection system is used by at least one of said first processing board and said second processing board to produce said system fire detection signal indicating that a fire is present even though the conventional smoke detection control unit has not detected a fire.

49. The system of claim 37, wherein said plurality of cameras includes at least one CCD camera and at least one IR camera and wherein at least one CCD camera is mounted proximate to a corresponding IR camera, each CCD camera having an LED unit mounted therewith.

50. The system of claim 49, wherein each CCD camera includes on-board digital signal processing hardware.

51. The system of claim 49, wherein each IR camera includes on-board digital signal processing hardware.

52. The system of claim 37, wherein said plurality of cameras includes at least one CCD camera having at least two of the following characteristics: a size no greater than 4.7 inches×0.8 inches×0.8 inches, a maximum weight of 0.075 pounds, a maximum power consumption of 2.5 watts, an operating temperature of −10 to 60 degrees centigrade, a storage temperature of −40 to 80 degrees centigrade, a resolution of 640×480 pixels, an optical wavelength response of between 400 and 1000 nanometers.

53. The system of claim 37, wherein said plurality of cameras includes at least one CCD camera including an automatic gain control to adjust an amount of light provided in a video view area.

54. The system of claim 53, wherein said at least one CCD camera uses a special lenses with one of a 75 degree field of view, 90 degree field of view, and a wide angle view.

55. The system of claim 54, wherein said special lens is a wide angle view lens with one of a 275 degree view and a 360 degree view.

56. The system of claim 37, wherein said plurality of cameras includes at least one IR camera having at least two of the following characteristics: a size no greater than 6.5 inches×2.2 inches×2.2 inches, a maximum weight of 0.5 pounds, a power consumption less than 1.2 watts, an operating temperature between −10 and 60 degrees centigrade, a storage temperature between −40 and 80 degrees centigrade, and an optical wavelength response between 7 and 14 micrometers.

57. The system of claim 56, wherein said IR camera uses a special lens providing one of: a 75 degree field of view, a 90 degree field of view, a wide angle field of view.

58. The system of claim 57, wherein said special lens is a wide angle lens providing one of: a 275 degree field of view and a 360 degree field of view.

59. The system of claim 58, wherein said special lens is made with one of: germanium and zinc selenide.

60. The system of claim 49, including at least one LED as a lighting source with at least two of the following characteristics: a maximum size of 2 inches×2 inches×2 inches, a maximum weight of 0.125 pounds, a power consumption maximum of 1.5 watts, an operating temperature between −40 and 70 degrees centigrade, a storage temperature between −55 and 120 degrees centigrade, and an optical wavelength of about 820 nanometers.

61. The system of claim 37, wherein at least one of said two processing boards uses a plurality of two-dimensional camera views from a plurality of cameras to synthesize a three-dimensional camera view.

62. A method of detecting a fire comprising:

receiving a plurality of video input signals;

determining a feature for each of a subset of the plurality of video signals;

determining whether a plurality of characteristics indicative of fire are present, said plurality of characteristics including a hotspot, flame and smoke, each of said plurality of characteristics having a corresponding predetermined pattern as a function of time, wherein a determination regarding the presence of at least one of the plurality of characteristics is made in response to the feature for each of the subset of the plurality of frames corresponding to a predetermined pattern that is a function of time for said at least one characteristic, wherein said determining whether a plurality of characteristics indicative of fire are present further includes:

determining a first result indicating whether a hotspot is detected;

determining a second result indicating whether a flame is detected; and determining a third result indicating whether smoke is detected, each of said first result, said second result and said third result being determined independently without using any of the other results;

producing, by a conventional smoke detection control unit, a smoke detection signal; and detecting the presence of fire using said smoke detection signal and in accordance with whether said plurality of characteristics indicative of fire are present using at least said first result, said second result, and said third result.

63. The method of claim 62, further comprising:

processing a first portion of said plurality of video input signals by a first processing board; and processing a second portion of said plurality of video input signals by a second processing board.

64. The method of claim 62, wherein a first processing board for processing said plurality of video input signals has functionality identical to that of a second processing board and, when one of said first and said second processing boards fails, the other of said first and second processing boards processes all of said plurality of video input signals.

65. The method of claim 62, wherein a first processing board for processing said plurality of video input signals has functionality identical to that of a second processing board and, wherein each of said two processing boards processes approximately half of said plurality of video input signals.

66. The method of claim 62, further comprising:

selecting one of a plurality of video display signals for video display output.

67. The method of claim 66, wherein said plurality of video display signals includes as an input signal at least one signal from a processing board corresponding to a portion of a cargo bay for video display on a display unit.

68. The method of claim 62, further comprising:

recording at least one processed video output signal producing using a portion of said plurality of video input signals.

69. The method of claim 68, further comprising:

overlaying a text message indicating results of said detecting on a video display unit displaying video output.

70. The method of claim 62, further comprising:

producing a fire suppression signal used in processing a portion of said plurality of video input signals, said fire suppression signal indicating whether fire suppression has been performed.

71. The method of claim 70, further comprising:

performing, in response to said fire suppression signal indicating that fire suppression has been performed, filtering that filters out image distortion caused by said fire suppression.

72. The method of claim 71, wherein said fire suppression signal indicates that Halon has been sprayed as part of fire suppression.

73. The method of claim 62, further comprising:

actuating a light source by an external source.

74. The method of claim 62, further comprising:

processing a portion of said plurality of video input signals in accordance with one or more different camera types in the system.

75. The method of claim 62, further comprising:

producing video output to be viewed by a user on a display device.

76. The method of claim 62, further comprising:

using said smoke detection signal from said conventional smoke detection system to produce a system fire detection signal only after said conventional smoke detection control unit also provides a positive fire indication signal.

77. The method of claim 62, further comprising:

using said smoke detection signal from said conventional smoke detection system to produce a system fire detection signal indicating that a fire is present even though the conventional smoke detection control unit has not detected a fire.

78. The method of claim 62, wherein at least a portion of said video input signals are provided by a plurality of cameras including at least one CCD camera and at least one IR camera and wherein at least one CCD camera is mounted proximate to a corresponding IR camera, each CCD camera having an LED unit mounted therewith.

79. The method of claim 78, wherein each CCD camera includes on-board digital signal processing hardware.

80. The method of claim 78, wherein each IR camera includes on-board digital signal processing hardware.

81. The method of claim 62, wherein at least a portion of said video input signals are provided by a plurality of cameras including at least one CCD camera having at least two of the following characteristics: a size no greater than 4.7 inches×0.8 inches×0.8 inches, a maximum weight of 0.075 pounds, a maximum power consumption of 2.5 watts, an operating temperature of −10 to 60 degrees centigrade, a storage temperature of −40 to 80 degrees centigrade, a resolution of 640×480 pixels, an optical wavelength response of between 400 and 1000 nanometers.

82. The method of claim 62, wherein at least a portion of said video input signals are provided by a plurality of cameras including at least one CCD camera including an automatic gain control to adjust an amount of light provided in a video view area.

83. The method of claim 82, wherein said at least one CCD camera uses a special lens with one of a 75 degree field of view, 90 degree field of view, and a wide angle view.

84. The method of claim 83, wherein said special lens is a wide angle view lens with one of a 275 degree view and a 360 degree view.

85. The method of claim 62, wherein at least a portion of said video input signals are provided by a plurality of cameras including at least one IR camera having at least two of the following characteristics: a size no greater than 6.5 inches×2.2 inches×2.2 inches, a maximum weight of 0.5 pounds, a power consumption less than 1.2 watts, an operating temperature between −10 and 60 degrees centigrade, a storage temperature between−40 and 80 degrees centigrade, and an optical wavelength response between 7 and 14 micrometers.

86. The method of claim 85, wherein said IR camera uses a special lens providing one of: a 75 degree field of view, a 90 degree field of view, a wide angle field of view.

87. The method of claim 86, wherein said special lens is a wide angle lens providing one of: a 275 degree field of view and a 360 degree field of view.

88. The method of claim 87, wherein said special lens is made with one of: germanium and zinc selenide.

89. The method of claim 78, wherein said LED unit is used as a lighting source when obtaining one of said plurality of video input signals, said LED unit having at least two of the following characteristics: a maximum size of 2 inches×2 inches×2 inches, a maximum weight of 0.125 pounds, a power consumption maximum of 1.5 watts, an operating temperature between −40 and 70 degrees centigrade, a storage temperature between −55 and 120 degrees centigrade, and an optical wavelength of about 820 nanometers.

90. The method of claim 62, further comprising:

using a plurality of two-dimensional camera views from a plurality of cameras to synthesize a three-dimensional camera view.

91. A computer program product including a computer readable medium comprising executable stored thereon for detecting a fire, the computer readable medium comprising:

executable code that receives a plurality of video input signals;

executable code that determines a feature for each of a subset of the plurality of video signals;

executable code that determines whether a plurality of characteristics indicative of fire are present, said plurality of characteristics including a hotspot, flame and smoke, each of said plurality of characteristics having a corresponding predetermined pattern as a function of time, wherein a determination regarding the presence of at least one of the plurality of characteristics is made in response to the feature for each of the subset of the plurality of frames corresponding to a predetermined pattern that is a function of time for said at least one characteristic, wherein said executable code that determines whether a plurality of characteristics indicative of fire are present further includes:

executable code that determines a first result indicating whether a hotspot is detected;

executable code that determines a second result indicating whether a flame is detected; and executable code that determines a third result indicating whether smoke is detected, each of said first result, said second result and said third result being determined independently without using any of the other results;

executable code that produces, by a conventional smoke detection control unit, a smoke detection signal; and executable code that detects the presence of fire using said smoke detection signal and in accordance with whether said plurality of characteristics indicative of fire are present using at least said first result, said second result, and said third result.

92. The computer program product of claim 91, further comprising:

executable code that processes a first portion of said plurality of video input signals by a first processing board; and executable code that processes a second portion of said plurality of video input signals by a second processing board.

93. The computer program product of claim 91, wherein a first processing board for processing said plurality of video input signals has functionality identical to that of a second processing board and, when one of said first and said second processing boards fails, the other of said first and second processing boards processes all of said plurality of video input signals.

94. The computer program product of claim 91, wherein a first processing board for processing said plurality of video input signals has functionality identical to that of a second processing board and, wherein each of said two processing boards processes approximately half of said plurality of video input signals.

95. The computer program product of claim 91, further comprising:

executable code that selects one of a plurality of video display signals for video display output.

96. The computer program product of claim 91, wherein said plurality of video display signals includes as an input signal at least one signal from a processing board corresponding to a portion of a cargo bay for video display on a display unit.

97. The computer program product of claim 91, further comprising:

executable code that records at least one processed video output signal producing using a portion of said plurality of video input signals.

98. The computer program product of claim 97, further comprising:

executable code that overlays a text message indicating results of said detecting on a video display unit displaying video output.

99. The computer program product of claim 91, further comprising:

executable code that produces a fire suppression signal used in processing a portion of said plurality of video input signals, said fire suppression signal indicating whether fire suppression has been performed.

100. The computer program product of claim 99, further comprising:

executable code that performs, in response to said fire suppression signal indicating that fire suppression has been performed, filtering that filters out image distortion caused by said fire suppression.

101. The computer program product of claim 100, wherein said fire suppression signal indicates that Halon has been sprayed as part of fire suppression.

102. The computer program product of claim 91, further comprising:

executable code that actuates a light source by an external source.

103. The computer program product claim 91, further comprising:

executable code that processes a portion of said plurality of video input signals in accordance with one or more different camera types in the system.

104. The computer program product of claim 91, further comprising:

executable code that produces video output to be viewed by a user on a display device.

105. The computer program product of claim 91, further comprising:

executable code that uses said smoke detection signal from said conventional smoke detection system to produce a system fire detection signal only after said conventional smoke detection control unit also provides a positive fire indication signal.

106. The computer program product of claim 91, further comprising:

executable code that uses said smoke detection signal from said conventional smoke detection system to produce a system fire detection signal indicating that a fire is present even though the conventional smoke detection control unit has not detected a fire.

107. The computer program product of claim 91, wherein at least a portion of said video input signals are provided by a plurality of cameras including at least one CCD camera and at least one IR camera and wherein at least one CCD camera is mounted proximate to a corresponding IR camera, each CCD camera having an LED unit mounted therewith.

108. The computer program product of claim 107, wherein each CCD camera includes on-board digital signal processing hardware.

109. The computer program product of claim 107, wherein each IR camera includes on-board digital signal processing hardware.

110. The computer program product of claim 91, wherein at least a portion of said video input signals are provided by a plurality of cameras including at least one CCD camera having at least two of the following characteristics: a size no greater than 4.7 inches×0.8 inches×0.8 inches, a maximum weight of 0.075 pounds, a maximum power consumption of 2.5 watts, an operating temperature of −10 to 60 degrees centigrade, a storage temperature of −40 to 80 degrees centigrade, a resolution of 640×480 pixels, an optical wavelength response of between 400 and 1000 nanometers.

111. The computer program product of claim 91, wherein at least a portion of said video input signals are provided by a plurality of cameras including at least one CCD camera including an automatic gain control to adjust an amount of light provided in a video view area.

112. The computer program product of claim 111, wherein said at least one CCD camera uses a special lens with one of a 75 degree field of view, 90 degree field of view, and a wide angle view.

113. The computer program product of claim 112, wherein said special lens is a wide angle view lens with one of a 275 degree view and a 360 degree view.

114. The computer program product of claim 91, wherein at least a portion of said video input signals are provided by a plurality of cameras including at least one IR camera having at least two of the following characteristics: a size no greater than 6.5 inches×2.2 inches×2.2 inches, a maximum weight of 0.5 pounds, a power consumption less than 1.2 watts, an operating temperature between −10 and 60 degrees centigrade, a storage temperature between −40 and 80 degrees centigrade, and an optical wavelength response between 7 and 14 micrometers.

115. The computer program product of claim 114, wherein said IR camera uses a special lens providing one of: a 75 degree field of view, a 90 degree field of view, a wide angle field of view.

116. The computer program product of claim 115, wherein said special lens is a wide angle lens providing one of: a 275 degree field of view and a 360 degree field of view.

117. The computer program product of claim 116, wherein said special lens is made with one of: germanium and zinc selenide.

118. The computer program product of claim 117, wherein said LED unit is used as a lighting source when obtaining one of said plurality of video input signals, said LED unit having at least two of the following characteristics: a maximum size of 2 inches×2 inches×2 inches, a maximum weight of 0.125 pounds, a power consumption maximum of 1.5 watts, an operating temperature between −40 and 70 degrees centigrade, a storage temperature between −55 and 120 degrees centigrade, and an optical wavelength of about 820 nanometers.

119. The computer program product of claim 91, further comprising:

executable code that synthesizes a three-dimensional camera view using a plurality of two-dimensional camera views from a plurality of cameras.

120. The method of claim 62, wherein said plurality of video input signals are obtained using a plurality of cameras mounted in upper corners of a cargo bay.

121. The method of claim 62, wherein an image corresponds to one of said plurality of video signals in said subset, and the method further comprising:

associating a first set of features extracted with a first region of the image and associating a second set of features extracted with a second region of the image.

122. The method of claim 121, further comprising:

extracting the first set of features; and extracting the second set of features.

123. The method of claim 121, further comprising:

growing one of said first and said second regions by pixel aggregation and averaging.

124. The method of claim 62, further comprising:

identifying at least one feature in accordance with an image distribution map.

125. The method of claim 124, wherein said at least one feature includes at least one of: pixel intensity, pixel grey level, a Fourier descriptor, a wavelet coefficient, a statistical moment and a motion indicator.

126. The method of claim 124, further comprising:

using at least one of said features to identify one or more regions of interest in an image.

127. The method of claim 126, further comprising:

splitting a region into a plurality of regions.

128. The method of claim 126, further comprising:

merging a region with another region.

129. The method of claim 126, wherein a region of interest is associated with at least one of: a fire region, a smoke region, a hotspot region.

130. The method of claim 129, wherein a region of interest is defined as a contiguous set of pixels.

131. The computer program product of claim 91, wherein said plurality of video input signals are obtained using a plurality of cameras mounted in upper corners of a cargo bay.

132. The computer program product of claim 91, wherein an image corresponds to one of said plurality of video signals in said subset, and the method further comprising:

associating a first set of features extracted with a first region of the image and associating a second set of features extracted with a second region of the image.

133. The computer program product of claim 132, further comprising:

executable code that extracts the first set of features; and executable code that extracts the second set of features.

134. The computer program product of claim 132, further comprising:

executable code that grows one of said first and said second regions by pixel aggregation and averaging.

135. The computer program product of claim 91, further comprising:

executable code that identifies at least one feature in accordance with an image distribution map.

136. The computer program product of claim 135, wherein said at least one feature includes at least one of: pixel intensity, pixel grey level, a Fourier descriptor, a wavelet coefficient, a statistical moment.

137. The computer program product of claim 135, further comprising:

executable code that uses at least one of said features to identify one or more regions of interest in an image.

138. The computer program product of claim 137, further comprising:

executable code that splits a region into a plurality of regions.

139. The computer program product of claim 137, further comprising:

executable code that merges a region with another region.

140. The computer program product of claim 137, wherein a region of interest is associated with at least one of: a fire region, a smoke region, a hotspot region.

141. The computer program product of claim 140, wherein a region of interest is defined as a contiguous set of pixels.

142. The system of claim 37, wherein said system fire detection signal is produced without using an output signal from a conventional smoke detection system.

143. The system of claim 142, wherein said system fire detection signal is produced using a data fusion technique in accordance with a plurality of intermediate output signals.

144. The system of claim 37, wherein said system fire detection signal is produced independent of an output signal from a conventional smoke detection system.

145. The method of claim 2, wherein the reference frame corresponds to a video frame two frames prior to each of the subset of the plurality of frames.

146. The system of claim 49, further comprising another LED unit providing light at 800 nanometers and being mounted separately from said plurality of cameras in an enclosed area.

* * * * *